(12) United States Patent
Smith

(10) Patent No.: US 11,807,190 B2
(45) Date of Patent: Nov. 7, 2023

(54) AUTOMATED RETRACTABLE VEHICLE STEP

(71) Applicant: Lund Motion Products, Inc., Buford, GA (US)

(72) Inventor: Anthony Smith, Costa Mesa, CA (US)

(73) Assignee: Lund Motion Products, Inc., Ann Arbor, MI (US)

( * ) Notice: Subject to any disclaimer, the term of this patent is extended or adjusted under 35 U.S.C. 154(b) by 0 days.

(21) Appl. No.: 17/746,378

(22) Filed: May 17, 2022

(65) Prior Publication Data

US 2022/0274529 A1 Sep. 1, 2022

Related U.S. Application Data

(63) Continuation of application No. 17/338,531, filed on Jun. 3, 2021, which is a continuation of application
(Continued)

(51) Int. Cl.
*B60R 3/02* (2006.01)
*G05D 3/10* (2006.01)
(Continued)

(52) U.S. Cl.
CPC .............. *B60R 3/02* (2013.01); *B60R 3/002* (2013.01); *B60R 16/023* (2013.01); *B60R 16/03* (2013.01);
(Continued)

(58) Field of Classification Search
CPC .. B60R 3/00; B60R 3/002; B60R 3/02; B60R 16/023; B60R 16/03; G05D 3/10
See application file for complete search history.

(56) References Cited

U.S. PATENT DOCUMENTS 4,089,538 A 5/1978 Eastridge
5,697,626 A * 12/1997 McDaniel ................. B60R 3/02
280/166
(Continued)

FOREIGN PATENT DOCUMENTS

CN 2174368 8/1994
CN 201280106 7/2009
(Continued)

OTHER PUBLICATIONS

Smith, Anthony Nicholas, U.S. Appl. No. 14/169,626 U.S. Pat. No. 9,272,667, filed Jan. 31, 2014, Automated Retractable Vehicle Step.
(Continued)

*Primary Examiner* — John D Walters
(74) *Attorney, Agent, or Firm* — Knobbe, Martens, Olson & Bear, LLP

(57) ABSTRACT

Powered retractable vehicle step assist systems and methods are provided. The steps systems are configured for installation (e.g., after market installation) and use with a vehicle. The system can include a stepping member movable between a retracted position and a deployed position with respect to the vehicle. The system can further include a vehicle interface. A controller of the step system can be configured to process information received from the vehicle interface and, based at least partly on the processing of the information, cause movement of the stepping member between the retracted position and the deployed position.

14 Claims, 35 Drawing Sheets

Related U.S. Application Data

No. 16/667,734, filed on Oct. 29, 2019, now Pat. No. 11,208,044, which is a continuation-in-part of application No. 16/136,091, filed on Sep. 19, 2018, now Pat. No. 10,513,224, which is a continuation of application No. 15/792,562, filed on Oct. 24, 2017, now Pat. No. 10,106,088, which is a continuation of application No. 15/344,178, filed on Nov. 4, 2016, now Pat. No. 9,834,147, which is a continuation of application No. 14/977,404, filed on Dec. 21, 2015, now Pat. No. 9,511,717, which is a continuation of application No. 14/169,626, filed on Jan. 31, 2014, now Pat. No. 9,272,667.

(60) Provisional application No. 62/832,115, filed on Apr. 10, 2019, provisional application No. 61/898,674, filed on Nov. 1, 2013.

(51) Int. Cl.
  *B60R 16/03* (2006.01)
  *B60R 3/00* (2006.01)
  *B60R 16/023* (2006.01)

(52) U.S. Cl.
  CPC ............ *G05D 3/10* (2013.01); *B60Y 2304/05* (2013.01); *B60Y 2304/07* (2013.01); *Y10T 29/49117* (2015.01)

(56) References Cited

U.S. PATENT DOCUMENTS

| | | | |
|---|---|---|---|
| 6,112,152 A | 8/2000 | Tuttle | |
| 6,249,216 B1 | 6/2001 | Flick | |
| 6,375,207 B1 | 4/2002 | Dean et al. | |
| 6,430,164 B1 | 8/2002 | Jones et al. | |
| 6,641,158 B2 | 11/2003 | Leitner | |
| 6,834,875 B2 | 12/2004 | Leitner | |
| 7,017,927 B2 | 3/2006 | Henderson et al. | |
| 7,367,574 B2 | 5/2008 | Leitner | |
| 7,413,233 B1 | 8/2008 | Jung | |
| 7,469,916 B2* | 12/2008 | Watson | B60R 3/02 280/166 |
| 7,712,755 B2 | 5/2010 | Yang et al. | |
| 8,042,821 B2 | 10/2011 | Yang | |
| 8,052,162 B2 | 11/2011 | Yang et al. | |
| 8,157,277 B2 | 4/2012 | Leitner et al. | |
| 8,205,901 B2 | 6/2012 | Yang et al. | |
| 8,342,551 B2* | 1/2013 | Watson | B60R 3/02 280/166 |
| 8,366,129 B2 | 2/2013 | Salmon | |
| 8,463,953 B2 | 6/2013 | Davis et al. | |
| 8,469,380 B2 | 6/2013 | Yang et al. | |
| 8,602,431 B1* | 12/2013 | May | B60R 3/02 280/166 |
| 8,833,782 B2* | 9/2014 | Huotari | B60R 3/02 280/166 |
| 9,272,667 B2 | 3/2016 | Smith | |
| 9,308,870 B2 | 4/2016 | Yang | |
| 9,511,717 B2 | 12/2016 | Smith | |
| 9,522,634 B1 | 12/2016 | Smith | |
| 9,527,449 B2 | 12/2016 | Smith | |
| 9,656,609 B2 | 5/2017 | Du et al. | |
| 9,669,766 B2 | 6/2017 | Du et al. | |
| 9,669,767 B2 | 6/2017 | Du et al. | |
| 9,688,205 B2 | 6/2017 | Du et al. | |
| 9,834,147 B2 | 12/2017 | Smith | |
| 10,106,088 B2 | 10/2018 | Smith | |
| 10,195,997 B2 | 2/2019 | Smith | |
| 10,513,224 B2 | 12/2019 | Smith | |
| 11,198,395 B2 | 12/2021 | Smith | |
| 11,208,044 B2 | 12/2021 | Smith et al. | |
| 2005/0177288 A1 | 8/2005 | Sullivan et al. | |
| 2006/0214386 A1 | 9/2006 | Watson | |
| 2008/0044268 A1 | 2/2008 | Heigl et al. | |
| 2009/0203247 A1 | 8/2009 | Fifelski et al. | |
| 2010/0194070 A1 | 8/2010 | Stauffer et al. | |
| 2011/0233889 A1 | 9/2011 | Watson et al. | |
| 2012/0098231 A1 | 4/2012 | Huotari et al. | |
| 2012/0139206 A1 | 6/2012 | May | |
| 2015/0123374 A1 | 5/2015 | Smith | |
| 2015/0291102 A1 | 10/2015 | Smith | |
| 2017/0021781 A1 | 1/2017 | Du et al. | |
| 2017/0036607 A1 | 2/2017 | Du et al. | |
| 2017/0144606 A1 | 5/2017 | Smith | |
| 2018/0141497 A1 | 5/2018 | Smith | |
| 2018/0257572 A1 | 9/2018 | Du et al. | |
| 2018/0297530 A1* | 10/2018 | Stickles | B60R 3/02 |
| 2019/0193639 A1 | 6/2019 | Smith | |
| 2020/0062183 A1 | 2/2020 | Smith et al. | |
| 2021/0284071 A1 | 9/2021 | Smith | |
| 2021/0300250 A1 | 9/2021 | Smith | |

FOREIGN PATENT DOCUMENTS

| | | |
|---|---|---|
| CN | 100545005 | 9/2009 |
| CN | 102452357 | 5/2012 |
| CN | 202758405 | 2/2013 |
| CN | 202806582 U | 3/2013 |
| CN | 202847566 | 4/2013 |
| CN | 103149915 | 6/2013 |
| CN | 203211209 U | 9/2013 |
| EP | 1116840 | 7/2001 |
| FR | 1350593 | 12/1963 |
| FR | 2225612 | 8/1974 |
| GB | 936846 | 9/1963 |
| TW | M296187 | 8/2006 |
| TW | M318551 | 9/2007 |
| WO | WO 2003/039910 | 5/2003 |
| WO | WO 2003/066380 | 8/2003 |
| WO | WO 2018/197393 | 11/2018 |

OTHER PUBLICATIONS

Smith, Anthony Nicholas, U.S. Appl. No. 14/977,404 U.S. Pat. No. 9,511,717, filed Dec. 21, 2015, Automated Retractable Vehicle Step.

Smith, Anthony Nicholas, U.S. Appl. No. 15/344,178 U.S. Pat. No. 9,834,147, filed Nov. 4, 2016, Automated Retractable Vehicle Step.

Smith, Anthony Nicholas, U.S. Appl. No. 15/792,562 U.S. Pat. No. 10,106,088, filed Oct. 24, 2017, Automated Retractable Vehicle Step.

Smith, Anthony Nicholas, U.S. Appl. No. 16/136,091 U.S. Pat. No. 10,513,224, filed Sep. 19, 2018, Vehicle Accessory System.

Smith, Anthony Nicholas, U.S. Appl. No. 14/752,488 U.S. Pat. No. 9,527,449, filed Jun. 26, 2015, Controlling a Powered Vehicle Step.

Smith, Anthony Nicholas, U.S. Appl. No. 16/667,734 U.S. Pat. No. 11,208,044, filed Oct. 29, 2019, Remotely Controlled Vehicle Step and Lighting Systems.

Smith, Anthony Nicholas, U.S. Appl. No. 17/338,500 U.S. Pat. No. 11,198,395, filed Jun. 3, 2021, Automated Retractable Vehicle Step.

Smith, Anthony Nicholas, U.S. Appl. No. 17/338,531, filed Jun. 3, 2021, Automated Retractable Vehicle Step.

AMP Research Power Step Installation Guide. Truckblog TV, (http://www.articlecity.co20090330m/videos/auto_and_trucks/AMP-Research-Power-Step-Installation-Guide-103254291.php). In 7 pages. Copyright date shown in video: 2008. [Part 1-2 of video].

AMP Research Power Step Installation Guide. Truckblog TV, (http://www.articlecity.co20090330m/videos/auto_and_trucks/AMP-Research-Power-Step-Installation-Guide-103254291.php). In 7 pages. Copyright date shown in video: 2008. [Part 2-2 of video].

Installation Instructions PowerBoard® NX, Bestop, Inc., file metadata accessed through File Properties function of Adobe Acrobat Reader indicates that the document was created and last modified on Oct. 24, 2013.

Installation Guide Amp Research Powerstep™, Amp Research, Inc., file metadata accessed through File Properties function of Adobe Acrobat Reader indicates that the document was created and last modified on Sep. 18, 2012.

(56) References Cited

OTHER PUBLICATIONS

Video screenshots AMP Research Power Step Installation Guide 2008.
Canadian Office Action, re CA Application No. 2,929,055, dated Aug. 27, 2019, in 3 pages.
Chinese Office Action re CN Application No. 201480066712.1, dated Apr. 17, 2017, w/translation.
International Search Report re International Application No. PCT/US2014/062025, dated Jan. 12, 2015, in 8 pages.
Canadian Office Action for Canadian application No. 3101398, dated Feb. 4, 2022, in 3 pages.
First Amended Complaint Under Section 337 of the Tariff Action of 1930, as Amended, Investigation No. 337-TA-3653, In the Matter of Certain Automated Retractable Vehicle Steps and Components Thereof, dated Nov. 14, 2022, in 42 pages.
Exhibits 18-30 to Complaint in Investigation No. 337-TA-3653, in 399 pages.
Case 1:22-cv-01430-UNA, *Lund Motion Products, Inc.* v. *Rough Country LLC*, Complaint for Patent Infringement, filed Oct. 28, 2022, in 208 pages.
Case 3:22-cv-01947, *Lund Motion Products, Inc.* v. *Southern Truck LLC*, Complaint for Patent Infringement, Demand for Jury Trial, filed Oct. 28, 2022, in 199 pages.
Case 3:22-cv-02414-G, *Lund Motion Products, Inc.* v. *Earl Owen Company, Inc.*, Complaint for Patent Infringement, Jury Trial Demand, filed Oct. 28, 2022, in 199 pages.
Case 3:22-cv-00171-RLY-MPB, *Lund Motion Products, Inc.* v. *Meyer Distributing, Inc.*, Complaint for Patent Infringement, Demand for Jury Trial, filed Oct. 28, 2022, in 35 pages.
Petition for Invalidation of Chinese Patent ZL201480066712.1, dated Mar. 10, 2023, in 59 pages (English translation included).
Screen shots from video posted at https://www.motorx.tv/ford-f-150-amp-research-power-sleep-installation/comment-page-1/ with Notarial certificate related to the video, submitted as "Evidence 1" together with the Petition for Invalidation in Chinese patent No. ZL201480066712.1, in 21 pages. Date of publication of video alleged in Petition for Invalidation is Sep. 19, 2008, in 21 pages.
AMP Research Power Step Installation Guide for Toyota Tundra Double Cab, Toyota Tundra CrewMax, and Toyota Sequoia, date shown on document is "rev. May 17, 2011", in 10 pages.
AMP Research Power Step Installation Guide for Chevrolet Silverado/GMC Sierra—Ext. Cab, Chevrolet Silverado/GMC Sierra—Cre Cab, and Chevrolet Silverado/GMC Sierra—Hybrid, date shown on document is "rev. Apr. 11, 2012", in 11 pages.
AMP Research Power Step Installation Guide for Dodge Ram Quad Cab 1500, Dodge Ram Crew Cab 1500, Dodge Ram Crew Cab 2500/3500, and Dodge Ram Mega Cab 2500/3500, date shown on document is "rev. Apr. 12, 2012", in 14 pages.
Document Filing Report through Oct. 28, 2022 and May 4, 2023 for ITC Investigation No. 337-TA-1345, generated May 4, 2023, in 16 pages.
Joint Claim Construction Chart for ITC Investigation No. 337-TA-1345, dated Mar. 28, 2023.
Petition for Invalidation of Chinese Application No. 201480066712.1, dated Aug. 2, 2023, in 68 pages, including English translation.
AMP Research Power Step Installation Guide. Truckblog TV, (http://www.articlecity.co20090330m/videos/auto_and_trucks/AMP-Research-Power-Step-Installation-Guide-103254291.php), in 7 pages.

\* cited by examiner

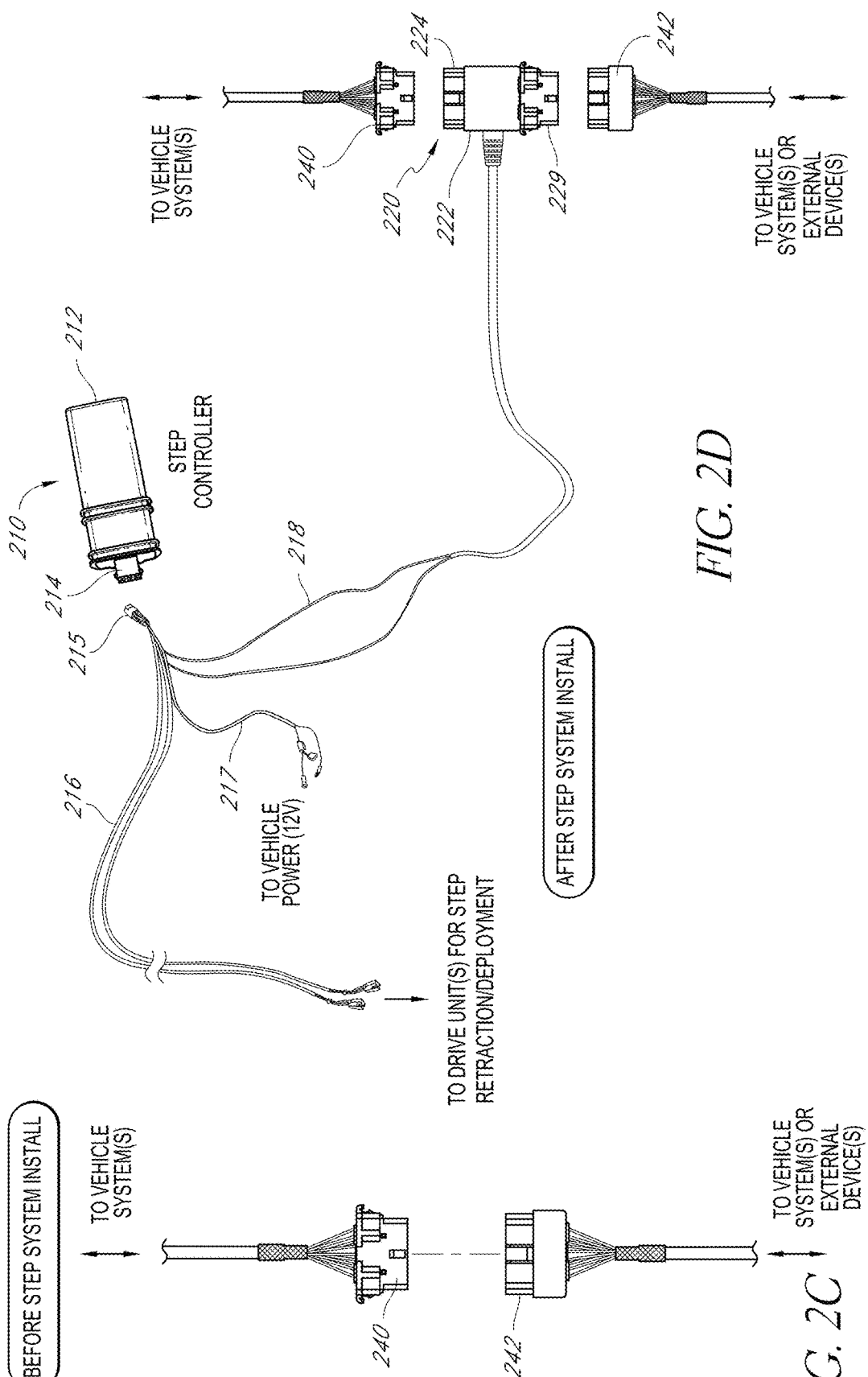

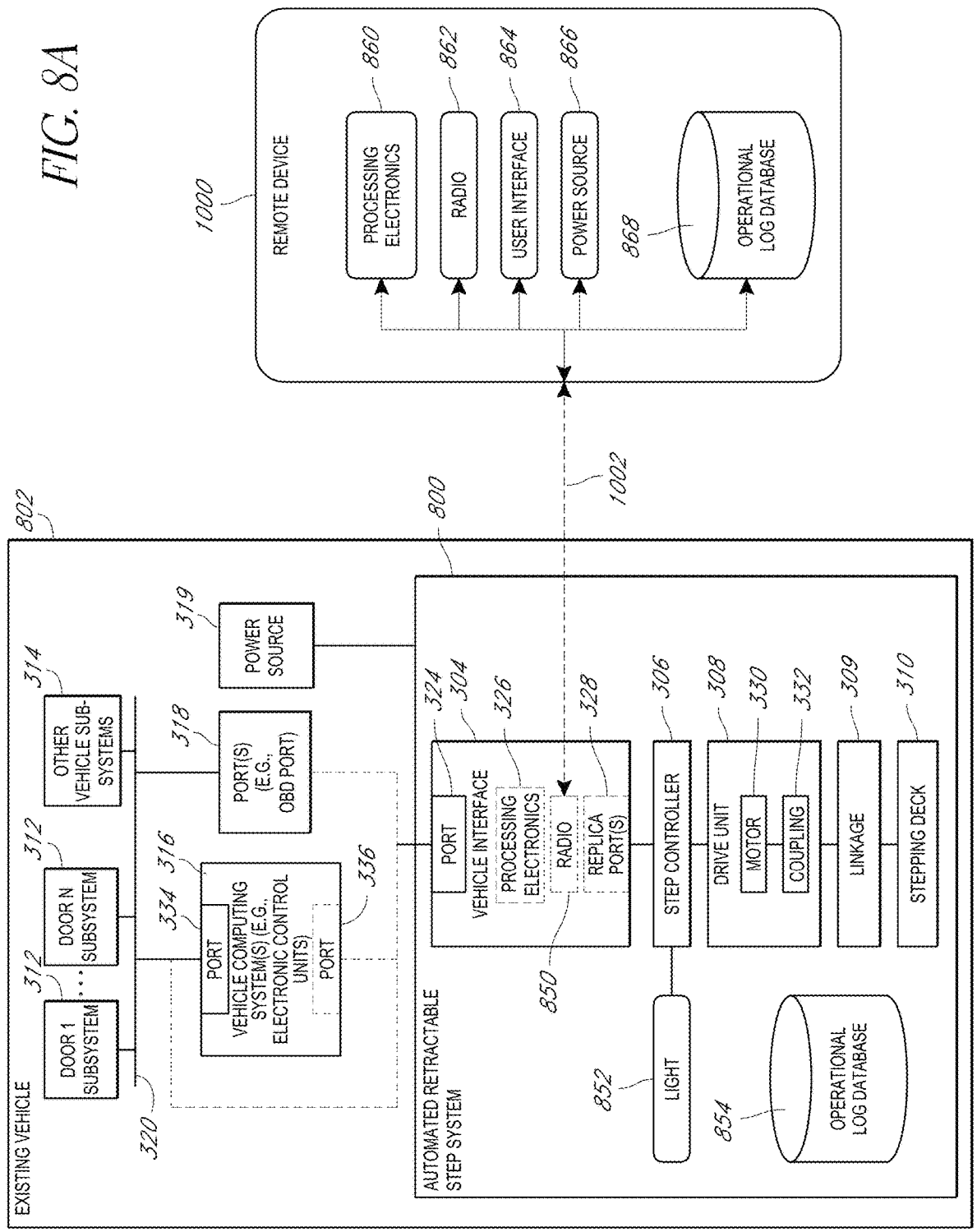

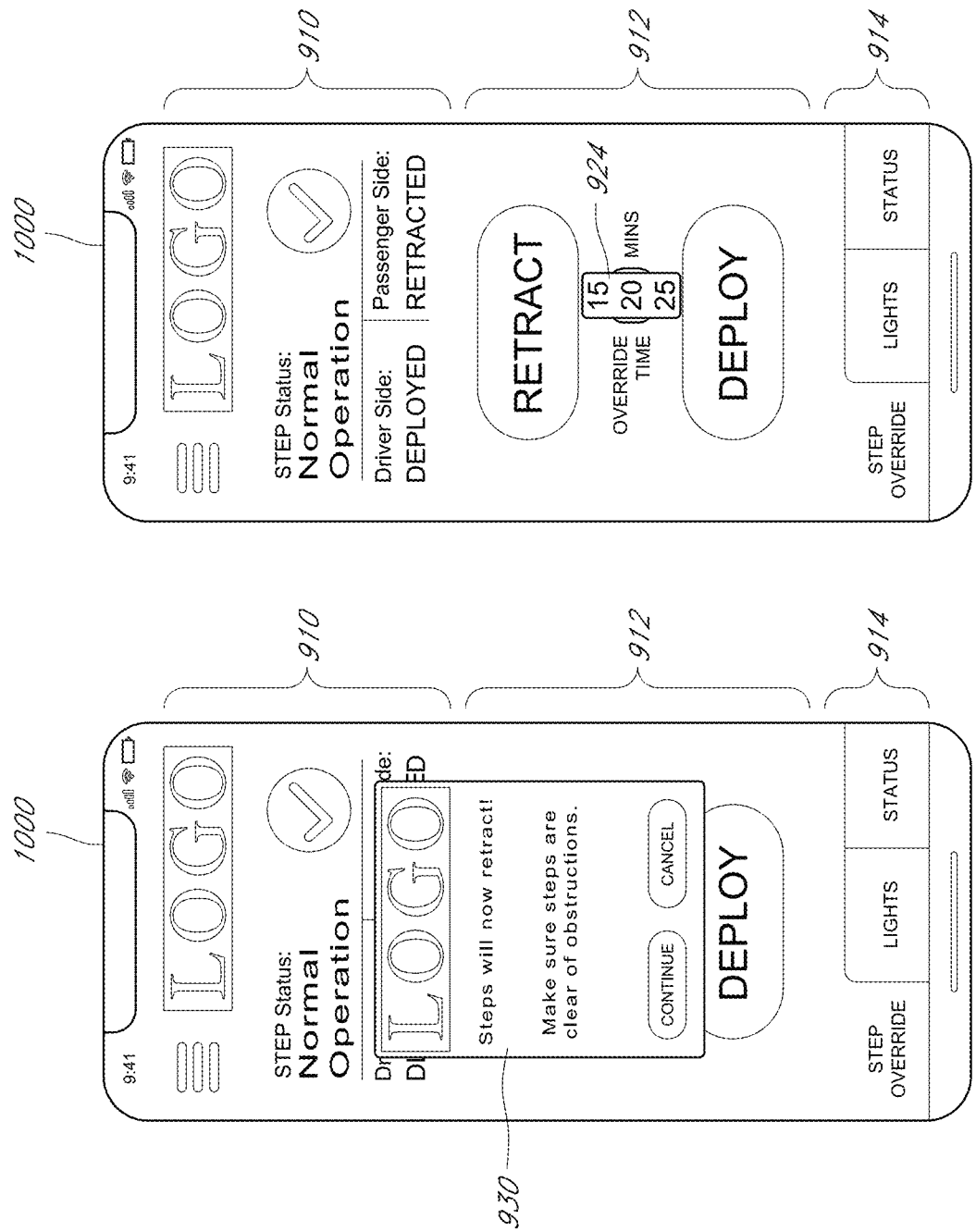

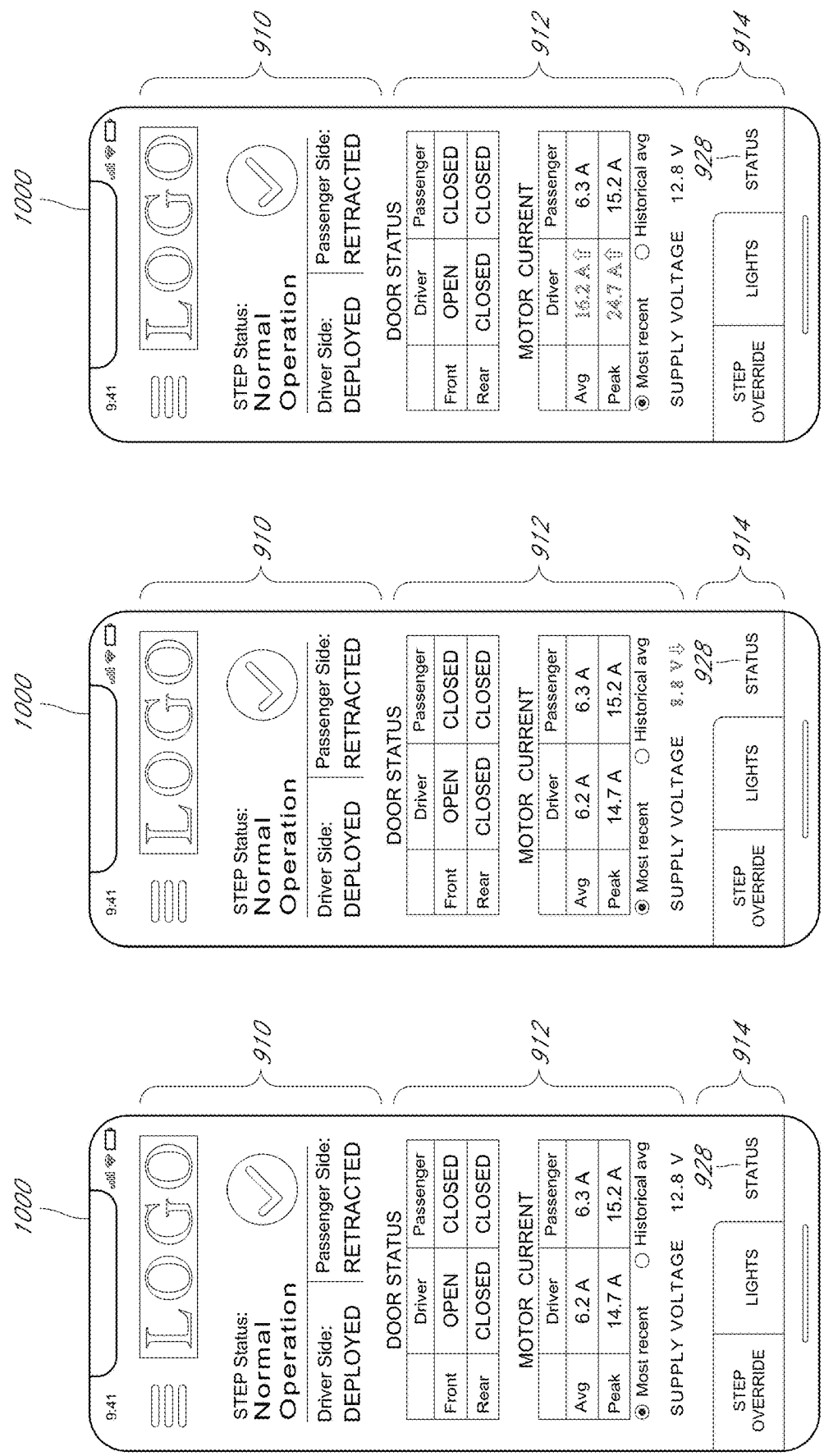

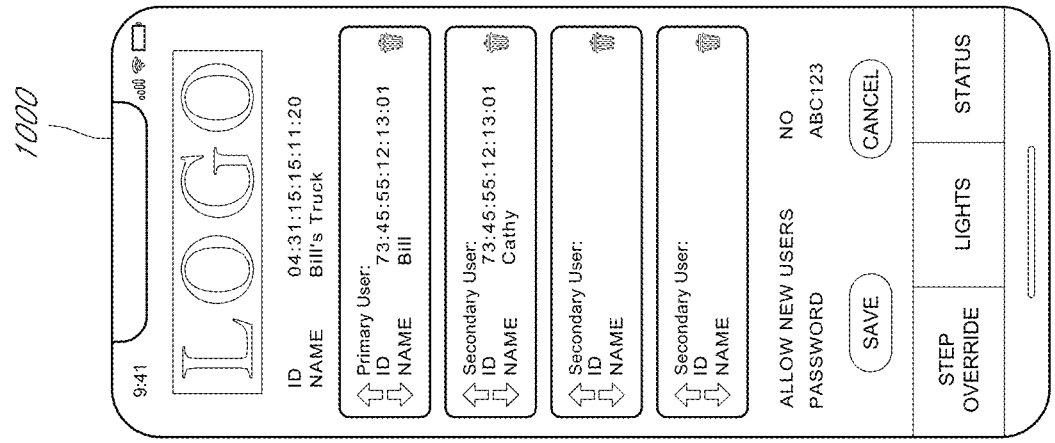
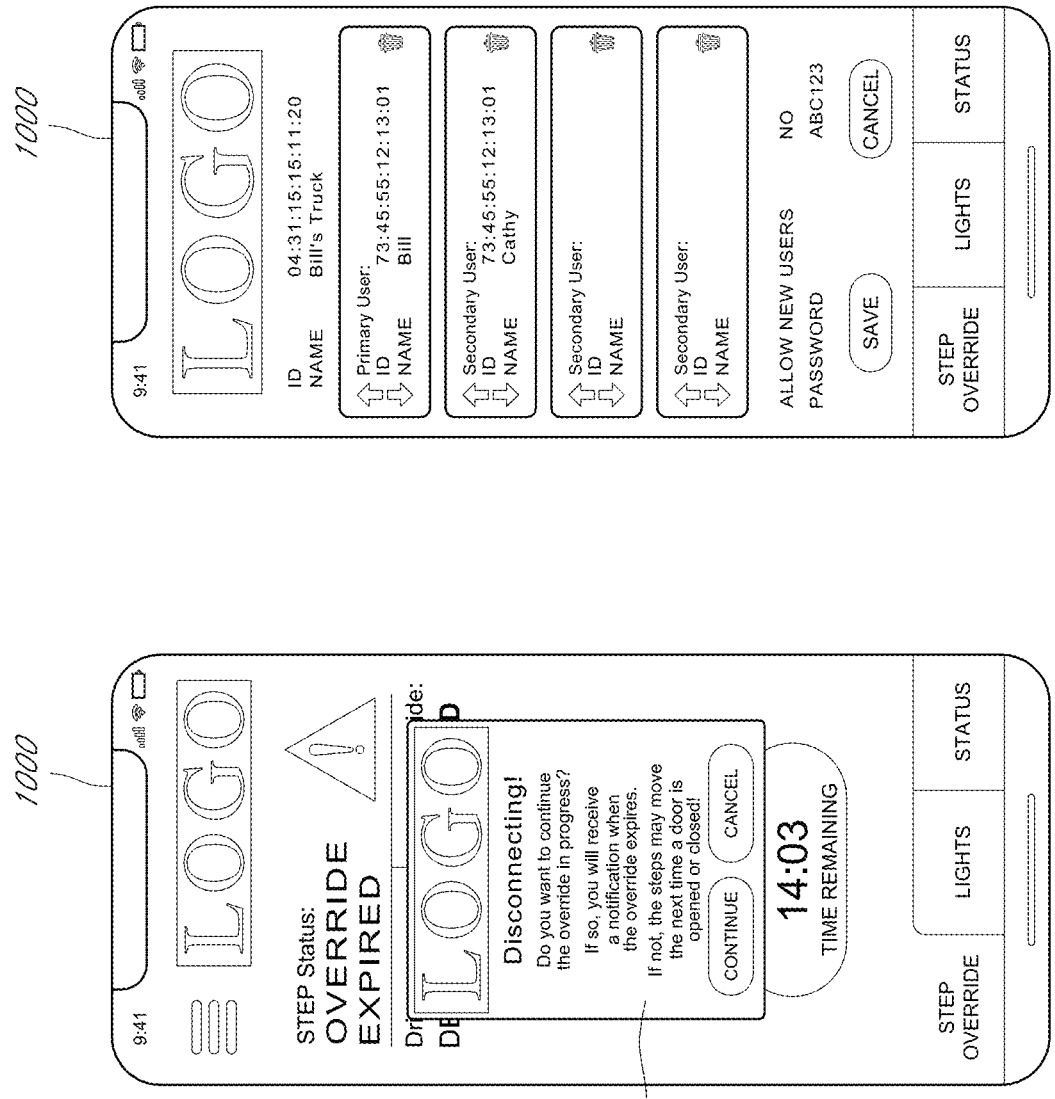
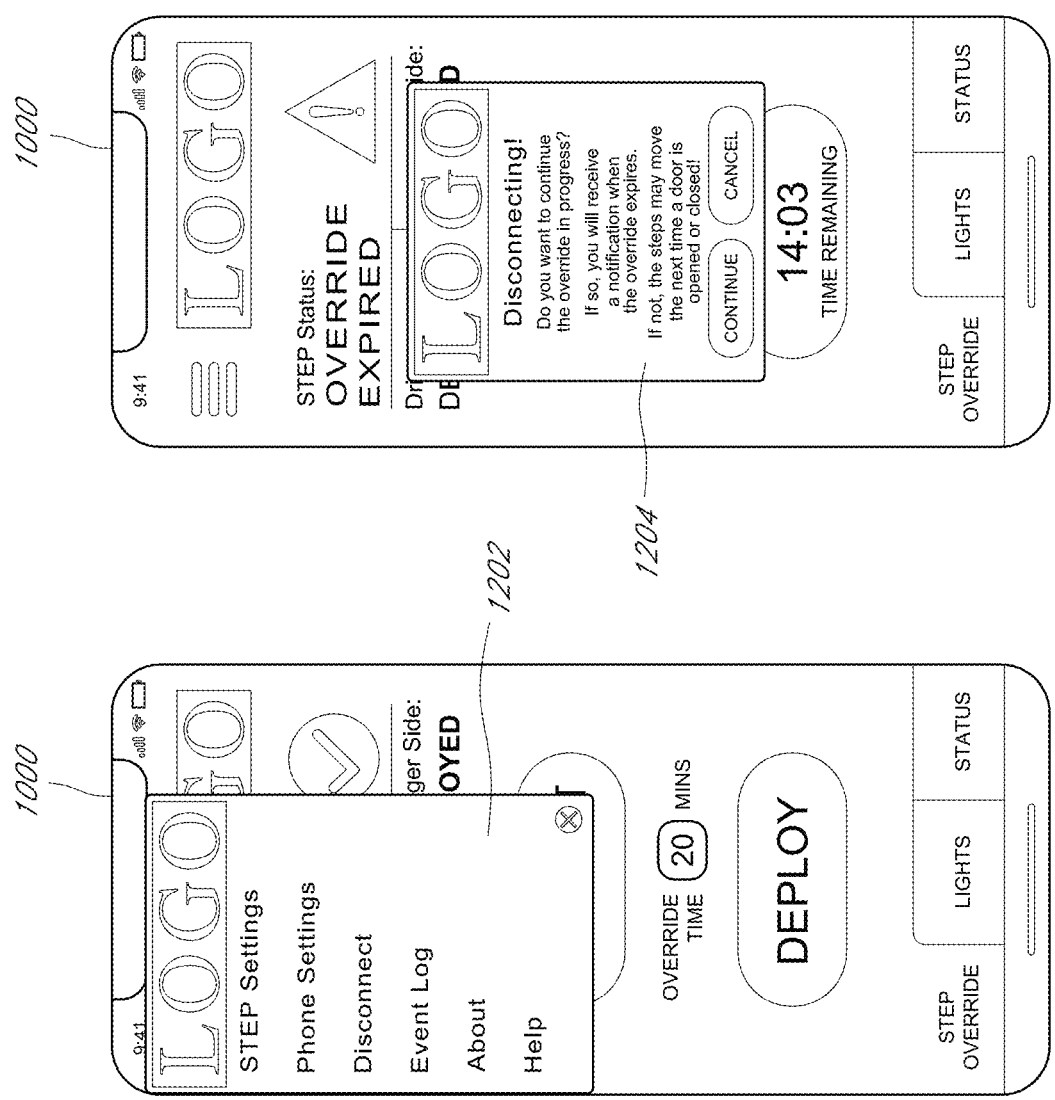
FIG. 12C
FIG. 12B
FIG. 12A

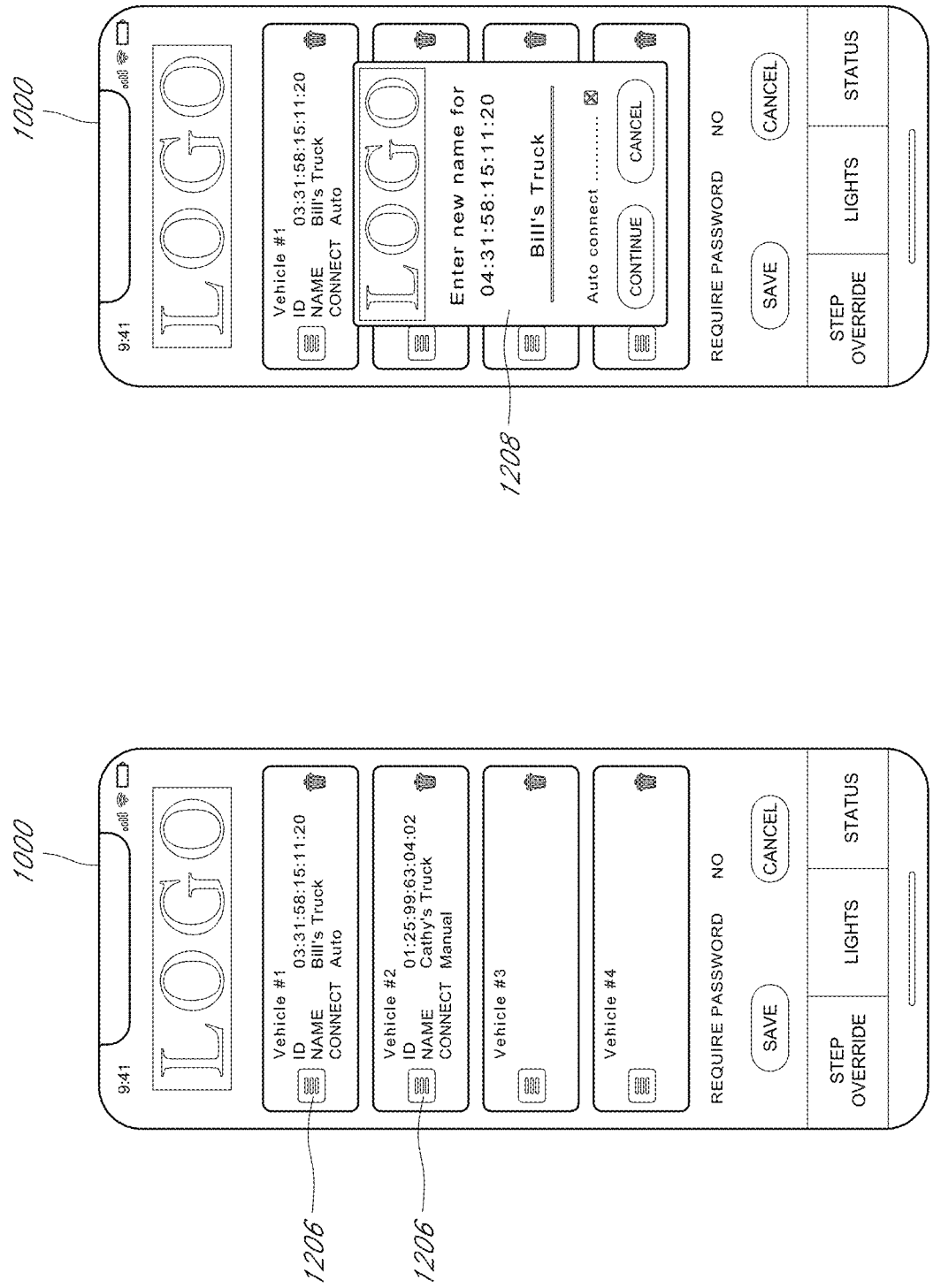

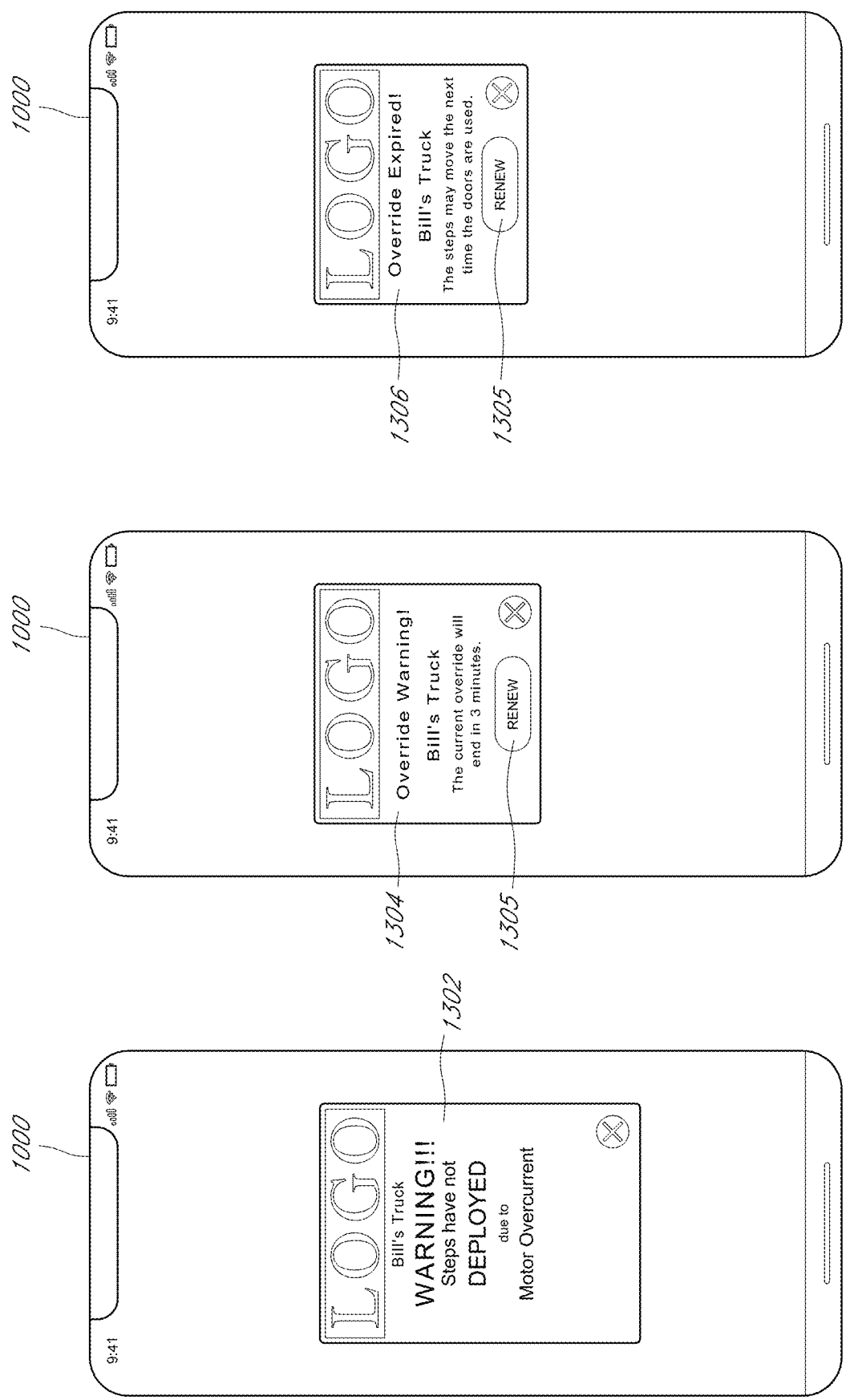

FIG. 15B

Advertising Packet Details

Advertising element 1

| 0 | 1 | 2 |
|---|---|---|
| Length | ADT | Flags |
| 02 | 01 | 06 |

Byte 0  Length
Byte 1  AD Type
Byte 2  Value 2 bytes
0x01 (Flags)
0x06 (LE General Discoverable Mode + BR/EDR Not Supported)

Advertising element 2

| 3 | 4 | 5 | 6 | 7 | 8 | 9 | 10 | 11 | 12 | 13 |
|---|---|---|---|---|---|---|----|----|----|----|
| Length | ADT | \multicolumn{9}{c}{Shortened Local Name} |
| 0A | 08 | 50 | 6F | 77 | 65 | 72 | 53 | 74 | 65 | 70 |

Byte 3        Length          10 bytes
Byte 4        AD Type         0x08 (Shortened Local Name)
Bytes 5 - 13  Name            "Step"

FIG. 15B (Con'd)
Advertising element 3

| 14 | 15 | 16 | 17 | 18 | 19 | 20 | 21 |
|----|----|----|----|----|----|----|----|
| Length | ADT | BTCID | | cAdvFormat | cID | | |
| 10 | FF | TBD | TBD | 01 | Varies | | |

| 22 | 23 | 24 | 25 | 26 | 27 | 28 | 29 | 30 |
|----|----|----|----|----|----|----|----|----|
| cControllerStatus | cStepFault | cStepPosition | cStepTime | | cDoorPosition | RFU | | |
| Varies | Varies | Varies | Varies | | Varies | FF | FF | FF |

| | | |
|---|---|---|
| Byte 14 | Length | 16 bytes |
| Byte 15 | AD Type | FF (Manufacturer Specific Data) |
| Bytes 16 - 17 | BTCID | TBD (BT SIG assigned Company identifier Code) |
| Byte 18 | cAdvFormat | Unique Advertising format |
| Bytes 19 - 21 | cID | Unique Controller identifier |
| Byte 22 | cControllerStatus | Operational status of the Controller |
| Byte 23 | cStepFault | Most recent step fault |
| Byte 24 | cStepPosition | Current step position |
| Bytes 25 - 26 | cStepTime | Remaining step time |
| Byte 27 | cDoorPosition | Current door position |
| Bytes 28 - 30 | RFU | Reserved for future use |

AUTOMATED RETRACTABLE VEHICLE STEP

CROSS-REFERENCE TO RELATED APPLICATIONS

This application is a continuation of U.S. patent application Ser. No. 17/338,531, filed Jun. 3, 2021, which is a continuation of U.S. patent application Ser. No. 16/667,734, filed Oct. 29, 2019, which claims the benefit of U.S. Provisional Application No. 62/832,115, filed Apr. 10, 2019, and which is also a continuation-in-part of U.S. patent application Ser. No. 16/136,091, filed Sep. 19, 2018, which is a continuation of U.S. patent application Ser. No. 15/792,562, filed Oct. 24, 2017, which is a continuation of U.S. patent application Ser. No. 15/344,178, filed Nov. 4, 2016, which is a continuation of U.S. patent application Ser. No. 14/977,404, filed Dec. 21, 2015, which is a continuation of U.S. patent application Ser. No. 14/169,626, filed Jan. 31, 2014, which claims the benefit of U.S. Provisional Application No. 61/898,674, filed Nov. 1, 2013. Each of the foregoing applications is hereby incorporated by reference herein in its entirety.

FIELD OF THE DISCLOSURE

The present disclosure relates generally to a stepping assist for motor vehicles. In particular, the disclosure relates to an automated retractable vehicle running board which is movable between a retracted or storage position and an extended, deployed position in which it functions as a step assist into the vehicle.

BACKGROUND OF THE DISCLOSURE

Running boards or similar stepping assists are sometimes added to the side of a motor vehicle, especially to a vehicle with a relatively high ground clearance. While some running boards and other stepping assists are fixed in place, others are movable between retracted and deployed positions. Some retractable vehicle steps are automated, where a powered drive system automatically deploys and retracts the running board, such as when a door on the step-side of the car is opened and closed, respectively. Automated retractable running boards and other step assists are often installed after-market, typically by skilled technicians.

SUMMARY

An automated step assist solution is needed that can be installed with reduced complexity and expense. The present disclosure relates to an automated retractable vehicle step system that can be installed in a relatively straightforward and cost effective manner. According to certain aspects, the step system can be installed by the purchaser in a "do it yourself" fashion without hiring out the install to a technician. The system according to some embodiments includes one or more components of the system that plug into, connect with, or otherwise interface with an existing vehicle connection to obtain door status or other information that is generated by existing vehicle electronics.

According to some embodiments, the step system can be remotely controlled by a remote device, such as a smartphone. The remote device may, for example, communicate wirelessly with a system controller to implement one or more features. For example, the remote device may act as a real-time display for the system, enable manual control of one or more features of the system, and/or enable a user to view and adjust one or more configuration settings for the system. In some embodiments, the system further includes a light that can be activated to, for example, illuminate the step when the step is in a deployed position. In some embodiments, activation of the light can also be controlled via the remote device. In some embodiments, the remote device can implement timed overrides of automatic step and/or light operation. In some embodiments, the remote device and/or the system controller implement a variety of safety and convenience features that allow for user-friendly and safe operation of the step system.

According to some embodiments, a remotely controlled retractable vehicle step system configured for use with a vehicle comprises: a stepping member having a stepping surface and being movable between a retracted position and a deployed position with respect to the vehicle; at least one support member connectable with respect to an underside of the vehicle and connected to the stepping member, the support member configured to at least partially support the stepping member with respect to the vehicle; a motor operably coupled to the support member and capable of effectuating movement of the stepping member from the retracted position to the deployed position; and a control system comprising a vehicle status interface configured to obtain data indicating a status of one or more vehicle features, a motor interface configured to control operation of the motor, and a wireless communication interface configured to communicate wirelessly with a remote electronic device, wherein the control system comprises at least two operational states comprising an automated state and an override state, wherein, in the automated state, the control system is configured to cause the motor to effectuate movement of the stepping member automatically responsive to a change in the status of the one or more vehicle features, and wherein the control system is further configured to: receive, from the remote electronic device via the wireless communication interface, a request to enter the override state; initialize a countdown timer for automatically ending the override state; and while the control system remains in the override state, refrain from causing the motor to effectuate movement of the stepping member automatically responsive to a change in the status of the one or more vehicle features.

In some embodiments, the countdown timer is initialized using a value received from the remote electronic device. In some embodiments, the countdown timer is initialized using a value stored in an electronic memory of the control system. In some embodiments, the request to enter the override state includes data indicating a desired override direction of the stepping member, and the control system is further configured to: if the desired override direction is deploy, and the stepping member is not in the deployed position, cause the motor to effectuate movement of the stepping member to the deployed position, and if the desired override direction is retract, and the stepping member is not in the retracted position, cause the motor to effectuate movement of the stepping member to the retracted position. In some embodiments, the remote electronic device comprises a user interface, and the user interface is configured to display a warning if the desired override direction will result in the stepping member moving when the control system transitions into the override state. In some embodiments, the control system is further configured to transmit, via the wireless communication interface, advertising packets at periodic intervals. In some embodiments, the advertising packets comprise data sufficient to enable the remote electronic device to determine a current position of the stepping member without the remote electronic device having to be currently connected to the control system. In some embodiments, the advertising packets comprise data sufficient to enable the remote electronic device to determine the status of the one or more vehicle features without the remote electronic device having to be currently connected to the control system. In some embodiments, the advertising packets comprise data sufficient to enable the remote electronic device to determine a status of the countdown timer without the remote electronic device having to be currently connected to the control system. In some embodiments, the control system further comprises an operational log database configured to store at least historical motor current values, and the control system is further configured to transmit at least some of the stored historical motor current values to the remote electronic device via the wireless communication interface. In some embodiments, the status of one or more vehicle features comprises a status of a vehicle door. In some embodiments, the remote electronic device is a smartphone. In some embodiments, the remote electronic device is a portable personal electronic device comprising a touchscreen user interface. In some embodiments, the vehicle status interface, the motor interface, and the wireless communication interface are part of a single hardware module. In some embodiments, the control system comprises a first hardware module that comprises the vehicle status interface, and the control system comprises a second hardware module, separate from the first hardware module, that comprises the motor interface, and wherein the first hardware module is configured to couple to an already existing vehicle port. In some embodiments, the first hardware module also comprises the wireless communication interface. In some embodiments, the first hardware module is configured to be positioned within a passenger compartment of the vehicle, and the second hardware module is configured to be positioned within an engine compartment of the vehicle. In some embodiments, the wireless communication interface is configured to communicate with the remote electronic device using a BLUETOOTH® Low Energy protocol. In some embodiments, the control system is further configured to cancel the override state early, prior to the countdown timer elapsing, responsive to a request from the remote electronic device to cancel the override state early. In some embodiments, the control system is configured to communicate with a plurality of remote electronic devices, each of which can request initiation of the override state, but the control system is further configured to only allow early cancellation of the override state by the remote electronic device that requested the current override state. In some embodiments, the control system is further configured to: automatically end the override state upon expiration of the countdown timer, and still refrain from causing the motor to effectuate movement of the stepping member until a change in the status of the one or more vehicle features is detected. In some embodiments, the control system further comprises a lighting interface configured to control operation of a step light that is positioned to illuminate the stepping member, wherein the control system comprises at least two lighting operational states comprising a step following state and a non-step following state, and the control system is configured to change a current lighting operational state in response to a request received from the remote electronic device via the wireless communication interface, wherein, in the step following state, the control system is configured to illuminate the step light responsive to the stepping member being deployed, and wherein, in the non-step following state, the control system is not configured to illuminate the step light responsive to the stepping member being deployed.

According to some embodiments, a method of remotely overriding automated control of a retractable vehicle step comprises: initiating a two-way wireless connection between a remote electronic device and an automated retractable vehicle step system that comprises a stepping member electronically movable between a retracted position and a deployed position, the retractable vehicle step system comprising an automated state wherein the stepping member moves automatically responsive to a change in a status of one or more vehicle features; receiving, from the automated retractable vehicle step system via the wireless connection, data indicating a current status of the stepping member; presenting, via the remote electronic device, an interactive graphical user interface that comprises at least an indication of the current status of the stepping member and one or more selectable elements for requesting that the automated retractable vehicle step system be placed into an override state with the stepping member in a desired override position; receiving, via the graphical user interface, a request to place the automated retractable vehicle step system into the override state with the stepping member in the desired override position; analyzing the current status of the stepping member and the desired override position to determine if initiating the override state will result in the stepping member moving from its current position; presenting, via the graphical user interface, responsive to determining that initiating the override state will result in the stepping member moving, a notification comprising a warning and a selectable confirmation element; and transmitting, responsive to a selection of the confirmation element, to the automated retractable vehicle step system via the wireless connection, override data that causes the automated retractable vehicle step system to initiate the override state and to effectuate movement of the stepping member to the desired override position.

In some embodiments, the one or more selectable elements comprises an override time input configured to receive a selection of an override time for use in initializing a countdown timer of the automated retractable vehicle step system to define when the override state is automatically ended, and wherein the override data transmitted to the automated retractable vehicle step system comprises the override time. In some embodiments, the method further comprises: presenting, via the graphical user interface, an indication of an amount of time remaining before the override state is automatically ended. In some embodiments, the method further comprises: presenting, via the graphical user interface a predetermined amount of time prior to the countdown timer elapsing, a notification comprising an indication that the override state is going to end and a selectable extension element; and transmitting, responsive to a selection of the extension element, to the automated retractable vehicle step system via the wireless connection, extension data that causes the countdown timer to be extended. In some embodiments, the method further comprises: receiving, from the automated retractable vehicle step system via the wireless connection, data indicating a current status of the countdown timer; and comparing the current status of the countdown timer to the predetermined amount of time to determine when to present the notification comprising the indication that the override state is going to end. In some embodiments, the method further comprises: discontinuing the two-way wireless connection between the remote electronic device and the automated retractable vehicle step system; monitoring, by the remote electronic device, advertising packets transmitted periodically by the automated retractable vehicle step system, the advertising packets comprising at least data indicating a current status of the countdown timer; analyzing, by the remote electronic device, the advertising packets to determine the current status of the countdown timer; comparing the current status of the countdown timer to the predetermined amount of time to determine when to present the notification comprising the indication that the override is going to end; and prior to transmitting the extension data, initiating a new two-way wireless connection between the remote electronic device and the automated retractable vehicle step system. In some embodiments, the method further comprises: maintaining, by the remote electronic device, a local countdown timer representative of a current status of the countdown timer of the automated retractable vehicle step system; and comparing the current status of the local countdown timer to the predetermined amount of time to determine when to present the notification comprising the indication that the override state is going to end. In some embodiments, the method further comprises: receiving, from the automated retractable vehicle step system via the wireless connection, motor current values; and storing the motor current values in an operational log database of the remote electronic device. In some embodiments, the method further comprises: analyzing, by the remote electronic device, historical motor current values stored in the operational log database to detect a motor current above a threshold level; and presenting, via the graphical user interface, an alert responsive to detecting the motor current above the threshold level. In some embodiments, the threshold level is dynamically determined by the remote electronic device based at least in part on an analysis of the historical motor current values.

Some embodiments comprise a computer readable, non-transitory storage medium having a computer program stored thereon for causing a suitably programmed remote electronic device to process by one or more processors computer program code to perform a method of remotely overriding automated control of a retractable vehicle step when the computer program is executed on the suitably programmed remote electronic device, the method comprising: initiating a two-way wireless connection between the remote electronic device and an automated retractable vehicle step system that comprises a stepping member electronically movable between a retracted position and a deployed position, the retractable vehicle step system comprising an automated state wherein the stepping member moves automatically responsive to a change in a status of one or more vehicle features; receiving, from the automated retractable vehicle step system via the wireless connection, data indicating a current status of the stepping member; presenting, via the remote electronic device, an interactive graphical user interface that comprises at least an indication of the current status of the stepping member and one or more selectable elements for requesting that the automated retractable vehicle step system be placed into an override state with the stepping member in a desired override position; receiving, via the graphical user interface, a request to place the automated retractable vehicle step system into the override state with the stepping member in the desired override position; analyzing the current status of the stepping member and the desired override position to determine if initiating the override state will result in the stepping member moving from its current position; presenting, via the graphical user interface, responsive to determining that initiating the override state will result in the stepping member moving, a notification comprising a warning and a selectable confirmation element; and transmitting, responsive to a selection of the confirmation element, to the automated retractable vehicle step system via the wireless connection, override data that causes the automated retractable vehicle step system to initiate the override state and to effectuate movement of the stepping member to the desired override position.

According to some embodiments, a remotely controlled retractable vehicle step system configured for use with a vehicle comprises: a stepping member having a stepping surface and being movable between a retracted position and a deployed position with respect to the vehicle; at least one support member connectable with respect to an underside of the vehicle and connected to the stepping member, the support member configured to at least partially support the stepping member with respect to the vehicle; a motor operably coupled to the support member and capable of effectuating movement of the stepping member from the retracted position to the deployed position; a light configured to illuminate the stepping member when activated; and a controller in electronic communication with the motor and the light, the controller comprising a wireless communication interface configured to communicate wirelessly with a remote electronic device, wherein the controller is configured to operate the motor and the light based at least in part on commands received from the remote electronic device.

In some embodiments, the remote electronic device comprises a fob. In some embodiments, the remote electronic device comprises a smartphone. In some embodiments, the controller is configured to operate the motor to deploy or retract the stepping member in response to a manual deployment command or a manual retraction command, respectively, received from the remote electronic device. In some embodiments, the controller is configured to operate the light to turn the light on or off in response to a manual light on or a manual light off command, respectively, received from the remote electronic device. In some embodiments, the controller is configured to transmit a real-time status of the position of the stepping member to the remote electronic device via the wireless communication interface. In some embodiments, the controller is configured to transmit a real-time status of the light to the remote electronic device via the wireless communication interface. In some embodiments, the system further comprises: a vehicle interface configured to connect with an already existing electronics port of the vehicle and to electronically receive data via the existing electronics port, the data generated by existing electronics port of the vehicle, wherein the controller further comprises an electronic memory configured to store an automatic step deployment setting, the automatic step deployment setting having an activated state and a deactivated state, and wherein the controller is further configured to: update the state of the automatic step deployment setting in response to data received from the remote electronic device, when the automatic step deployment setting is in the activated state, automatically operate the motor to deploy or retract the stepping member in response to data received from the existing electronic port, and when the automatic step deployment setting is in the deactivated state, not automatically operate the motor to deploy or retract the stepping member in response to data received from the existing electronic port. In some embodiments, the electronic memory is further configured to store an automatic lighting setting, the automatic lighting setting having an activated state and a deactivated state, and wherein the controller is further configured to: update the state of the automatic lighting setting in response to data received from the remote electronic device, when the automatic lighting setting is in the activated state, automatically operate the light in response to data received from the existing electronic port, and when the automatic lighting setting is in the deactivated state, not automatically operate the light in response to data received from the existing electronic port.

According to some embodiments, a remotely controlled retractable vehicle step system configured for use with a vehicle comprises: a stepping member having a stepping surface and being movable between a retracted position and a deployed position with respect to the vehicle; at least one support member connectable with respect to an underside of the vehicle and connected to the stepping member, the support member configured to at least partially support the stepping member with respect to the vehicle; a motor operably coupled to the support member and capable of effectuating movement of the stepping member from the retracted position to the deployed position; a controller in electronic communication with the motor, the controller comprising a wireless communication interface configured to communicate wirelessly with a remote electronic device; and a vehicle interface configured to connect with an already existing electronics port of the vehicle and to electronically receive data via the existing electronics port, the data generated by existing electronics port of the vehicle, wherein the controller further comprises an electronic memory configured to store an automatic step deployment setting, the automatic step deployment setting having an activated state and a deactivated state, and wherein the controller is further configured to: update the state of the automatic step deployment setting in response to data received from the remote electronic device, when the automatic step deployment setting is in the activated state, automatically operate the motor to deploy or retract the stepping member in response to data received from the existing electronic port, and when the automatic step deployment setting is in the deactivated state, not automatically operate the motor to deploy or retract the stepping member in response to data received from the existing electronic port.

In some embodiments, the electronic memory is further configured to store an automatic lighting setting, the automatic lighting setting having an activated state and a deactivated state, and wherein the controller is further configured to: update the state of the automatic lighting setting in response to data received from the remote electronic device, when the automatic lighting setting is in the activated state, automatically operate the light in response to data received from the existing electronic port, and when the automatic lighting setting is in the deactivated state, not automatically operate the light in response to data received from the existing electronic port.

According to some embodiments, a remotely controlled retractable vehicle step system configured for use with a vehicle comprises: a stepping member having a stepping surface and being movable between a retracted position and a deployed position with respect to the vehicle; at least one support member connectable with respect to an underside of the vehicle and connected to the stepping member, the support member configured to at least partially support the stepping member with respect to the vehicle; a motor operably coupled to the support member and capable of effectuating movement of the stepping member from the retracted position to the deployed position; a light configured to illuminate the stepping member when activated; and a controller in electronic communication with the motor and the light, the controller comprising a wireless communication interface configured to communicate wirelessly with a remote electronic device, wherein the controller is configured to transmit a real-time status of the position of the stepping member to the remote electronic device via the wireless communication interface, and wherein the controller is configured to transmit a real-time status of the light to the remote electronic device via the wireless communication interface.

In some embodiments, step system installation can be performed without significant disassembly and/or modification of the doors and/or other parts of the vehicle, e.g., without installation of special in-door componentry, removal of door paneling, etc. Embodiments of the step system interface with and leverage existing vehicle componentry to detect door opening and closing events, or to otherwise identify proper conditions for effectuating automated movement of the step. Thus, some step systems described herein do not include after-market installed componentry on or around the door for detecting triggering conditions used in moving the step.

Additionally, according to certain aspects, installation of the step system desirably does not involve cutting, splicing, or tapping into existing vehicle wiring, such as wiring residing in the vehicle doors or in the immediate vicinity of the doors (e.g., on the door frames or door sills). Rather, the step system in some cases includes a connector that interfaces with existing accessible vehicle connectors or ports to obtain information from the vehicle that is usable in identifying triggering conditions for automated movement of the step (e.g., identifying door openings and closings). The system according to some aspects obtains the information via one or more existing communication buses of the vehicle, e.g., via a digital interface such as a serial data link. Some preferred embodiments plug into or otherwise interface with an on-board diagnostic (OBD) port, for example. The step system according to additional embodiments can interface with ports of existing vehicle computing systems or subsystems such as a body control module (BCM) or another electronic control unit (ECU).

The automated system can additionally include a pass-through function and a replica of the existing vehicle port. This can provide ready access to the existing vehicle port functionality even while the step system is installed and the original port is occupied.

Moreover, step assemblies according to certain aspects primarily or exclusively include wired connections to the existing vehicle and/or amongst components of the step system. For instance, a controller of the step system may connect via a wired connection to existing vehicle electronics to access door opening and closing information or other information sufficient to control step movement. Additionally, in certain embodiments the assembly relies on door opening and closing information that is generated by wired vehicle componentry (e.g., in-door circuitry wired to a mechanical door latch) not incorporating wireless sensors or other componentry, and desirably may convey this information via wires to a step assist control, such as an electronic step assist control module.

According to certain aspects, a powered retractable vehicle step assist system is configured for use with a vehicle. The step assist system can include a stepping member having a stepping surface and movable between a retracted position and a deployed position with respect to the vehicle. At least one support member may be connectable with respect to an underside of the vehicle and connected to the stepping member. The support member can be configured to at least partially support the stepping member with respect to the vehicle. The system can further include a motor operably coupled to the support member and capable of effectuating movement of the stepping member from the retracted position to the deployed position. A vehicle interface of the system can be configured to connect with an already existing electronics port of the vehicle. The vehicle interface can also be configured to electronically receive data via the existing electronics port, where the data generated by existing electronics of the vehicle. The system can also include a controller in electronic communication with the motor. The controller can be configured, in response to the data received from the already existing electronics port, to cause the motor to effectuate movement of the stepping member between the retracted position and the deployed position.

In some embodiments, the vehicle interface implements a serial digital interface, and the existing electronics port provides the data to the vehicle interface as serial digital data. The existing electronics port can be an on-board diagnostic (OBD) port, for example. The existing vehicle electronics can include a body control module (BCM).

The vehicle interface can in some implementations include an electrical connector configured to directly attach to the already existing electronics port of the vehicle. The electrical connector of the vehicle interface may be configured to mate with the already existing electronics port via an interference fit, for instance. The system may include wired connection between the vehicle interface and the controller.

In various implementations, the vehicle interface includes a first connector configured to connect to the existing electronics port and further includes a replica connector. The vehicle interface may be configured to forward the data received from the existing electronics port to the replica connector, for example. The vehicle interface can include a cable spanning between the first connector and the replica connector. The vehicle interface can include a second replica connector, where the controller is coupled to the vehicle interface via connection to the second replica connector, for example. In some embodiments, the first connector and the replica connector are provided on a common housing.

According to certain implementations, the controller commands the motor to effectuate movement of the stepping member between the retracted position and the deployed position in response to determining that a vehicle door has opened.

In some embodiments, the data comprises door opened/closed status information originating from door electronics that does not incorporate any wireless sensors to detect door opened/closed status.

According to additional aspects, a method is provided of controlling movement of a powered, retractable vehicle step supported by an underside of a vehicle. The method can include, with an electronic connector attached to an already existing electronics port of the vehicle, electronically receiving data generated by already existing vehicle electronics. The method can further include processing the data using one or more hardware processors according to a step movement algorithm. Based at least partly on the processing, the method can further include electronically initiating movement of the powered vehicle step between a retracted position and a deployed position. In some configurations, the electronic connector is attached to the existing electronics port via a plug in connection.

According to yet other aspects, a method is provided of controlling an after-market powered vehicle step system installed on a vehicle. The method can include electronically obtaining door status information from a digital communication bus of the vehicle. The method can further include electronically processing the door status information according to an algorithm to determine that movement of a stepping deck of the powered vehicle step is appropriate. Additionally, the method can include commanding a motor of the powered vehicle step which is drivably coupled to the stepping deck to cause movement of the stepping deck between a retracted position and a deployed position.

According to certain embodiments, the step of electronically obtaining can include obtaining the door status information via a pre-existing connector of the vehicle. The method can further include transmitting the door status information to electronic componentry of the step system via a wired connection. In some embodiments, the step of electronically obtaining includes obtaining the door status information via a plug-in connection to the digital communication bus.

The door status information can be generated by pre-existing componentry of the vehicle. In some embodiments, the door status information is generated in response to user actuation of a handle of a door of the vehicle. Moreover, the door status information can be obtained in some embodiments without reliance on disassembly of any portion of any door of the vehicle. The door status information can be provided to the step system via an existing electrical connector of the vehicle without reliance on modification of existing electrical componentry of the vehicle.

According to other aspects of the disclosure, a powered retractable vehicle step assist system is configured for use with a vehicle. The step system can include a stepping member movable between a retracted position and a deployed position with respect to the vehicle. The system can further include a drive unit operably coupled to the support member and capable of effectuating movement of the stepping member from the retracted position to the deployed position. A vehicle interface can be included that is configured to electronically communicate with an electronics port of the vehicle. The system can further include a controller configured to process information received from the vehicle interface and, based at least partly on the processing of the information, to cause movement of the stepping member between the retracted position and the deployed position. The information can be generated by existing vehicle electronics, for example. In some embodiments, the information comprises door status information generated by a car door module of the vehicle.

According to yet another aspect, a method is provided of installing an automated vehicle step assist system to a vehicle. The method can include electrically connecting control electronics of the step assist system to an existing power source of the vehicle. The method can further include mounting the control electronics of the step assist system on the vehicle. In addition, the method can include mounting a step of the step assist system with respect to the vehicle such that a stepping deck of the step is capable of powered movement between retracted and deployed positions. The method can further include securing a motor of the step assist system to the vehicle, where the motor in electrical communication with the control electronics and drivably coupled to the step to provide the powered movement of the stepping deck. The method can also include interfacing with an existing communication bus of the vehicle such that electronic information obtained via the existing communication bus is communicated to the control electronics of the step assist system. The step of interfacing can include mating a connector of the step assist system with an existing connector of the vehicle. The method can further include repositioning the existing connector of the vehicle and fastening a replica port of the step assist system to an accessible location in the vehicle.

In some embodiments, the replica port is positioned in substantially the original location of the existing connector of the vehicle. In certain implementations, the interfacing does not involve disassembly of the vehicle. The step of interfacing in some embodiments includes establishing a wired connection between the existing communication bus and the control electronics of the step assist system. The installation can be performed after market, for example.

According to further embodiments, a method is disclosed of providing a powered vehicle step assist configured for use with a vehicle, the method can include providing a stepping member having a stepping surface and movable between a retracted position and a deployed position with respect to the vehicle. The method can further include providing at least one support member connectable with respect to an underside of the vehicle and connected to the stepping member, the support member configured to at least partially support the stepping member with respect to the vehicle. In addition, the method can include providing a motor operably coupled to the support member and capable of effectuating movement of the stepping member from the retracted position to the deployed position. The method can also include providing a connector configured to mate with an already existing electronics port of the vehicle and to electronically receive data via the electronics port, the data generated by existing electronics of the vehicle. The method can in some cases also include providing a controller in electronic communication with the motor. The controller can be, in response to the data received from the already existing electronics port, to cause the motor to effectuate movement of the stepping member between the retracted position and the deployed position.

BRIEF DESCRIPTION OF THE DRAWINGS

FIGS. 8A and 8B are block diagrams illustrating additional examples of remotely controllable step and lighting systems.

FIGS. 9A-9H illustrate an example embodiment of a graphical user interface presented by a remote electronic device of a remotely controllable step and lighting system.

FIGS. 11A-11C illustrate additional gra user interface features of the remote electronic device of FIGS. 9A-9H relating to system status.

FIGS. 12A-12E illustrate additional graphical user interface features of the remote electronic device of FIGS. 9A-9H relating to system configurations.

FIGS. 13A-13C illustrate additional graphical user interface features of the remote electronic device of FIGS. 9A-9H relating to system notifications.

FIG. 15B illustrates an example advertising packet protocol for use in providing information to the remote electronic device in performing the method of FIG. 15A.

DETAILED DESCRIPTION

Figure 1A:
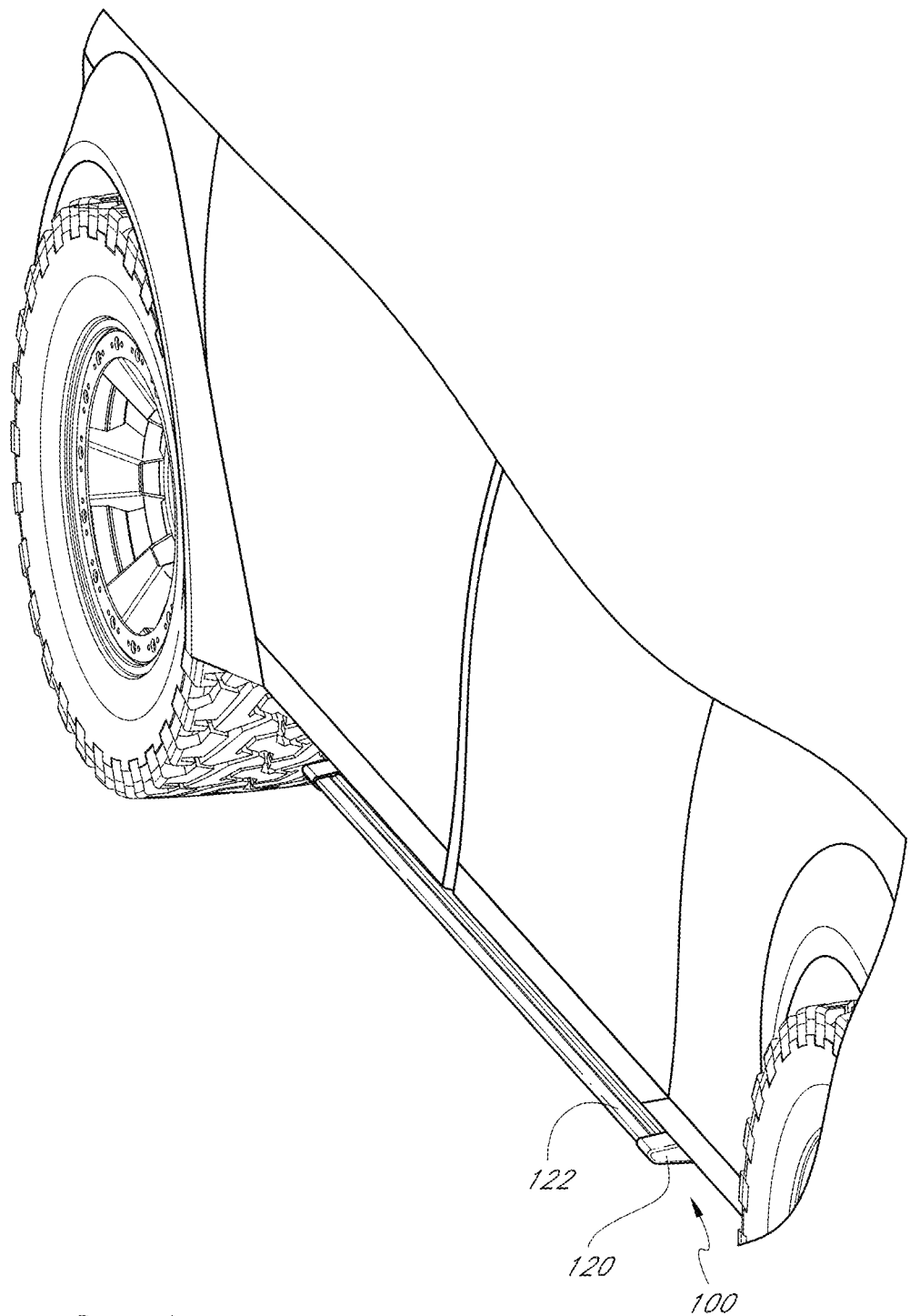
FIGS. 1A-1B illustrate an embodiment of a retractable running board installed on a vehicle, in retracted (FIG. 1A) and deployed (FIG. 1B) positions.

For purposes of summarizing the disclosure, certain aspects, advantages and novel features of the disclosures have been described herein. It is to be understood that not necessarily all such advantages can be achieved in accordance with any particular embodiment of the disclosures disclosed herein. Thus, the disclosures disclosed herein can be embodied or carried out in a manner that achieves or optimizes one advantage or group of advantages as taught herein without necessarily achieving other advantages as can be taught or suggested herein.

The terms "existing", "pre-existing", "pre-installed", "at manufacture", and other similar terms, are used herein to refer to certain vehicle componentry. Such terms can refer to vehicle componentry installed when the vehicle was originally assembled, as opposed to componentry installed aftermarket. These terms can additionally encompass replacement parts, such as installed replacement parts manufactured by the original equipment manufacturer (OEM).

The present disclosure describes, among other things, retractable step systems that can be remotely controlled by a remote device, such as a smartphone. The remote device may, for example, communicate wirelessly with a system controller to implement one or more features. For example, the remote device may act as a real-time display for the system, enable manual control of one or more features of the system, and/or enable a user to view and adjust one or more configuration settings for the system. In some embodiments, the system further includes a light that can be activated to, for example, illuminate the step when the step is in a deployed position. In some embodiments, activation of the light can also be controlled via the remote device.

In some embodiments, a remotely controllable retractable step system as disclosed herein implements a sophisticated override system that can enhance the safety and usefulness of the retractable step system. Further, systems as disclosed herein may comprise logging and/or monitoring of system parameters that can be communicated to a remote control device for use in fault detection, troubleshooting, and/or the like.

Various embodiments are described herein and shown in the drawings, including some embodiments that are shown as including certain remote control features. For example, FIGS. 7, 8A, 8B, 17, 18A, and 18B each illustrate embodiments of remotely controllable retractable step and lighting systems wherein a remote device 1000 communicates wirelessly with some other portion of the system. Although some drawings, such as FIGS. 1A-6, do not illustrate remote control features, the remote control features illustrated in other figures and/or discussed throughout the description can be used with any embodiment disclosed herein, including embodiments described with reference to FIGS. 1A-6.

Figure 1B:
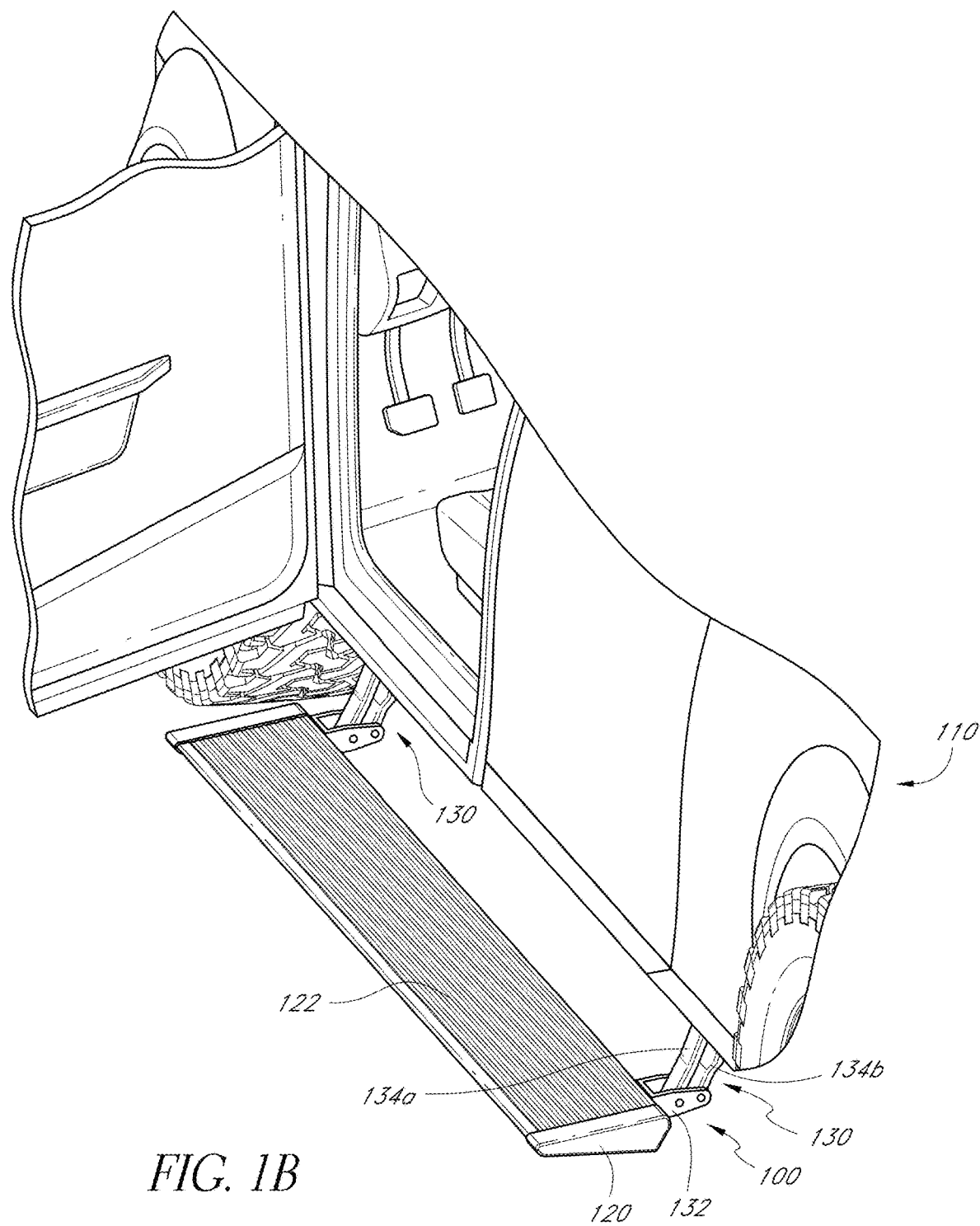

FIGS. 1A-1B illustrate one illustrative example of a retractable running-board step assist 100 attached to an underside of a vehicle 110, in retracted (FIG. 1A) and deployed (FIG. 1B) positions. The step assist 100 can be mounted to any type of motor vehicle suitable for accommodating a step assist, including light duty and heavy duty trucks, sport utility vehicles, vans, sedans, hatchbacks, etc.

The illustrated step assist 100 includes a stepping member or deck 120 having an upper step surface 122. It is readily seen that the stepping deck 120 provides a convenient step assist for a person desiring to enter the vehicle 110 through either of the front and rear vehicle doors.

The exemplary step assist 100 further includes respective support assemblies 130 each of which terminate at a first end attached towards a respective end of the stepping deck 120 and at a second end attached to or otherwise supported by the underside of the vehicle 110. Although a variety of configurations are possible, each support assembly 130 in the illustrated embodiment includes a support bracket 132 attached towards or at an end of the stepping deck 120 and pivotably coupled to a pair of support arms 134*a*, 134*b*. The support arms 134*a*, 134*b* are in turn mounted to the underside of the vehicle 110, via a rigid mount frame (not shown) or other appropriate mechanism.

As shown, the step assist 100 is provided on one side of the vehicle 110, underneath the front and rear vehicle doors. One or more additional step assists may be provided at other locations such as the other side of the vehicle 110 or on the rear of the vehicle in conjunction with a rear door, hatch, tailgate, etc.

Figure 4:
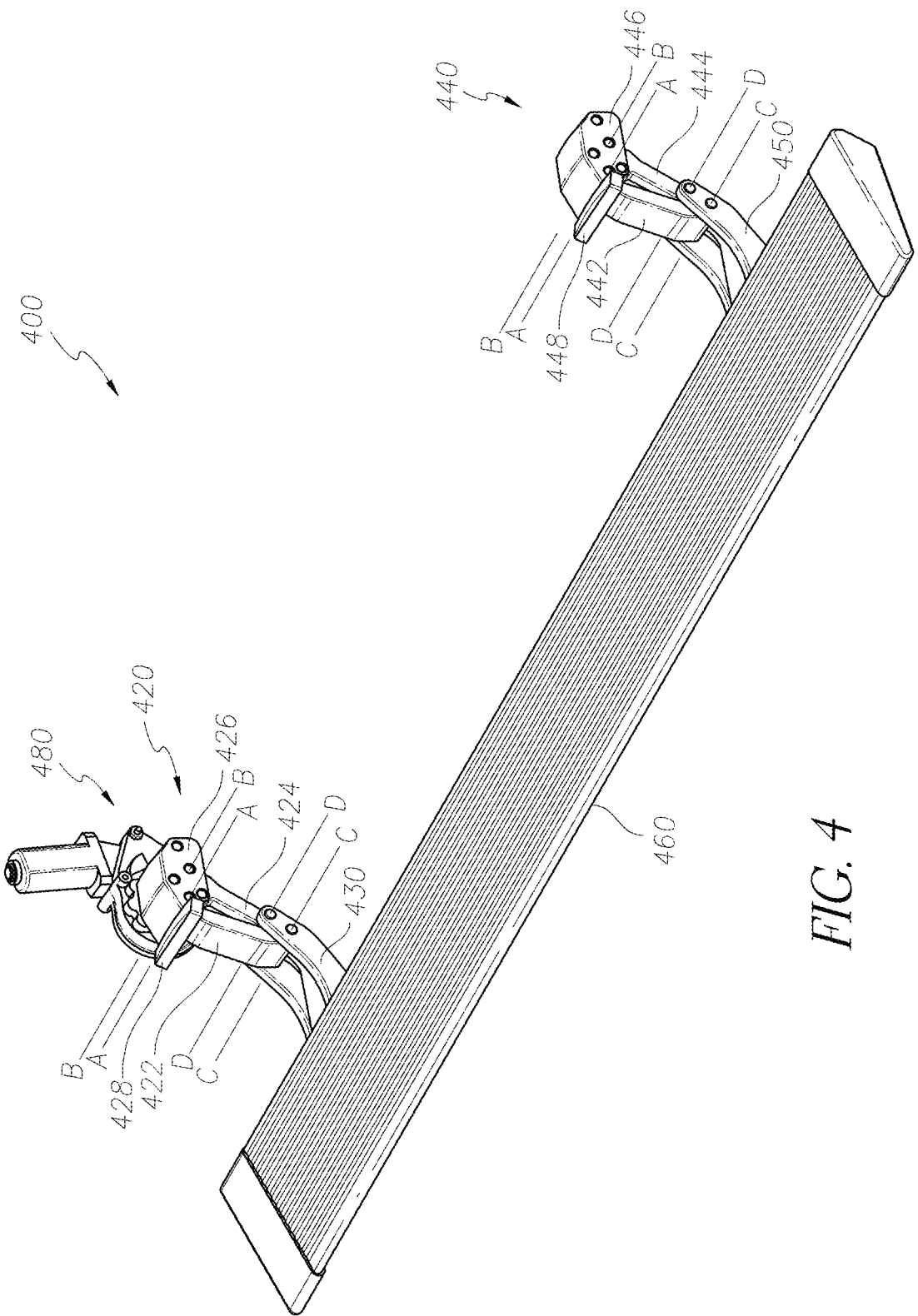
FIG. 4 is a perspective view of one example of a retractable vehicle step.

The step assist 100 shown in FIGS. 1A-1B is merely one illustrative example. Compatible step assists 100 can vary. For instance, the illustrated step assist 100 spans the length of both front and rear doors and can therefore assist passengers with entering and exiting both front and rear doors. In other cases a shorter stepping deck 120 is provided, which may span the length of only a single door or a portion thereof. Another more detailed example of a step assist that can be incorporated into any of the step systems described herein is shown in FIG. 4, described below. Further examples of compatible step assists are described throughout the disclosure, as well as in U.S. Pat. No. 8,157,277, titled "Retractable Vehicle Step", issued on Apr. 17, 2012, and U.S. Pat. No. 7,367,574, titled "Drive Systems for Retractable Vehicle Step", issued on May 6, 2008, the entire disclosures of which are incorporated by reference herein.

The step assist 100 is configured for automated, powered retraction and deployment. For instance, the step assist 100 can form part of an automated step system including a drive unit that includes a motor drivably coupled to the step assist 100, e.g., via one or more of the support arms 134*a*, 134*b*, for powered retraction and deployment of the stepping deck 120.

Figure 2A:
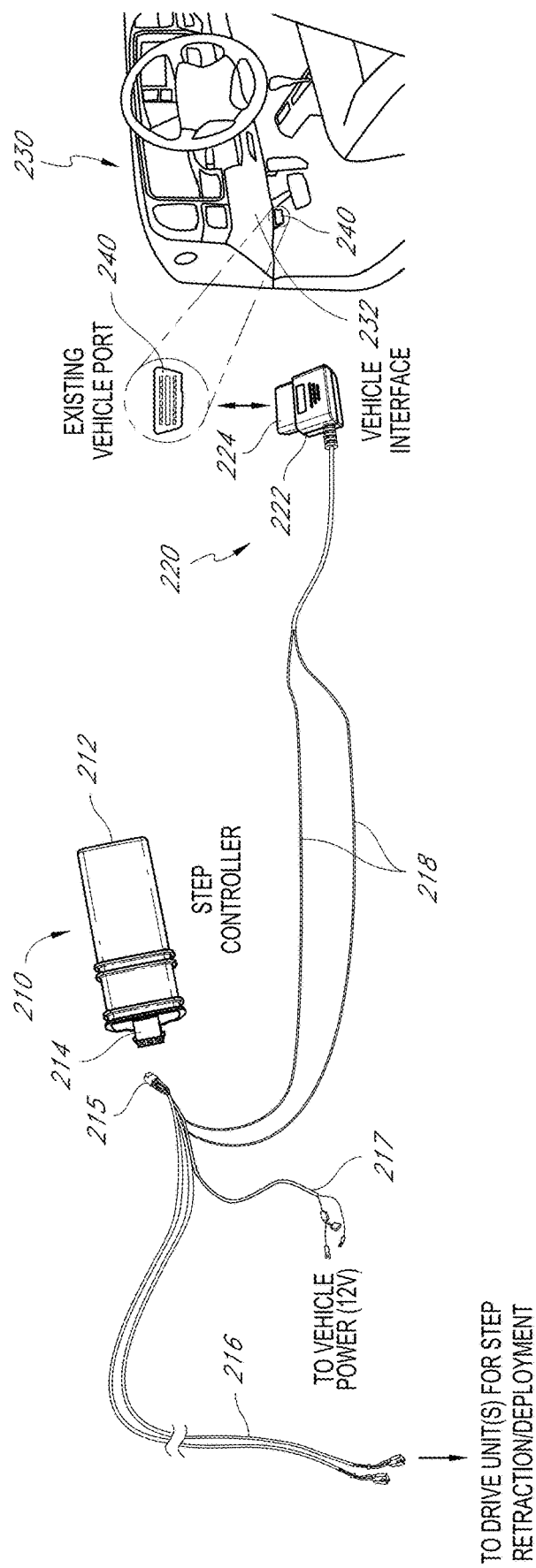
FIG. 2A illustrates portions of an automated step system including a vehicle interface that cooperates with an existing vehicle port, according to an embodiment.

The automated step system can further include a controller (not shown) that instructs the motor to effectuate movement of the step assist 100. The controller can be in communication with existing vehicle systems via a vehicle interface of the step system. FIG. 2A illustrates a controller 210 and vehicle interface 220 of an embodiment of an automated step system configured for use with a vehicle 230. While only the controller 210 and vehicle interface 220 of the step system are shown for illustrative purposes, it is to be understood that embodiments of the step system, including the illustrated embodiment, include additional componentry such as a drive assembly, stepping deck, etc., such as is shown and described herein, e.g., with respect to FIGS. 3 and 4.

As indicated, the illustrated controller 210 includes a housing 212 having at least one connector 214 configured to mate with at least one corresponding connector 215, thereby connecting the controller 210 with wiring 216, 217, 218 of the step system. For instance, the illustrated controller 210 is in communication with a motor and/or other components of a drive unit of the step system via the wiring 216, receives power via the wiring 217, and is in communication with the vehicle interface 220 via the wiring 218. In some configurations, the wiring 217 is connected to an existing vehicle battery, thereby delivering power to the automated vehicle step system without necessitating a separate power supply. In alternative embodiments, the step system connects to the vehicle battery indirectly, such as through a power socket located in the vehicle interior, or includes a separate power supply.

The controller 210 includes control electronics (not shown) which, in the illustrated embodiment reside within the housing 212. For example, the control electronics can include one or more hardware processors comprising digital logic circuitry (e.g., one or more microcontrollers executing software and/or firmware), computer memory, and other appropriate circuitry. The control electronics is generally configured to process data received from the vehicle interface 220 and issue commands to the drive assembly of the step system to control powered movement of the step assist.

The vehicle interface 220 includes a connector module 222 having a port 224 that is configured for mechanical and electrical cooperation with an existing port 240 of the vehicle 230. In the illustrated embodiment, the port 224 implements a friction fit with the existing vehicle port 240, although a variety of other mating mechanisms are possible instead of, or in combination with a friction fit, including latch, interference, or snap-fit mechanisms, mechanisms including fastening screws, and the like. While the illustrated connector module 222 attaches directly to the existing vehicle port 240, in some alternative configurations an adaptor or other component (e.g., an after-market adaptor) may be attached to and interposed between the existing vehicle port 240 and the vehicle interface 220.

The existing vehicle port 240 is in communication with one or more existing electronic systems of the vehicle 230, and provides vehicle status information. The vehicle interface 220 of the step system receives this information via the electrical connection between its port 224 and the existing vehicle port 240. As is described further, the status information of certain embodiments (including the illustrated embodiment) includes, without limitation, information relating to the status of one or more doors of the vehicle 230, usable in identifying conditions for deploying/retracting the stepping member.

The step system in some embodiments such as those of FIGS. 2A-2F obtains information over an existing electrical communication bus of the vehicle that is usable to determine when to move the step. For instance, the step system obtains information over a digital communications bus such as a serial communications link. Such communications buses can be provided over the existing vehicle port 240, such as a serial digital interface provided on an OBD-II port.

Installation of embodiments of the step system such as those of FIGS. 2A-2F desirably rely on accessible vehicle communication ports without cutting, splicing, or tapping into existing vehicle wiring, such as wiring residing in or around the vehicle doors, or elsewhere in the vehicle. Rather, such step systems leverage entirely or substantially entirely existing componentry (e.g., manufacturer installed or OEM componentry) to obtain door opening or closing information via an existing communication bus of the vehicle.

In addition, the step systems of certain embodiments including the ones depicted in FIGS. 2A-2F incorporate wired as opposed to wireless connections, e.g., between the drive assembly and the controller 210 via the wiring 216, between the vehicle interface 220 and the controller 210 via the wiring 218, and/or between the vehicle interface 220 and the existing vehicle port 240. This can significantly simplify the design, increasing operational robustness and reducing costs. For instance, wireless systems can be costly and in some cases are susceptible to interfere with or be subject to interference from other wireless signals in the proximity of the vehicle. In some alternative embodiments, one or more of the above-listed connections incorporate a wireless interface.

Moreover, step systems such as those depicted in FIGS. 2A-2F obtain door opening and closing information (or for otherwise determining when to move the step) via an accessible communication bus of the vehicle while relying solely or primarily on existing, pre-installed componentry to provide the information over the bus. For instance, installation of the embodiments of FIGS. 2A-2F do not involve installation of after-market componentry in the vehicle doors, in the immediate vicinity thereof (e.g., the door sills and door frame), or otherwise. Instead, the existing vehicle port 240 provides such information. This can be especially beneficial in contrast to solutions that rely on after-market installation of sensing componentry on the door or in the vicinity of the door to detect door opening and closing events. This is at least partly because such systems can include costly and complex componentry that can become dislodged or damaged due to the forces associated with repeated door opening and closing, particularly over long periods of time. In contrast, manufacturer installed and OEM parts (e.g., existing door latches and associated electronics) typically undergo extensive quality control measures under highly regulated conditions, and are also integrated into the original vehicle design. Such components are therefore more likely to withstand such wear and tear over time. Nonetheless, in some alternative embodiments, the step system can incorporate some amount of after-market componentry for detecting door opening/closing events.

In one embodiment, the vehicle interface 220 includes processing electronics (not shown) configured to process the information received from the existing vehicle port 240. The processing electronics can reside within the housing of the connector module 222 and can include one or more hardware processors comprising digital logic circuitry (e.g., one or more microcontrollers executing software and/or firmware), memory, and other appropriate circuitry. The processing module can further include circuitry configured to condition the received signals for delivery to the step controller 210 via the wiring. In some embodiments, the processing module converts the information received from the existing vehicle port 240 into a protocol or format that is understandable by the controller 210. In one embodiment, the processing electronics converts information received from the existing vehicle port 240 from a first format (e.g., an OBD-II compliant serial format) into a second format (e.g., an RS232 serial interface). The processing electronics can in some cases perform additional data processing. For instance, the processing electronics may identify information relevant to operation of the automated step system (e.g., information relating to the operation and status of the vehicle doors) for delivery to the controller 210, while filtering out other data not relevant to step system operation (e.g., certain engine status information or the like). For example, the vehicle interface 220 can process the information received over the vehicle port 240 and provide outputs to the controller 210 indicate the state of the drivers and/or passenger side doors. In yet other configurations, the connector module 222 forwards the received information to the controller 210 without manipulating the received information. In such cases, the control electronics of the controller 210 may implement some or all of the functionality described with respect to the processing electronics of the vehicle interface 220.

The illustrated example shows the existing vehicle port 240 located under the dashboard 232 above the passenger side foot well of the vehicle 230, although a variety of other locations are possible. For instance, depending on the embodiment, the existing vehicle port 240 may be positioned anywhere on the interior or exterior of the vehicle, including, without limitation, in the glove compartment, on the dashboard, in the engine compartment under the hood, in the trunk, on the underside of the vehicle 230, or somewhere on or in the center console between the driver and passenger seats. In certain embodiments, the existing vehicle port 240 is positioned at a location such that it is accessible for connection thereto without removing or disassembly existing parts of the vehicle 230.

The existing vehicle port 240 can generally comprise any pre-existing (e.g., factory installed) port that provides access to the existing electronics systems of the vehicle 230. For instance, the existing vehicle port 240 in the illustrated and other embodiments can be an on-board diagnostic (OBD) port. Depending on the embodiment, the existing vehicle port 240 can be compliant with any appropriate OBD standard, including without limitation the following: ALDL, OBD-I, OBD-1.5, OBD-II, European On-board Diagnostics (EOBD), EOBD2, Japan On-board Diagnostics (JOBD), and Australian OBD standards (e.g., ADR 79/01 and 79/02). The existing vehicle port 240 can be compliant with the OBD-II standard mandated by the federal Clean Air Act Amendments of 1990, for example. Where the existing port 240 is an OBD-II port, it may further provide data in a manner that is compliant with one or more of the serial data protocols defined in the SAE J1850 standards document, such as the SAE J1850 pulse-width modulation (PWM) and SAE J1850 VPW (variable pulse width) protocols. In some cases, the existing vehicle port 240 complies with the SAE J1962 standards document defining the physical connector for the OBD-II interface, and which specifies the 16-pin arrangement set forth in the table provided below.

| Pin | Signal Description |
| --- | --- |
| 1 | Manufacturer discretion. GM: J2411 GMLAN/SWC/Single-Wire CAN. VW/Audi: Switched +12 to tell a scan tool whether the ignition is on. |
| 2 | Bus positive Line of SAE-J1850 PWM and SAE-1850 VPW |
| 3 | Ford DCL(+) Argentina, Brazil (pre OBD-II) 1997-2000, USA, Europe, etc. Chrysler CCD Bus(+) |
| 4 | Chassis ground |
| 5 | Signal ground |
| 6 | CAN high (ISO 15765-4 and SAE-J2284) |
| 7 | K line of ISO 9141-2 and ISO 14230-4 |
| 8 | Manufacturer discretion. Many BMWs: A second K-Line for non OBD-II (Body/Chassis/Infotainment) systems. |
| 9 | Manufacturer discretion. GM: 8192 baud ALDL where fitted. |
| 10 | Bus negative Line of SAE-J1850 PWM only (not SAE-1850 VPW) |
| 11 | Ford DCL(-) Argentina, Brazil (pre OBD-II) 1997-2000, USA, Europe, etc. Chrysler CCD Bus(-) |
| 12 | — |
| 13 | Manufacturer discretion Ford: FEPS-Programming PCM voltage |
| 14 | CAN low (ISO 15765-4 and SAE-J2284) |
| 15 | L line of ISO 9141-2 and ISO 14230-4 |
| 16 | Battery voltage |

In various embodiments, the vehicle interface 220 can be configured to cooperate with a variety of other types of existing vehicle ports 240 other than OBD ports, such as a port of a body control module (BCM) or other electronic control unit (ECU) of the vehicle 230. Further details regarding compatible existing vehicle ports and the types of information received from the existing vehicle port are provided herein, with respect to FIG. 3, for example.

Figure 2B:
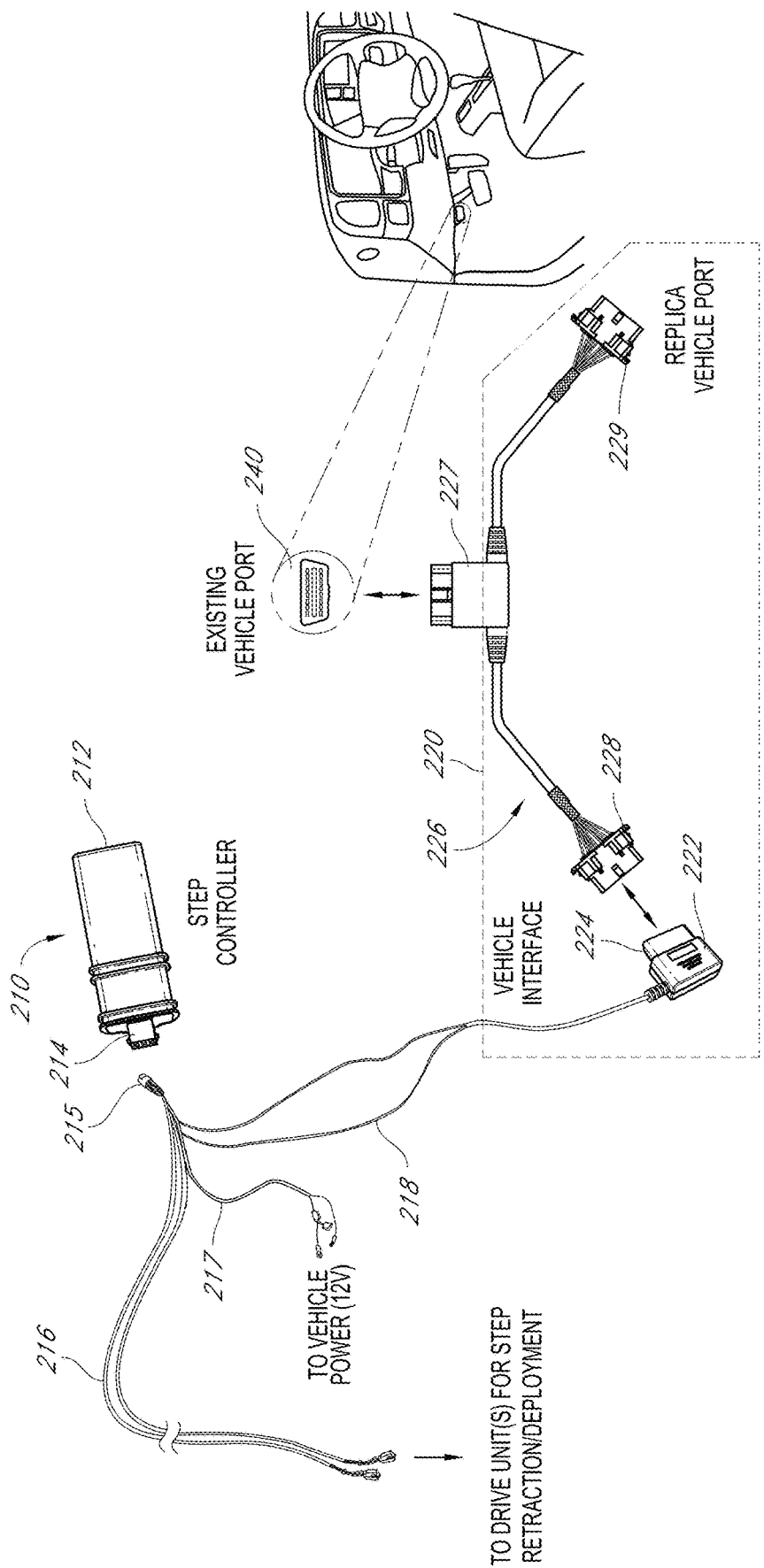
FIG. 2B depicts portions of an automated step system according to another embodiment, where the vehicle interface of the step system includes two replica vehicle ports.

Additional Vehicle Interface Configurations; Port Replication; Override Function In some cases, the vehicle interface 220 is configured to allow normal use of the existing vehicle port 240 functionality while the vehicle interface 220 is plugged into the existing vehicle port 240. For example, FIG. 2B shows an embodiment of a vehicle interface 220 that includes a three-port connector apparatus 226 including a hub connector 227 for interfacing with the existing vehicle port 240, a first replica vehicle port 228 for interfacing with the connector module 222, and a second replica vehicle port 229. The first and second replica vehicle ports 228, 229 can include the same or substantially the same mechanical and electrical connection interface as the existing vehicle port 240.

Moreover, the connector apparatus 226 provides a pass-through function by forwarding or replicating the output of the existing vehicle port 240 at outputs of the first and second replica vehicle ports 228, 229. In this manner, the first replica vehicle port 228 can interface with the connector module 222 for use in operating the automated step system, while the second replica vehicle port 229 provides access to the existing vehicle port 240 functionality for its customary purpose. For instance, where the existing vehicle port 240 is an OBD-II port, automotive technicians can connect OBD-II compliant diagnostic scanners to the second replica vehicle port 229 for diagnostic purposes while the automated step system remains completely intact and installed. In one configuration, the existing vehicle port 240 is physically unfastened from its normal location (while remaining electrically connected as normal), and the second replica vehicle port 229 is fastened in place of the existing vehicle port 240 so that installation of vehicle interface 220 is substantially transparent to technicians and others desiring to use the existing vehicle port 240 while the step system is installed.

FIG. 2D shows an embodiment of a vehicle interface 220 providing only a single replica port 229 which provides standard access to the existing vehicle port 240. Unlike the embodiment of FIG. 2B, the connector module 222 itself includes the replica port 229, and an intermediate component such as the connection apparatus 226 of FIG. 2B is not used to provide port replication. The replica vehicle port 229 is provided on the housing of the connector module 222 in FIG. 2D, providing a compact design. In another embodiment, the replica vehicle port 229 can be provided on a separate connector that attaches to the housing of the connector module 222 via cabling.

Figure 2F:
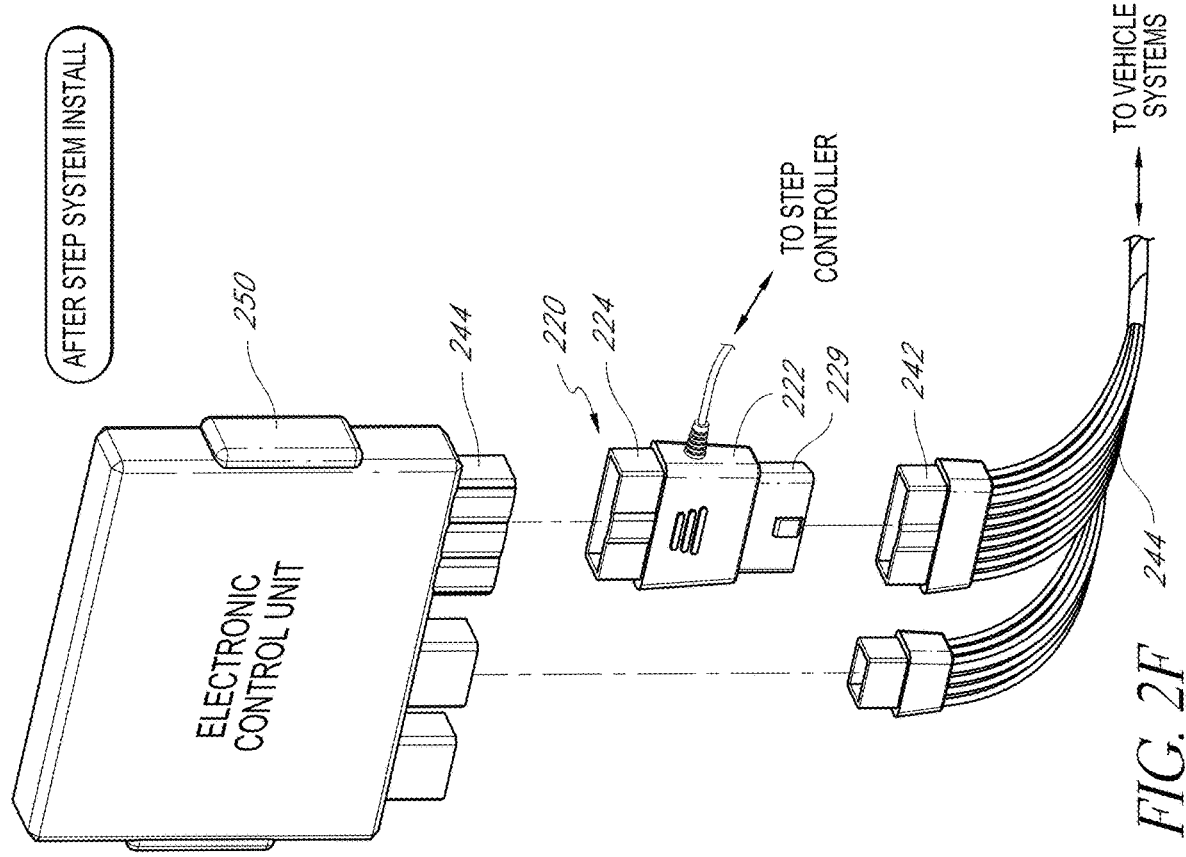
FIG. 2F shows an embodiment of a vehicle interface of an automated step system, after installation, where the vehicle interface is connected to an existing electronic control unit of the vehicle.
Figure 2E:
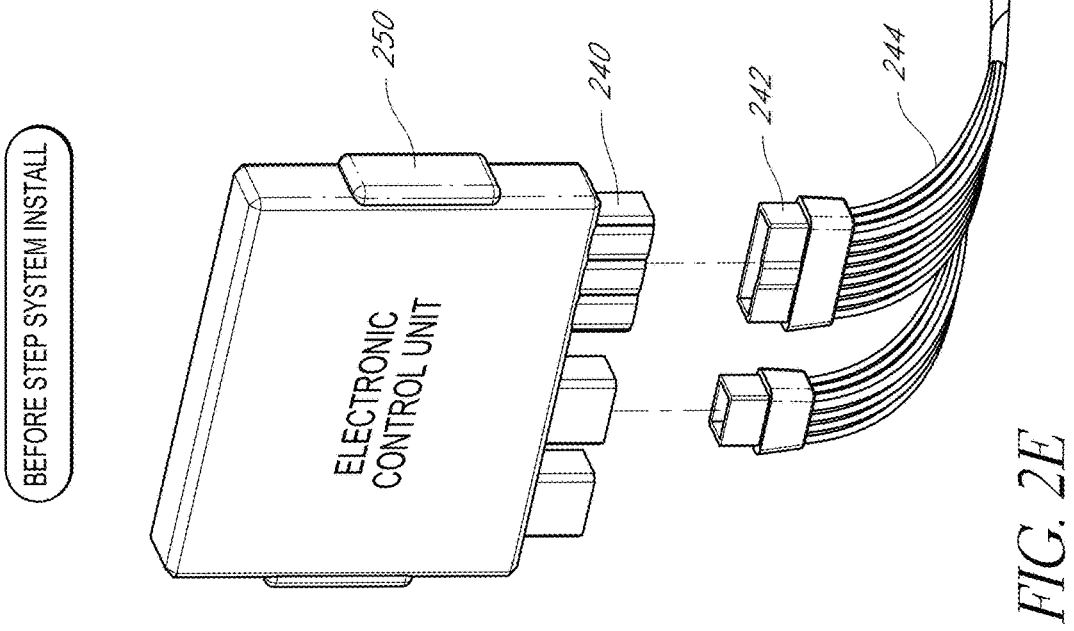
FIG. 2E shows an exemplary connection configuration of an electronic control unit of a vehicle prior to installation of an automated step system.

As depicted in FIG. 2C (prior to step system installation) and FIG. 2D (post-step system installation), the vehicle interface 220 in some cases can be interposed between the existing vehicle port 240 and another connector 242. The connector 242 is configured to interface with the existing vehicle port 240, and in some embodiments is a connector of a device that is external to the vehicle, such as an OBD diagnostic scanner where the port is an OBD port. In other cases, the connector 242 comprises an existing vehicle connector that normally occupies the existing vehicle port 240. FIGS. 2E and 2F illustrate one such configuration, where the existing vehicle port 240 is a port of a computer system or subsystem 250 of the vehicle 230. The computer system 250 can be an electronic control module (ECU) of the vehicle 230, for example, which is generally an embedded electronics system that controls and/or monitors one or more of the electrical subsystems in the vehicle 230.

Referring to FIG. 2E, the connector 242 terminates cabling 244, and ordinarily occupies the existing vehicle port 240 of the computer system 250 during normal vehicle operation. The connector 242 and cabling 244 carry information between the computer system 250 and appropriate vehicle componentry. For instance, the computer system 250 of some embodiments including the illustrated embodiment can be a body control module (BCM) configured to control door locks, power windows, interior lighting, and the like. The cabling 244 carries information between the BCM and various subsystems of the vehicle which are regulated or monitored by the BCM, such as the doors (e.g., door locks, door handles, door open/closed sensors), windows, interior lighting, power seats, air conditioning, anti-theft system, gauges, and other appropriate vehicle components. Other types of ECU's and other computing systems that can be used in conjunction with the step assist are described herein, e.g., with respect to FIG. 3.

As represented in FIG. 2F, following installation of the automated step system the vehicle interface 220 is interposed between the vehicle computer system 250 and the connector 242. The pass-through function of the vehicle interface 220 enables normal communication between the computer system 250 and the connector 242, thereby making installation of the step system substantially transparent with respect to operation of the computer system 250.

Figure 2G:
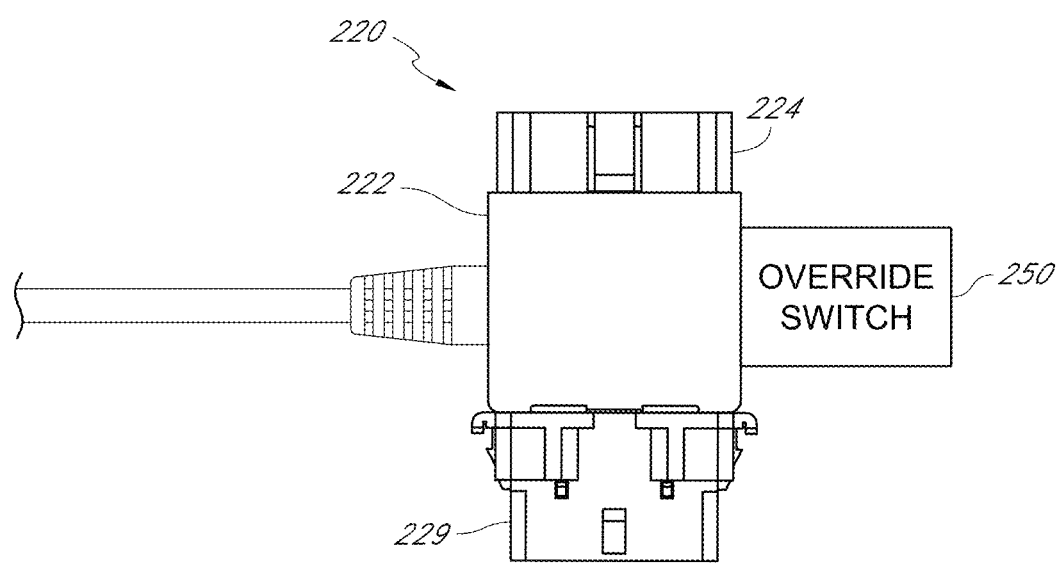
FIG. 2G shows an embodiment of a vehicle interface including an override switch.

FIG. 2G shows an embodiment of a vehicle interface 220 including an override switch 251 that provides such functionality. While automated deployment based on door opening and closing (or other appropriate inputs) is useful in many situations, it can be desirable to allow the vehicle operator to manually control powered step retraction and deployment in certain cases. For instance, the stepping deck often becomes soiled given its proximity to the ground, wheels, and exposure to foot traffic. Thus, it can be desirable to wash the stepping deck. However, it is generally impractical to wash a vehicle having an open door, and it can therefore be desirable to allow for deployment while the doors are closed. As another example, sometimes obstacles (e.g., rocks in off-road environments) are positioned in the step deployment path, such that deployment could cause cosmetic or other damage to the step. Users may nonetheless want to open the door to exit the vehicle. In this and other scenarios it can therefore be useful to provide an override mode that keeps the step in a retracted position even when the door is opened.

While the term "manual" is used with respect to the override mode, this refers to the fact that the user is directly controlling step movement using the switch 251 rather than relying on an automated algorithm. It does not imply that the user physically manipulates the step. Rather, the override mode still preferably involves powered movement of the step in response to actuation of the switch 251.

A variety of different types of switches are possible which can generally include a combination of appropriate mechanical and electrical components which function together to provide the desired override functionality. In one illustrative example, the override switch 251 is a 3-state toggle switch movable between a first, center position in which the step moves according to the normal automated scheme (e.g., in response to detected door openings and closings). Toggling the switch 251 in a first direction away from the center position to a second position initiates a manual retract mode which overrides the normal automated step movement scheme. If the step is deployed at the time the switch 251 is moved to the second position, the step moves to the retracted position, e.g., regardless of the state of the door or of other control inputs. If the step was already in a retracted position, toggling the switch 251 to the second position will not move the step. However, in some embodiments the step will remain retracted even if a door is subsequently opened, so long as the switch 251 remains in the second position. Toggling the step in a second direction away from the center position to a third position initiates a manual deploy mode which overrides the normal automated step movement scheme. If the step is retracted at the time the user moves the switch 251 to the third position, the step deploys, e.g., regardless of the state of the door or of other control inputs. If the step was already deployed, toggling the switch 251 to the third position will not move the step. However, in some embodiments the step will remain deployed even if a door is subsequently closed, so long as the switch 251 remains in the third position. In some embodiments, the switch 251 does not remain in the second or third positions, but instead returns to the center position after the user lets go of the switch 251. In such cases, the step will retract or deploy as appropriate when the switch 251 is moved to the second or third positions, but normal automated deployment will resume once the switch returns to the center position, and subsequent door openings and closings will cause retraction/deployment accordingly. A variety of other types of switches 251 or other user input devices can be provided to engage the override function, including one or more buttons, a touch screen, remote control, or the like. In an alternative embodiment, initiation of an override mode allows the user to physically retract and deploy the step as desired, instead of relying on powered movement.

Moreover, the override switch 251 can be positioned in a location that is accessible to the vehicle operator, e.g., when seated in the driver's seat. For example, referring to FIGS. 2B and 2G, inclusion of the override switch 251 on the connector module 222 of the vehicle interface 220 can be convenient in cases where the existing vehicle port 240 is positioned in a manner similar to FIG. 2B. For instance, a user could desirably reach down while seated to actuate the switch 251. While the illustrated switch 251 is included on the connector module 222, the switch 251 can be positioned on another component of the step system, such as the stepping deck, linkage, or drive unit. Or the switch 251 can be provided with a separate housing and be connected to the controller 210 via a wired or wireless connection, facilitating positioning of the switch 251 at any convenient location within the interior or on the exterior of the vehicle.

Exemplary Installed Automated Step System

Figure 3:
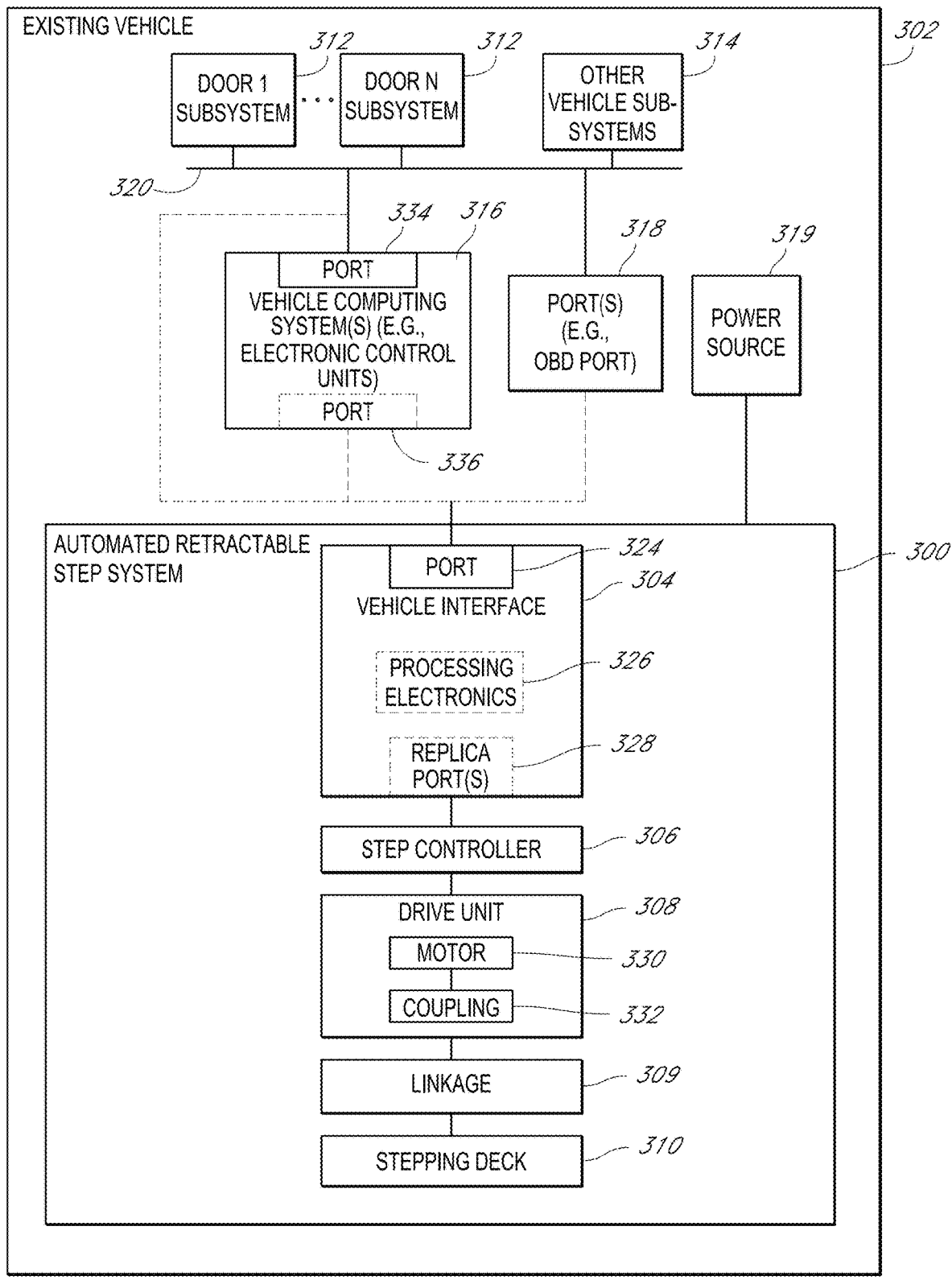
FIG. 3 is a block diagram illustrating an exemplary automated step system in the context of a host vehicle system.

FIG. 3 is a schematic diagram depicting an exemplary automated step system 300 installed in an existing vehicle 302. The automated step system 300 may be installed after market, for example, and can include a vehicle interface 304, a step controller 306, a drive unit 308, linkage 309, and a stepping deck 310.

The existing vehicle 302 can include one or more door subsystems 312 corresponding to one or more doors of the vehicle 302 (e.g., 2, 4 or more doors depending on the vehicle), a plurality of other vehicle subsystems 314, one or more vehicle computing systems 316 having at least one existing vehicle port 334, one or more stand-alone existing vehicle ports 318, and a power source 319. As shown, the various components can be in communication with one another via one or more vehicle communication buses 320. The automated step system 300 of FIG. 3 and corresponding components may be the same or similar to any of the automated step systems and corresponding components described herein, such as any of those described with respect to FIGS. 1A-1B, 2A-2F, and 4, for example.

As shown, the components of the vehicle 302 are connected via at least one communication bus 320. The bus 320 can implement one or a plurality of appropriate bus types, which can include, without limitation, a controller area network (CAN) bus (e.g., a CAN 2.0 compliant bus), a Domestic Digital Bus (D2B), a FlexRay bus, and a Local Interconnect Network (LIN). Taken together, the bus 320 and the components attached to the bus 320 may be referred to as a Local Area Network (LAN) or Vehicle Area Network (VAN). In one embodiment, vehicle interface 304 is a J1962 compliant OBD port that provides open-collector outputs to the controller 306 indicating the state of the driver and passenger side doors based on messages received from the vehicle's controller area network (CAN) bus 320.

Each door subsystem 312 can include existing vehicle electronics configured to control operation of the corresponding vehicle door(s). The door subsystem 312 can also be configured to generate and/or process signals related to operational status of the door, and provide such information to the bus 320. For example, in some embodiments including the illustrated embodiment the door subsystem 312 can be an electronic module (e.g., a car door module) residing with the corresponding door. The electronic module can include appropriate electrical componentry (e.g., one or more microcontrollers, circuitry, and corresponding software or firmware) for controlling some or all of the car door functions, such as window lift, latching/locking operations, wing mirror movement, etc. In one embodiment, the door subsystem 312 is an AN2334 Complete Car Door Module provided by ST Microelectronics. The door subsystem 312 in some embodiments communicates with one or more other components of the vehicle over a LIN bus.

The door subsystem 312 generally operates together with mechanical components of the door to generate door status information. For instance, the doors of the vehicle 302 can generally include a mechanical latch operably coupled to interior and exterior door handles. The latch is a spring-activated latch coupled to the handles via a latch release cable, for example. When the door is closed and the handles are in their relaxed position, the latch mates with a corresponding catch on the door frame, securing the car door shut. When the handle is actuated by the passenger, the latch releases the catch, allowing the car door to open. The door subsystem 312 can include an electrical trigger switch and other appropriate electronics responsive to an actuation, position, or state of the handle, the latch, or both, or that is otherwise responsive to the interaction between the handle and the latch to generate a signal indicating whether the door is open or closed. Depending on the type of vehicle 302, the door subsystem 312 in some alternative embodiments can include existing, pre-installed sensor componentry such as one or more magnets, proximity sensors, or the like. In such cases, one part of the proximity sensor (e.g., a magnetic proximity sensor) may be positioned on the door, and the other part may be positioned on the door frame, such that opening and closing the door is usable to detect door opening and closing due to the resulting change in proximity of the two parts of the sensor. The door subsystem 312 provides a "door ajar" signal to the bus 320 in some embodiments.

The vehicle 302 can include a variety of other existing vehicle systems 314, which, like the door subsystem(s) 312, generally include electronic componentry associated with different parts of the vehicle 302. Similar to a car door module, the other vehicle systems 314 can include integrated electronic modules including collections of components for controlling corresponding vehicle subsystems. Or the other vehicle systems 314 can comprise discrete componentry such as, without limitation, one or more seat occupancy sensors (e.g., pressure sensors), interior lighting control electronics, transmission componentry, ignition componentry, etc. As with the door subsystems 312, some or all of these other vehicle systems 314 may provide information to the bus 320 which is ultimately usable by the step system in determining whether to move the stepping deck 310. For instance, such information is received via the bus 320 by an appropriate vehicle computing system 316 or vehicle port 318, and then made available to the automated step system 300 via the vehicle interface 304.

The vehicle computing systems 316 can generally comprise any vehicle related computer system or subsystem. In particular, the vehicle computer systems 316 can include any type of vehicle ECU or other module that provides information sufficient to determine when it is appropriate to move or otherwise control the stepping deck 310. Examples include a central control module (CCM), general or generic electronic module (GEM), door control unit (DCU), engine control unit (ECU), seat control unit (SCU), and transmission control unit (TCU), speed control unit (SPU) without limitation.

The vehicle computing system 316 includes at least one first port 334 which is normally occupied during vehicle operation by a connector providing a connection to the bus 320. The vehicle computing system 316 can also include at least one second port 336 that is normally unoccupied and provides electronic access to the computing system 316 for diagnostic or other purposes without disconnection from the bus 320.

The vehicle port(s) 318 can include any of the OBD ports described herein or some other type of appropriate existing port of the vehicle 302. For example, the vehicle port(s) 318 can include stand-alone ports that are not integrated with an ECU or other vehicle computing system 316. In some cases, the vehicle port 318 receives status information from a plurality of components including one or more of the vehicle computing system(s) 316, door subsystem(s) 312, and other vehicle systems 314, and presents the information on its output. For instance, where the port 318 is an OBD-II port, it can receive diagnostic and/or other information from some or all of the vehicle ECUs and/or other electronics connected to the bus 320.

As shown, the vehicle interface 304 of the step system 300 includes a port 324 adapted to connect with existing vehicle ports such as the first port(s) 334 of the vehicle computing system 316 (e.g., similar to the embodiment shown in FIG. 2F), the second port(s) 336 of the vehicle computing system 316, or to the existing port(s) 318 (e.g., similar to the embodiments shown in FIGS. 2A and 2B). As discussed previously, the vehicle interface 304 can further include processing electronics 326 for processing data received from the vehicle 302 via the port 324 (e.g., door status information) and/or one or more replica ports 328 providing functional access to the existing vehicle ports that occupied by the vehicle interface 304.

Operation of the vehicle interface 304 according to an illustrative embodiment will now be described, as may be executed by a software or firmware algorithm executing on one or more microcontrollers or other hardware processors of the vehicle interface 304, for example. The vehicle interface 304 first enters an initialization or configuration mode when the vehicle interface is plugged into or otherwise attached to the vehicle port 318 (or other interface on the vehicle 302). The vehicle interface 304 may also enter the configuration mode when the vehicle battery or other power source 319 is connected or reconnected to the step system 300. In the initialization mode, the vehicle interface runs an initialization or boot procedure and then can wait a predetermined period of time while listening to the vehicle bus 320, which is a can bus in the example embodiment. If no configuration messages are received, the vehicle interface 304 enters a run mode. The outputs of the vehicle interface 304 (e.g., open collector outputs) to the controller module 306 are inactive in the initialization mode, for example. In one embodiment, the vehicle interface comprises a separate output for each step, e.g., one output for each of a driver and passenger side running board.

Upon entry to run mode, the state of doors as represented on the outputs of the vehicle interface 304 is "closed". Messages on the CAN or other vehicle bus 320 are checked against one or more internal filters to detect state changes of any of the doors. If any of the doors are open when the vehicle interface 304 enters the run mode, the door should be closed in the example embodiment in order for the vehicle interface 304 to initialize properly and know its state.

For a two door vehicle, the logic of the vehicle interface 304 in the example embodiment is as follows: if the driver door is open, the appropriate output of the vehicle interface 304 to the controller 306 is active; if the passenger door is open, the appropriate output of the vehicle interface to the controller 306 is similarly active. For a four door vehicle according to the example, if either of the front or rear door is open on the driver or passenger side, the corresponding output of the vehicle interface 304 is active. Conversely, if both the front and rear door is closed on the driver or passenger side, the corresponding output is inactive.

If an output is activated during run mode, it can be checked for over-current or other error conditions, and if such conditions exists, the output may be deactivated immediately or soon thereafter, e.g., until the next CAN message on the bus indicates that the output should be activated. This procedure can repeats each time the output activated. When there are no further CAN or other bus messages to process, e.g., after a threshold period of time expires (e.g., between 30-60 seconds after a key-off or other detected action), the vehicle interface 304 can enter a relatively lower power idle mode.

In the idle mode, the vehicle interface 304 can place some most of the processor resources of the vehicle interface 304 in a standby or other low power condition. In the example embodiment, the only three resources that remain active are a CAN interface module of the vehicle interface 304, a timer module, and a power supply monitor, or at least these three modules can remain active. If the CAN module receives a vehicle message in idle mode, the vehicle interface can return to run mode to process it. Otherwise, the vehicle interface 304 can check the vehicle battery voltage periodically (e.g., every 1 or more seconds). If the voltage drops below a threshold amount (e.g., less than two thirds of the normal power supply voltage such as 8 volts for a 12 volt battery), and/or no CAN message is received for a threshold period of time (e.g., at least 5 minutes), the vehicle interface 304 can enter a sleep mode.

In sleep mode, the vehicle interface places the CAN interface (e.g., a CAN transceiver) in a special sleep mode and then completely or substantially completely shuts down the microcontroller(s) of the vehicle interface 304. When awakened, the microcontrollers can enter a run mode.

The step controller 306 is communication with the vehicle interface 304 and can generally include hardware (e.g., one or more microcontrollers, memory, and circuitry) and/or software configured to control operation of the automated step system 300. For instance, the controller 306 processes control inputs received from the vehicle interface 304 and sends appropriate control signals to the drive unit 308. In some embodiments one or more processors of the controller 306 execute an algorithm for determining when to move the stepping deck 310, based on the received control inputs. The algorithm can in some cases be updated after purchase, which can be helpful to maintain compatibility of the step system 300 with a wide variety of vehicles such as newly released vehicles which may implement updated communication protocols (e.g., updated OBD protocols) or other technological developments.

The automated step system 300 can include an interpretation module which may include software, firmware, and/or associated electronics (e.g., one or more microcontrollers or other processors) configured interpret or otherwise process the information received from the vehicle into a format that is usable by the step system for determining when to move the step. For instance, the interpretation module may processes serial data received via an OBD port, a port of a BCM, or some other existing electronics port 240 in a manner that makes the information usable by the step system. Depending on the embodiment, the interpretation module may be implemented in the controller 306, the vehicle interface 304, a combination thereof, or in some other component of the step system 300. In one embodiment, interpretation module is provided by Cubic Systems, Inc., of Ann Arbor Mich.

It is to be understood from the disclosure that a variety of different types of information can be used by the step system 300 to control step movement. Moreover, the information can originate from a variety of different existing vehicle sources and be delivered to the vehicle interface 304 of the step system 300 via different intermediary components (e.g., one or more ECU's and/or an OBD port). The following table provides a non-exhaustive list of some embodiments. A further description of various types of components and associated information and decisioning schemes that can be used is provided with respect to FIG. 6.

The drive unit 308 can include a motor 330 drivingly connected to a coupling 332, which can include a torque limiter and/or appropriate gear system, for example. The motor 330 responds to the control signals received from the step controller 306 to act through the coupling 332 to cause the linkage 309 to move, thereby effectuating movement of the stepping deck 310 to the extended or retracted position, as desired. The linkage 309 can include support arms and/or other appropriate componentry connecting the stepping deck 310 to the drive unit 308. A detailed example of portions one compatible step assist including an exemplary drive unit, linkage, and stepping deck is provided below with respect to FIG. 4.

As shown, power can be provided to the step system 300 from a vehicle battery or other existing power source 319. For instance, the controller 306 may connect to the vehicle power source 319 and deliver power to the drive unit 308, vehicle interface 304, and other appropriate components of the step system 300, similar to the manner described with respect to the embodiments of FIG. 2.

Depending on the embodiment, the physical arrangement of the step system 300 components can vary. For instance, while the step controller 306 can be housed in a separate housing, in some other implementations it is included in a common housing with the drive unit 308 or the vehicle interface 304, or portions thereof.

Exemplary Step Assist

FIG. 4 depicts another embodiment of a retractable vehicle step system 400. The terms "forward," "front" and "outboard" are used interchangeably herein, as are the terms "rearward," "rear" and "inboard," when describing components of the step structures disclosed herein. These terms are to be understood with reference to a direction of ingress into a vehicle, "forward"/"front"/"outboard" meaning generally toward the exterior of the vehicle, and "rearward"/"rear"/

"inboard" meaning generally toward the interior of the vehicle. The depicted retractable vehicle step system 400 generally comprises a powered step mechanism 420 and an idler step mechanism 440, both of which are connected to a stepping deck 460. Under power delivered by a drive system 480 drivingly connected to the powered step mechanism 420, the powered and idler mechanisms 420, 440 move the stepping deck 460 between a retracted position (e.g., similar to the retracted position shown in FIG. 1A) and the deployed position depicted in FIG. 4. The deployed position is located downward and outboard of the retracted position.

In other embodiments, two powered step mechanisms 420 may be employed in place of the combination of powered and idler mechanisms 420, 440 depicted in FIG. 4, or only a single powered step mechanism 420 (and no idler mechanism 440 at all) may be employed to support and move the stepping deck 460. In still other embodiments, two or more idler mechanisms 440 may be employed in combination with one or more powered mechanisms 420 to support and move the stepping deck 460.

Each of the powered step mechanism 420 and idler step mechanism 440 comprises a four-bar linkage. Thus, the powered step mechanism 420 includes a first arm 422 and a second arm 424, each of which is pivotably connected to a generally rigid frame 426. The frame 426 is configured to be secured to a vehicle (not shown), particularly the underside thereof, via a mounting flange 428. The first and second arms 422, 424 are therefore pivotable with respect to frame 426 about generally parallel first and second axes A-A, B-B, respectively. When the retractable vehicle step system 400 is mounted on a vehicle, each of the first and second axes A-A, B-B is oriented generally parallel to the ground. A support bracket 430 is rigidly connected to the stepping deck 460, and is connected to the first and second arms 422, 424 so as to be rotatable about third and fourth axes C-C, D-D, respectively. Thus, upon rotation of the first and second arms 422, 424 about the first and second axes A-A, B-B, the stepping deck 460 moves between the retracted position and the deployed position.

Similarly, the idler step mechanism 440 includes a first arm 442 and a second arm 444, each of which is pivotably connected to a generally rigid frame 446. The frame 446 is configured to be secured to the vehicle alongside the powered frame 446 via a mounting flange 448. The first and second arms 442, 444 are therefore pivotable with respect to the frame 446 about the first and second axes A-A, B-B, respectively. A support bracket 450 is rigidly connected to the stepping deck 460, and is connected to the first and second arms 442, 444 so as to be rotatable about the third and fourth axes C-C, D-D, respectively. Thus, upon rotation of the first and second arms 422, 424, 442, 444 about the first and second axes A-A, B-B, the stepping deck 460 moves between the retracted position and the deployed position.

Either of the powered step mechanism 420 or the idler step mechanism 440 may comprise any suitable retractable vehicle step mechanism, of which there are many presently known in the relevant arts. Of course, any suitable later-developed mechanism may also be employed as either of the powered and idler mechanisms 420, 440. In some embodiments, either of the powered and idler mechanisms 420, 440 may comprise any of the retractable-step mechanisms disclosed in U.S. Pat. No. 6,641,158, titled Retractable Vehicle Step, issued Nov. 4, 2003; or U.S. Pat. No. 6,834,875 titled Retractable Vehicle Step, issued Dec. 28, 2004. The entire contents of each of the above-mentioned patents are hereby incorporated by reference herein and made a part of this specification.

Exemplary Step System Installation

Figure 5:
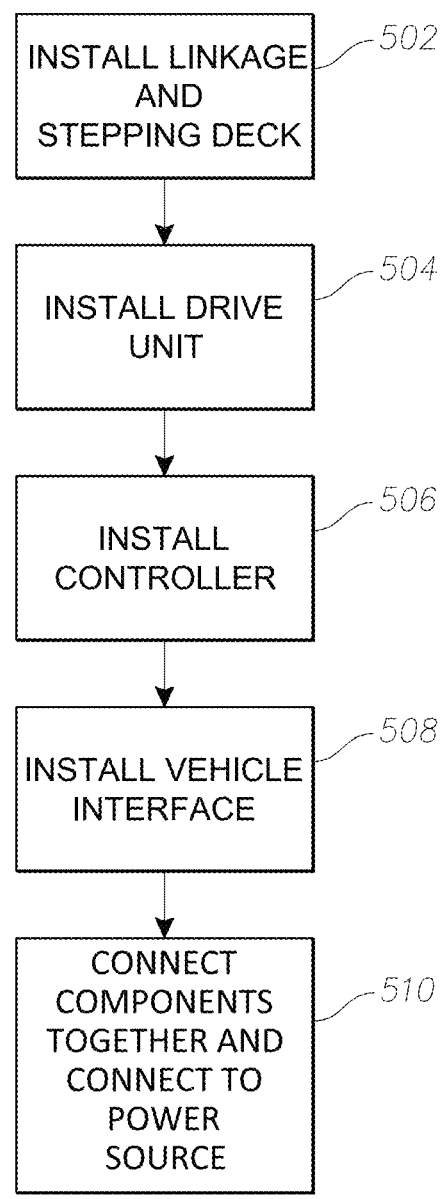
FIG. 5 is a flowchart depicting an exemplary method of installing an automated vehicle step of embodiments described herein.

FIG. 5 is a flowchart depicting an exemplary method of installing an automated vehicle step system. The method may be used to install an automated step system to a host vehicle after market by the owner of the vehicle, for example, or by any other appropriate individual. The installed step system can be any of the step systems described herein.

At step 502, the method includes installing the linkage and stepping deck of the step system. The linkage and stepping deck may be similar to the embodiments of FIGS. 1A-1B, 3, and 4, for example. For instance, referring to the step assist 400 of FIG. 4, the combination of the first arm 422, second arm 424, support frame 426, and mounting flange 428 may correspond to the linkage, while the stepping deck 460 and supporting brackets 430, 450 correspond to the stepping deck.

While the particular steps involved in installing the linkage and stepping deck can vary depending on the particular mechanical design, in one embodiment the operator attaches the linkage to the underside of the vehicle and attaches the stepping deck to the other side of the linkage. Where there are two sets of linkages such as is depicted in FIGS. 1A-1B and FIG. 4, step 502 also involves attaching the second linkage to the vehicle and to the stepping deck, which can be achieved in a manner similar to that used to attach the first linkage.

Installing the linkage in some embodiments involves removal of one or more body mount bolts on the underside of the vehicle and fastening the linkage to the vehicle using the body mount bolts or other appropriate fastening means. Installing the stepping deck can involve fastening the stepping deck to the linkage(s) using one or more fastening bolts or other fastening means. In some cases, the stepping deck is permanently attached to the linkages, and separate installation of the stepping deck is not necessary.

At step 504, the method includes installing the drive unit of the step system. In some embodiments, this involves engaging a coupling of the motor of the drive unit with a corresponding coupling provided on the linkage. For instance, a gear provided on the motor coupling can be meshed with a corresponding gear on the linkage. Step 504 can also include fastening the motor to the linkage (e.g., using one or more fastening bolts), or directly to the vehicle depending on the design.

Step 506 involves installing the controller, which can be any of the controllers described herein. In some embodiments, the controller housing is positioned under the hood of the vehicle somewhere within the engine compartment. For instance, the controller housing in an embodiment is fastened to a support arm within the engine compartment.

At step 508, the method includes installing the vehicle interface. The vehicle interface can be any of those described herein, including any of the vehicle interfaces 220 described with respect to FIGS. 2A-2F, or the vehicle interface 304 of FIG. 3. In some embodiments, step 508 includes attaching a connector of the vehicle interface to an existing port of the vehicle.

For instance, referring to FIG. 2A, step 508 can include coupling the port 224 of the vehicle interface 220 with the corresponding connector of the OBD or other type of existing vehicle port 240, e.g., via a friction fit or interference fit. Referring to FIG. 2B, step 508 can include attaching the port 227 of the connector apparatus 226 to the existing vehicle port 240, and attaching the port 224 of the connector module 222 to the first replica port 228.

As discussed above, in some embodiments, a replica port of the vehicle interface, such as the second replica port 229 of the embodiment shown in FIG. 2B, can be physically positioned in place of the existing vehicle port 240 to provide normal access to the functionality of the existing vehicle port 240. For instance, still referring to FIG. 2B, the existing vehicle port 240 and its associated housing can be physically detached from its normal location under the dashboard, and repositioned at another location with respect to the vehicle. And the second replica port 229 can be secured at the original location of the existing vehicle port 240, e.g., under the dashboard, using any suitable fastening means such as adhesives, ties, or the like. Meanwhile, the other portions of the vehicle interface 220 including the port 227, the first replica port 228, the connector module 222, and associated cabling can be positioned elsewhere. In one illustrative embodiment, step 508 of the installation method includes fastening these portions to the underside of the dashboard, such that these components are not visible from the passenger's normal line of sight, for example. By positioning the second replica port 229 in place of the existing vehicle port 240, the installation is substantially transparent to technicians or other individuals desiring to access the functionality of the existing vehicle port 240. For instance, where the vehicle port 240 is an OBD port, a technician may plug an OBD scanner into the second replica vehicle port 229 to perform diagnostics without even knowing that he is connecting to a replica port rather than the original vehicle port 240.

A similar approach can be used with respect to the embodiment of the vehicle interface 220 shown in FIG. 2D. For instance, the connector module 222 of the vehicle interface 240 can be fastened or otherwise positioned in place of the existing vehicle port 240, and the replica port 229 can provide users with ready access to the functionality of the existing vehicle port 240. Depending on the embodiment, the replica port 229 may not be positioned at exactly the same position as the existing vehicle port 240. For instance, referring to FIG. 2B again, the existing vehicle port 240 (connected to the port 227 of the vehicle interface 240) may be repositioned, e.g., out of sight, and the second replica port 229 may be positioned at any appropriate location, such as some position on the dashboard or within the footwell such that a user will be able to readily recognize that the replica port 229 can be utilized to access the functionality of the existing vehicle port 240.

Step 508 can in some embodiments include interposing the vehicle interface 220 between an existing electrical junction or other existing connection of the vehicle. For instance, referring to FIGS. 2E-2F, step 508 can involve detaching the connector 242 from the electronic control unit 250, attaching the port 224 of the connector module 222 to the now unoccupied port 244 of the electronic control unit 250, and attaching the replica port 229 of the connector module 222 to the connector 242 of the cabling 244 that was removed from the electronic control unit 250. In this manner, the vehicle interface 240 can be readily installed using existing vehicle connections, without altering normal vehicle operation.

At step 510, the method includes connecting and powering the components of the step system. For instance, referring to FIG. 2A for the purposes of illustration, the controller 210 in one embodiment is installed in proximity to the vehicle battery (step 506) and the wiring 216 is routed from the controller to the drive unit of the step system. For instance, the wiring 216 may be routed through the engine compartment (e.g., at least partly alongside an existing wiring harness) and down through the engine compartment and into the front wheel well on the step-side of the vehicle. The wiring 216 is further routed to the underside of the vehicle and connected to the drive unit. Where more than one step is present, there may be multiple corresponding sets of wiring 216 that are routed in a similar fashion to the respective drive units.

The wiring 218 may be routed from the connector 222 of the vehicle interface 240 to the controller 210. For instance, where the connector 222 is attached to a vehicle port 240 that is positioned in the manner shown in FIG. 2A, the wiring 218 may be routed from the vehicle port 240, into the engine compartment, and then routed within the engine compartment (e.g., at least partly alongside an existing vehicle wiring harness) to the controller 210 and connected to the port 214 of the controller 210.

The wiring 217 may be routed from the controller 210 to the vehicle battery to provide power to the components of the installed step system. While shown as a sequence of separate steps for illustrative purposes, portions of activities described with respect to the individual steps may be performed together, and the steps can be performed in a different order. For instance, although step 510 is shown separately, different portions of the step system may be connected together and/or powered at different points in time during the install.

Exemplary Step System Operation

Figure 6:
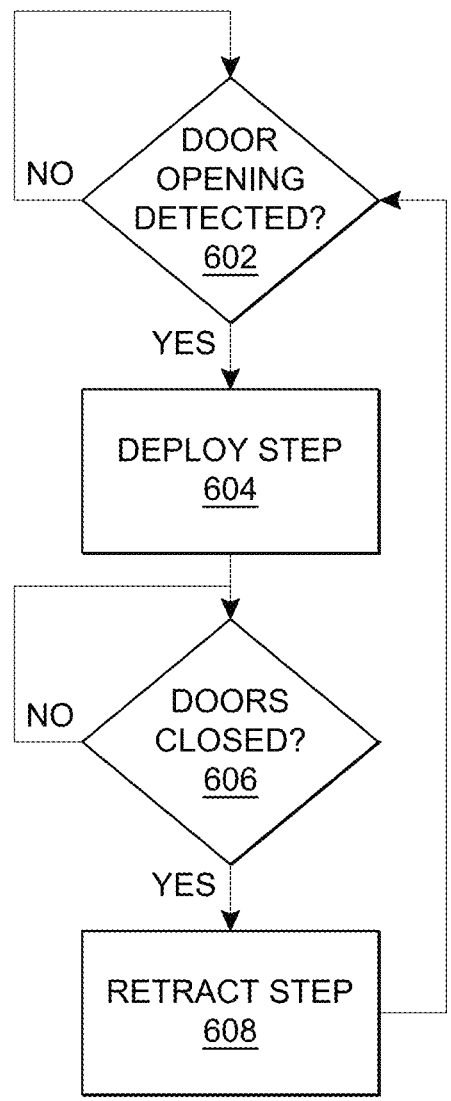
FIG. 6 is a flowchart depicting an exemplary method of operation for an automated vehicle step of embodiments provided herein.

FIG. 6 is a flowchart depicting an exemplary method of operating a step system. The step system can be any of the step systems described herein, for example. The control algorithm may be implemented by software or firmware executing in one or more hardware processors of the vehicle interface of the step system, the controller of the step system, such as the vehicle interfaces 220 or controllers 210 of FIGS. 2A, 2B, and 2D, or the vehicle interface 304 or controller 306 of FIG. 3. For instance, the vehicle interface may provide outputs to the controller that the controller uses to instruct the drive unit, as discussed previously. For the purposes of illustration, certain aspects of the method are described with respect to a running board style step assist such as the ones shown in FIGS. 1A-1B and FIG. 4, which at least partially spans the length of, and is used to assist user entry/exit with respect to, at least front and rear doors. It will be understood, however, that the method can apply to various other step assist configurations.

At decision block 602, the stepping deck is in a retracted position, and the control algorithm specifies that the stepping deck will remain so until a door on the running board-side of the car is opened. When the vehicle interface and/or controller determines that any door on the running board-side of the car has been opened, the controller causes the running board to deploy at step 604.

In another embodiment, there is only one step provided, e.g., under one of the front door or the rear door, and in such a case the stepping deck would deploy only if that particular door was opened. In yet another configuration, separate steps are provided for independent use with each of the front and rear doors, and each step similarly deploys only if the door associated with that particular step is opened.

Returning to the two-door running board example, after detecting the opening of any door on the running board-side of the vehicle, the method enters decision block 606. The control algorithm specifies that the running board will remain deployed unless and until all of the doors on the running-board. Once all of the doors are closed, the method leaves decision block 606, and the step system retracts the stepping deck at step 608. In some cases, the controller implements a delay before retracting the stepping deck at step 608 (e.g., of 1, 2, 3, 4, 5, or more seconds).

Where only one step is provided for use with one door, or where separate stepping decks are provided for use with each of the front and rear door, the stepping deck would retract at step 608 in response to closure of just that particular door, even if the other door remains opened.

After retraction of the stepping deck at step 608, the method returns to decision block 602 and the vehicle interface and/or controller again listens for relevant door openings.

While the method has been described with respect to a step assist(s) installed on one side of the vehicle, one or more step assists can also be implemented on the opposing side of the vehicle, as discussed previously. In such a case, the step assist(s) on the opposing side can operate in a similar manner and in response to the door(s) on the opposing side opening and closing. In an alternative embodiment, a step assist installed on the passenger side deploys/retracts in response to one or more driver side doors opening/closing, or vice versa.

Operation of the stepping assist with respect to the method of FIG. 6 has thus far been described for the purposes of illustration primarily with respect to door opening and closing events. Such events can be detected in any of the manners described herein. It will further be understood that a wide variety of inputs can be used instead of or in addition to door opening and closing events, and that a variety of decisioning schemes can be used to control movement of the stepping deck. The table below provides a simplified description of just a few such examples.

| Exemplary Originating Vehicle Component(s) | Exemplary Intermediary Vehicle Component(s) | Type of Information | Step Movement Decision |
|---|---|---|---|
| Door subsystem(s) (e.g., car door module) | BCM, DCU, OBD port | Door opened/ closed information (e.g., door ajar) | door open/ajar = deploy; door closed = retract |
| Door subsystem(s) (e.g., car door module) | BCM, DCU, OBD port | Door locked/ unlocked information | door unlocked = deploy; allow deployment door locked = retract; do not allow deployment |
| Transmission system, Engine Computer, Speedometer | TCU, Engine Control Unit, Speed Control Unit | Vehicle speed | speed > threshold (e.g., >5 mph) = retract; do not allow deployment (even if door is open/ajar); speed < threshold (e.g., <5 mph) = allow deployment |
| Vehicle Ignition system | Engine Control Unit, OBD port | Vehicle engine on/ vehicle engine off | vehicle off = allow deployment vehicle on = retract; do not allow deployment |
| Key FOB actuation sensor | BCM, DCU | Door locked/ unlocked using FOB | door unlocked = deploy; door locked = retract |
| Key FOB proximity sensor | BCM, DCU | Driver approaching vehicle | driver crosses into threshold proximity = deploy; driver crosses out of threshold proximity = retract |
| Transmission system | TCU, OBD port | Transmission status | in park = deploy; allow deployment in gear = retract; do not allow deployment |

The above chart shows a simplified depiction of the step movement decisioning process. It will be appreciated that a variety of combinations of the above or other inputs and decisioning schemes can be used to determine when to move the step. For example, while not specifically illustrated in the flowchart, depending on the embodiment, input from an override switch can be used in combination with door opening and closing information by the decisioning algorithm. For instance, It will be appreciated that the override would supersede the algorithm set forth in the flowchart of FIG. 6. Another illustrative example which involves the use of a combination of vehicle speed information and door opening and closing information will now be described.

As indicated in the above chart, vehicle speed can be used in some cases to control movement of the step. Vehicle speed information can originate from any appropriate vehicle electronics, such as a speedometer, engine computer, a wheel speed sensor or other speed sensor, a transmission system component, or the like. Referring to FIG. 3, speed information can be forwarded directly to an OBD or other vehicle port 318. Or speed information can be sent to a vehicle computing system 316 (e.g., a transmission control unit (TCU), speed control unit (SCU), or engine control unit (ECU)). The vehicle computing system 316 in such cases can provide access to the speed information (e.g., after processing) via one of the ports 334, 336 of the computing system 316, or can instead process the speed information and forward the processed information to an OBD or other stand-alone port 318.

However obtained, the vehicle interface and/or step system controller can utilize the vehicle speed information in concert with door opening and closing information, as desired. As one example, when the vehicle is either not moving, or is moving, but below a threshold speed, the step system retracts and deploys the step in response to door openings and closings as indicated with respect to the flow chart above. However, when a step is deployed at the time the vehicle speed exceeds the threshold speed, the algorithm specifies that the step will retract even if a door is open (e.g., ajar). This can be useful where a door is slightly ajar or otherwise not completely closed, but the driver continues to drive the vehicle because it escapes her notice. The algorithm can additionally specify that while vehicle speed is above the threshold, the step will not deploy, even in response to door openings. The threshold speed can vary, but can preferably be a relatively low value in some cases, and in one embodiment is a value less than 5 mph. According to other embodiments, the threshold is a value less than 1, 2, 10, 15, 20, 25, 30, or 40 mph, or falls within a range of between about 1 mph and about 30 mph, between about 2 mph and about 20 mph, between about 3 mph and about 15 mph, or within some other range. In yet other cases, the threshold value is about 3, 4, 5, 6, 7, 8, 9, 10, 15, or 20 mph.

In another illustrative example, vehicle engine on/off information can be used in combination with door opening and closing information. For example, step deployment may be disabled if the vehicle is running, even if the corresponding door is opened.

Remotely Controllable Automated Step and Lighting System

Figure 7:
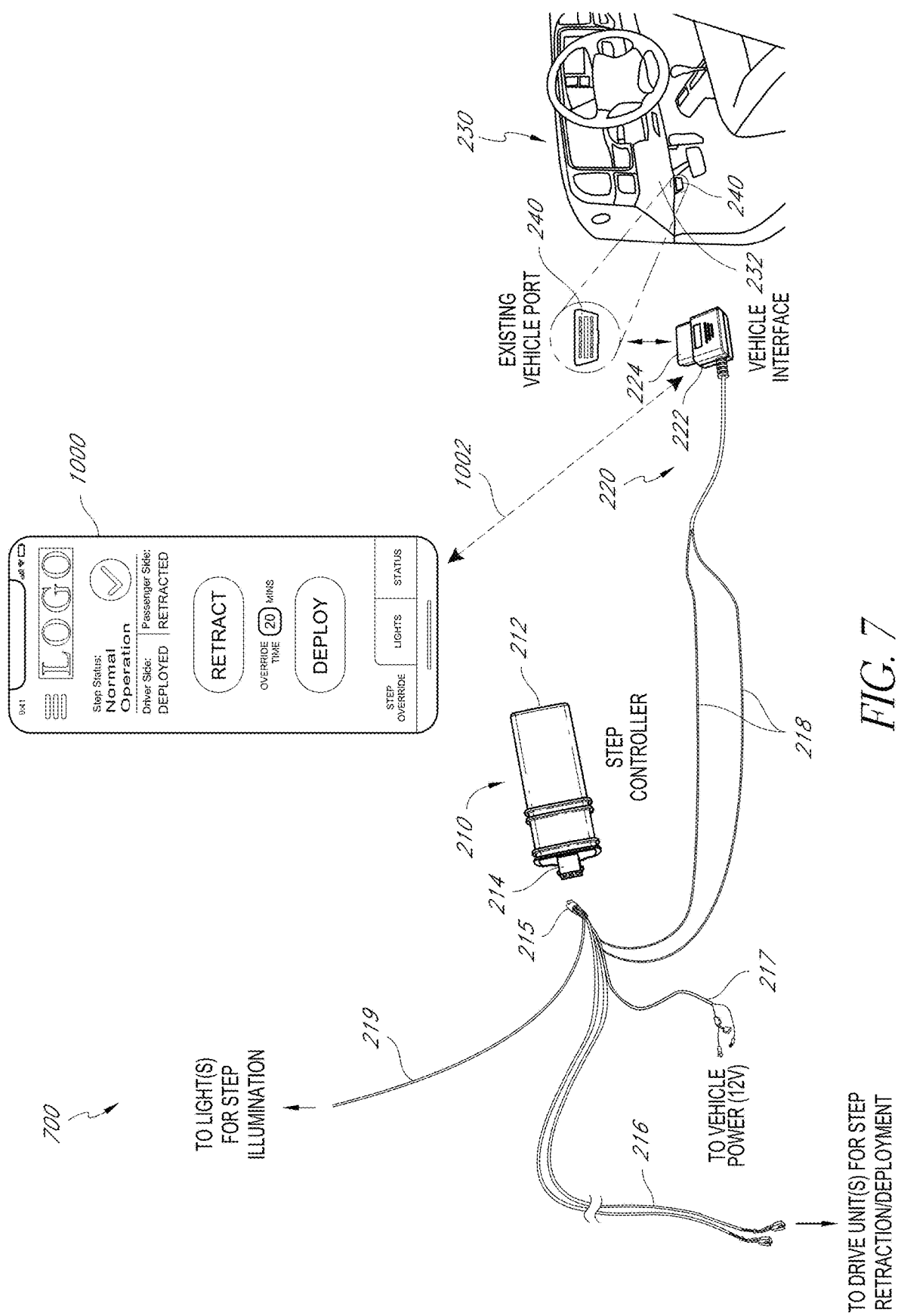
FIG. 7 illustrates an embodiment of a remotely controllable step and lighting system.

FIG. 7 illustrates an embodiment of a remotely controllable retractable step and lighting system 700. The system 700 can be configured to enable automated control of a retractable step and/or lights and also to enable interaction with and control of the system by a remote device 1000. The remotely controllable retractable step and lighting system 700 illustrated in FIG. 7 shares many similarities to the system illustrated in FIG. 2A, described above, and like reference numbers are used to refer to like components. The features and techniques described herein, however, are not limited to be used in only the type of system illustrated in FIGS. 2A and 7, which utilize a vehicle interface 220 configured to couple to an already existing vehicle port 240. The same or similar features as described herein with respect to a remotely controllable step and lighting system may also be used in other types of systems, such as systems that are integrated with the vehicle at the factory (e.g., an OEM system), an add-on system that splices into existing wiring of the vehicle, an add-on system that does not tap into and/or communicate with the existing vehicle wiring, and/or the like.

The various remotely controllable step and lighting systems disclosed herein comprise one or more of a variety of features that can be beneficial from a safety, efficiency, and/or user-friendliness standpoint. For example, various systems disclosed herein include the ability to remotely implement sophisticated overrides that can temporarily override automatic operation. For example, there may be many instances that a user may wish to temporarily disable or override the automatic operation of their system, such as when the user is conducting maintenance on the vehicle, traversing complex off-road terrain, demonstrating features of the system, and/or the like. The systems disclosed herein enable a user to conveniently conduct such overrides using a portable wireless device, such as a smart phone, while addressing various potential safety and/or property damage concerns that come along with such a system. For example, systems disclosed herein may implement one or more of the following beneficial features: automatically ending an override after a predetermined period of time, desisting from moving a retractable step even after the end of a timed override until some other event such as a door opening or closing occurs, displaying selectable notifications via a remote device that enable a user to extend a timed override, displaying selectable notifications via a remote device that require confirmation by a user prior to initiating a retractable step movement, logging operational data and making available detailed operational data for troubleshooting, and/or the like.

Figure 18A:
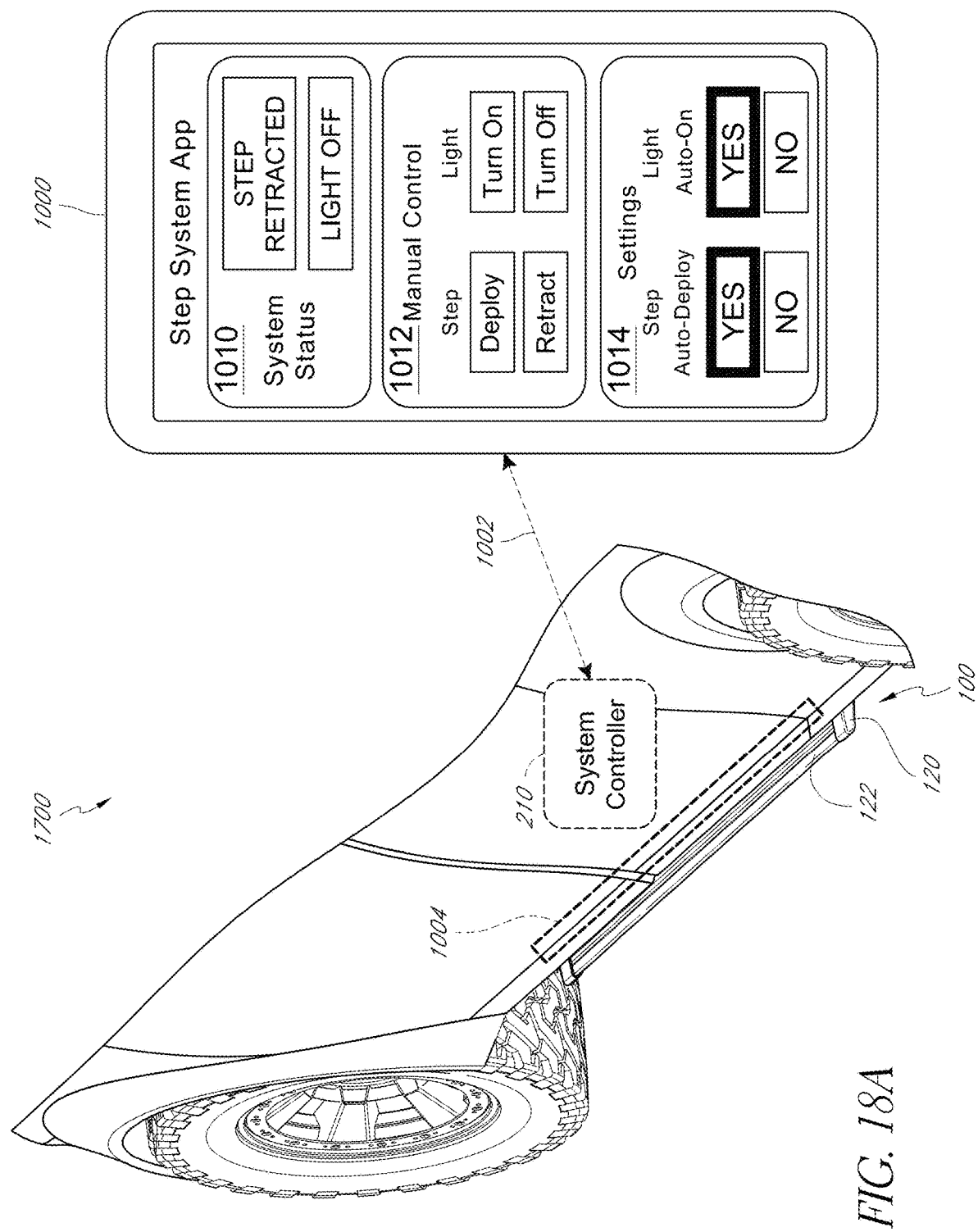
FIGS. 18A-18B illustrate another embodiment of a remotely controllable step and lighting system installed on a vehicle, with the step in retracted (FIG. 18A) and deployed (FIG. 18B) positions.
Figure 18B:
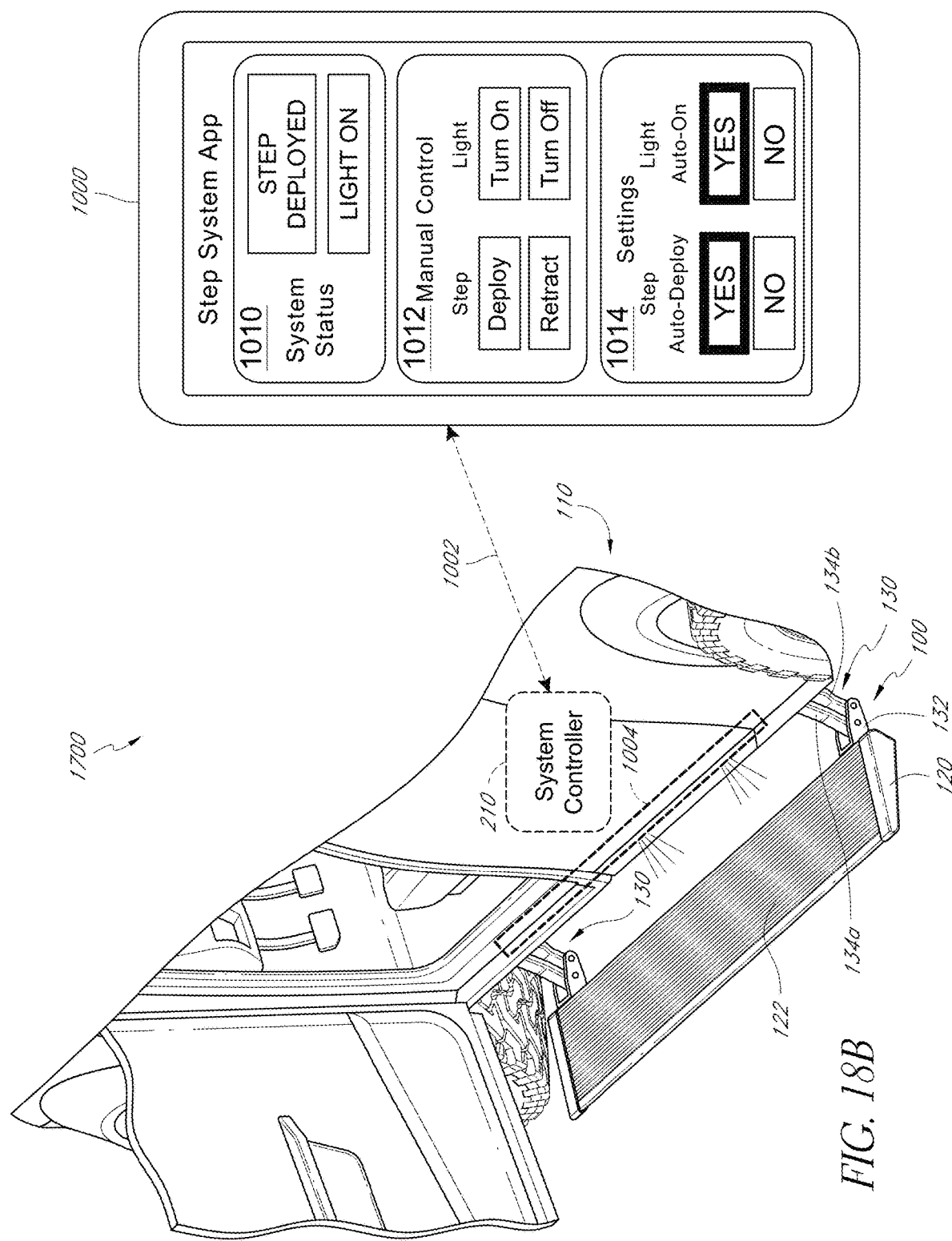

With reference to FIG. 7, the system 700 comprises a step controller 210 that is configured to control operation of one or more retractable steps via wiring 216 and one or more lights through wiring 219 (such as lights 1004 shown in FIGS. 18A and 18B and/or other vehicle lights). Although this embodiment is configured to control both steps and lights, it should be appreciated that, with respect to this and other systems described herein, they do not necessarily all have to be configured to control both steps and lights. For example, any system disclosed herein that is described as controlling both steps and lights could also be modified to control only steps or to control only lights. Further, other features of a vehicle may be controlled by other versions of the systems disclosed herein.

The remotely controllable retractable step and lighting system 700 further comprises a vehicle interface 220 configured to couple to an existing vehicle port 240 in order to monitor the status of one or more vehicle features, such as whether a door is open or closed. Similarly to as described above with respect to other embodiments, the system can be configured to monitor such vehicle features and automatically control the steps and/or lights in response to status changes. The system 700 includes a variety of additional features, however, that can enhance the usability, functionality, and safety of the retractable step system. These features can be accessed by, controlled by, and/or configured by a remote device 1000 that desirably communicates with another portion of the system via a wireless communication link 1002. For example, the remote device 1000 may be used to instruct the system to place the retractable step into an override condition in the retracted or deployed position. Such override positions may be desirable, for example, when servicing the vehicle, when washing the vehicle, when traversing rough terrain, such as on an off-road excursion, and/or the like. As further described below, the system can implement sophisticated algorithms and safety mechanisms that allow such overrides to be more useful, user-friendly, and safe than if the retractable step were manually operated by a mechanical toggle switch.

With further reference to FIG. 7, this embodiment illustrates a version wherein the remote device 1000 communicates with the vehicle interface 220 via a wireless communication link 1002. The wireless communication link 1002 may desirably comprise a BLUETOOTH® communication protocol, although any other suitable wireless communication protocol may be used. Further, the wireless radio of the system that the remote device 1000 communicates with may be positioned anywhere in or on the vehicle, and does not necessarily need to be part of the vehicle interface 220. For example, the system 700 may comprise a radio for communicating with the remote device 1000 that is part of the controller 210, part of the vehicle interface 220, positioned elsewhere and not a part of either of those components, and/or the like. Further, the radio that communicates with the remote device 1000 may be positioned within the passenger compartment of the vehicle, within the engine compartment of the vehicle, on an exterior of the vehicle, and/or the like. Further, in some embodiments, the radio may be positioned at one location, and an antenna for the radio may be positioned at another location, such as a location that will provide for a more stable connection to the remote device 1000.

Although the physical location and protocol used by the system's radio that connects with the remote device 1000 can take several forms and be positioned in a variety of locations, the configuration illustrated in FIG. 7 has a variety of benefits. For example, BLUETOOTH® can be a desirable communication protocol to use, since many existing consumer devices, such as smartphones, include built in support for the BLUETOOTH® protocol. BLUETOOTH®'s performance can be degraded, however, by high temperatures, such as the types of high temperatures that would be experienced if the radio were in the engine compartment of the vehicle. Accordingly, if the step controller 210 is configured to be positioned within the engine compartment, and the vehicle interface 220 is configured to be positioned within the passenger compartment, it can be desirable to have the radio that communicates with the remote device 1000 be part of the vehicle interface 220 instead of the step controller 210. Further, in addition to the temperature considerations, in a configuration such as is shown in FIG. 7, the vehicle interface 220 is desirably located closer to the driver of the vehicle than the step controller 210, and thus there will desirably be a shorter distance between the remote device 1000 and vehicle interface 220 than the distance between the remote device 1000 and the step controller 210. Further, many vehicle bodies comprise a variety of metal components that may tend to interfere with a wireless signal that is trying to pass from the engine compartment to the passenger compartment. Additionally, regardless of where the radio is positioned, utilizing a wireless communication link to the remote device has additional benefits, such as allowing the user to position the remote device wherever it is most visible and/or convenient, allowing the user to control the steps and/or lights when the user is outside of the vehicle such as when performing maintenance or demonstrating the system, and/or the like.

With further reference to FIG. 7, the system 700 is desirably configured such that serial data can be transmitted from the vehicle interface 220 to the step controller 210. For example, as described in greater detail above, the vehicle interface 220 may be configured to acquire data from the existing vehicle port 240 and forward at least some of that data on to the step controller 210. In some embodiments, the vehicle interface 220 is configured to transmit such data using a different serial protocol than used to receive the data from the existing vehicle port 240. For example, the vehicle interface 220 may use a LIN (Local Interconnect Network) protocol, RS-232 protocol, and/or any other suitable data transfer protocol. Transmitting such data from the vehicle interface 220 to the step controller 210 can have a variety of benefits, such as, for example, enabling more sophisticated control logic and/or more sophisticated logging of operational data. In some embodiments, however, it may be desirable to utilize a binary signal between the vehicle interface 220 and step controller 210 instead of a serial data interface. For example, for simplicity, much of the system's processing logic may occur at the vehicle interface 220, and the vehicle interface 220 may simply output one or more binary signals (such as by grounding an output to pull an output low) to the step controller 210, with the binary signals acting as instructions to the step controller 210 to move a step, turn a light on or off, and/or the like.

In some embodiments, the step controller 210 may be configured to be compatible with either type of vehicle interface 220 (e.g., a vehicle interface 220 that outputs serial data to the step controller 210 or a vehicle interface 220 that outputs binary signals to the step controller 210). For example, the step controller 210 may be configured to monitor one or more connections between the step controller 210 and the vehicle interface 220, and to determine whether any communications between the step controller 210 and vehicle interface 220 comprise serial data (such as, for example, by determining that an input to the step controller 210 is rapidly switching between high states and low states in a fashion consistent with a particular serial protocol), or whether any communications between the step controller 210 and vehicle interface 220 comprise binary data (such as, for example, by determining that the input to the step controller 210 is being pulled to a high state or low state at less frequent intervals). In some embodiments, when the step controller 210 determines that binary signals are being provided by the vehicle interface 220, the step controller 210 can be configured to automatically operate in a binary fashion (such as, for example, by moving a step and/or turning on or off a light in response to an input to the step controller 210 being pulled high or low by the vehicle interface 220). Further, when the step controller 210 determines that serial data is being provided by the vehicle interface 220, the step controller 210 can be configured to automatically operate in a different fashion, such as, for example, by parsing the serial data received from the vehicle interface 220 and determining what to do with such data. For example, if the serial data received by the step controller 210 indicates that a door associated with a particular retractable step and/or light system has been opened or closed, the step controller 210 may be configured to cause the associated step to deploy or retract and/or the associated light system to turn on or off. Operating using such serial data instead of binary signals can be beneficial, for example, because less wiring may be required, the communication may be more robust and/or less susceptible to interference or false signals, the controller 210 may be able to obtain and act on more data, and/or the like.

FIG. 7 illustrates an example where the vehicle interface 220 is directly wired to the step controller 210 via wiring 218. Various embodiments may utilize a different arrangement, however. For example, for simplicity, FIG. 7 illustrates the wiring 218 as directly connecting the vehicle interface 220 and the step controller 210 without any intermediate connections. In some embodiments, however, there may be one or more connectors and/or splices in the path followed by wiring 218. Further, wiring 218 may form at least part of a communication bus that multiple devices can connect to and/or communicate via. For example, some embodiments may comprise more than one vehicle interface 220, each configured to connect to a different existing vehicle port and/or to tap into a different portion of the vehicle's wiring. As another example, some embodiments may comprise one or more additional control and/or monitoring modules configured to communicate via the communication bus on wiring 218, with the one or more additional control and/or monitoring modules configured to control and/or monitor at least a portion of the retractable step system. For example, in some embodiments, instead of the step controller 210 directly controlling the step motors, there may be one or more separate modules that communicate with the step controller 210 via the communication bus, with those one or more separate modules controlling the step motors. In such an embodiment, the one or more separate modules may also be configured to monitor the operation of the step motors, such as by monitoring current and/or other parameters, and to transmit data based on the monitoring to the step controller 210 and/or vehicle interface 220 via the communication bus that utilizes wiring 218.

With further reference to FIG. 7, the remote device 1000 desirably comprises a touchscreen user interface, such as would be provided by a smartphone, such as an iPhone device or Android device. This allows for a user friendly interface that can provide relevant information to the user and allow the user to control features of the system. The systems described herein are not limited to being controlled with a smartphone device, however, and any other remote device that includes the ability to display a user interface similar to as described herein and receive commands from a user as described herein may be utilized. For example, alternative remote devices may comprise a tablet computer, a laptop computer, a dedicated remote device that is not a general purpose smartphone or computer, and/or the like. Further, although it is desirable to have the remote device 1000 communicate with the rest of the system via a wireless communication link, some versions of the system may utilize a wired communication link. For example, the remote device 1000 may be a portable device, such as a smartphone or the like, and may be able to connect to the rest of the system through a USB connection or the like. This could, for example, have a benefit of enabling the system to charge the remote device via the USB cable while the device is also communicating with the system. As another example, particularly if the remote device 1000 is a dedicated device that is intended to be permanently or semi-permanently installed in the vehicle to control the steps and/or lights, it may be desirable to have a wired connection to that remote device, such as to increase the reliability of the communication link between the remote device and the rest of the system.

Figure 8B:
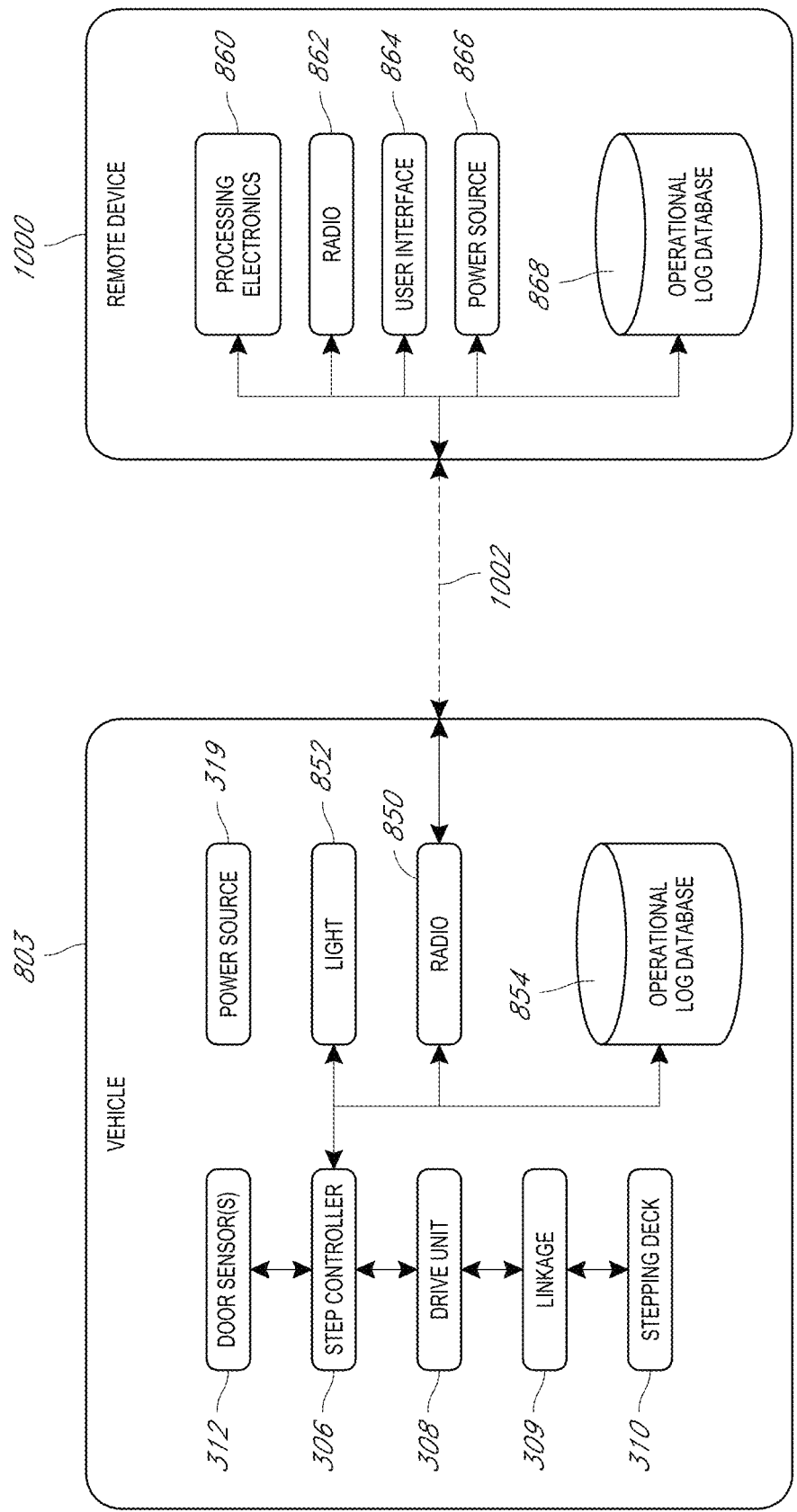

FIGS. 8A and 8B illustrate example embodiments of block diagrams of remotely controllable retractable step and lighting systems 801 and 805, respectively. With reference to FIG. 8A, the remotely controllable retractable step and lighting system 801 is similar to the system 700 illustrated in FIG. 7, as described above, but shown in block diagram format to illustrate further components of the system. The system 801 comprises an existing vehicle 802 and a remote device 1000. The existing vehicle 802 is similar to the existing vehicle 302 illustrated in FIG. 3, as described above, and like reference numbers are used to refer to like components. One difference with respect to the system of FIG. 3, however, is that the automated step system 800 comprises additional components with respect to the automated step system 300 of FIG. 3. For example, the automated retractable step system 800 further comprises a radio 850 configured to communicate with the remote device 1000 via wireless communication link 1002. In this embodiment, the radio 850 is a part of the vehicle interface 304, but other embodiments may position the radio 850 elsewhere.

The system 800 further comprises one or more lights 852 that may be controlled automatically and/or manually by the system. In this embodiment, the light 852 is shown as part of the automated retractable step system 800, which may be the case, for example, if the light 852 is a step illumination light added to the vehicle as part of adding the automated retractable step system 800 to the vehicle. In other embodiments, the system may be configured to control already existing lights of the vehicle in lieu of or in addition to lights that are added as part of the retractable step system. Another difference from the embodiment of FIG. 3 is that the automated step system 800 further comprises an operational log database 854. The operational log database 854 may be configured to, for example, store historical data related to motor current when moving the retractable step, fault data, and/or the like. Such data may be useful, for example, to allow better detection of future faults and/or to allow easier troubleshooting of potential issues.

With continued reference to FIG. 8A, the remote device 1000 comprises processing electronics 860, a radio 862, a user interface 864, a power source 866, and an operational log database 868. The remote device 1000 may, for example, be a smartphone, but may alternatively be other types of remote and/or portable computing devices. The processing electronics 860 may, for example, comprise one or more computer processors and other electronic components that enable the remote device 1000 to implement computer software, present information to a user through the user interface 864, and/or receive commands from the user through the user interface 864. The radio 862 may be used to, for example, communicate with the radio 850 of the vehicle 802 via the wireless communication link 1002. The radios 862 and 850 desirably communicate via a BLUETOOTH® communication protocol, but other communication protocols may also be used. In some embodiments, the remote device 1000 comprises one or more additional radios that are used for other wireless communication links, such as a cellular data link or a WI-FI® data link.

The power source 866 desirably comprises a battery that can be used to power the remote device 1000 without needing to be plugged into an external power source. The operational log database 868 can be configured to store similar information as the operational log database 854 of the vehicle 802. In some embodiments, there is only a single operational log database that is kept at either the remote device 1000 or the vehicle 802. It can be desirable, however, to have operational log databases 854, 868 located at both locations, such as to better track historical motor current, faults, and/or the like. For example, in some embodiments, the operational log database 854 of the vehicle 802 may be configured to store operational information in real time, even if the remote device 1000 is not currently connected to the system. At a later time, when the remote device 1000 does connect to the system, some or all of the operational data stored in the operational log database 854 may be transmitted to the remote device 1000 via the wireless communication link 1002 to be stored in the operational log database 868 of the remote device 1000. One benefit of such a configuration is that, if a user wishes to troubleshoot the system using the remote device 1000, the user may be able to do so even at a time when the remote device 1000 is not currently connected to the vehicle 802 through the wireless communication link 1002.

FIG. 8B illustrates an alternative embodiment of a block diagram that is similar to the version illustrated in FIG. 8A, but has the remotely controllable step and lighting system integrated into the vehicle 803, such as in an OEM system, instead of using a vehicle interface that attaches to an existing vehicle port. In some embodiments, the radio 850 may comprise an existing radio of the vehicle 803 that also communicates with the remote device 1000 for other purposes. For example, the radio 850 may comprise a BLUETOOTH® radio that communicates with the remote device 1000 to allow the user to make phone calls through the vehicle's entertainment system, to allow the user to control entertainment options of the vehicle's entertainment system, and/or the like, in addition to transmitting data back and forth for monitoring and/or control of the retractable step and lighting system.

Remote Device Graphical User Interface

FIGS. 9A-9H, 10A-10B, 11A-11C, 12A-12E, and 13A-13C illustrate various example graphical user interface configurations of a remote device, such as the remote device 1000 of the remotely controllable retractable step and lighting systems 700, 801, and 805 of FIGS. 7, 8A, and 8B, respectively. FIGS. 9A-9H illustrate features related to connecting the remote device to the retractable step system and features available during an idle or home screen process of the remote device. FIGS. 10A and 10B illustrate features related to lighting control. FIGS. 11A-11C illustrate features related to the status and historical logging of the system. FIGS. 12A-12E illustrate various features that allow configuration of settings for the system. FIGS. 13A-13C illustrate various notification features of the system. The graphical user interfaces illustrated in these various figures may, for example, be part of an app run on a smartphone or similar device. Further, although these figures illustrate specific examples of how a graphical user interface may be displayed, what interactive features may be included, and the like, various modifications may be made to implement the same or similar functionality as described herein.

Figure 9C:
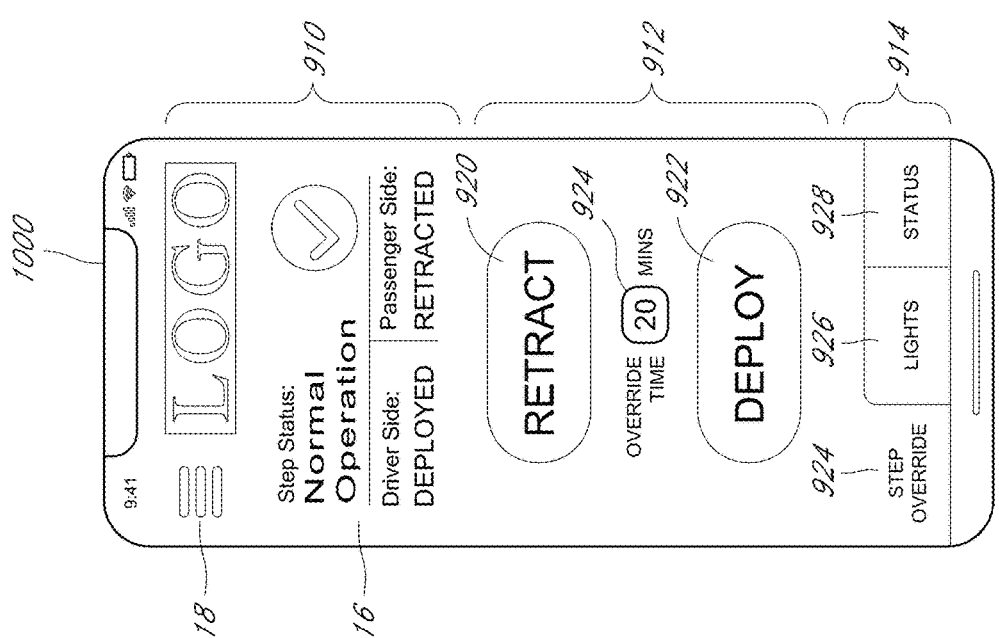
Figure 9B:
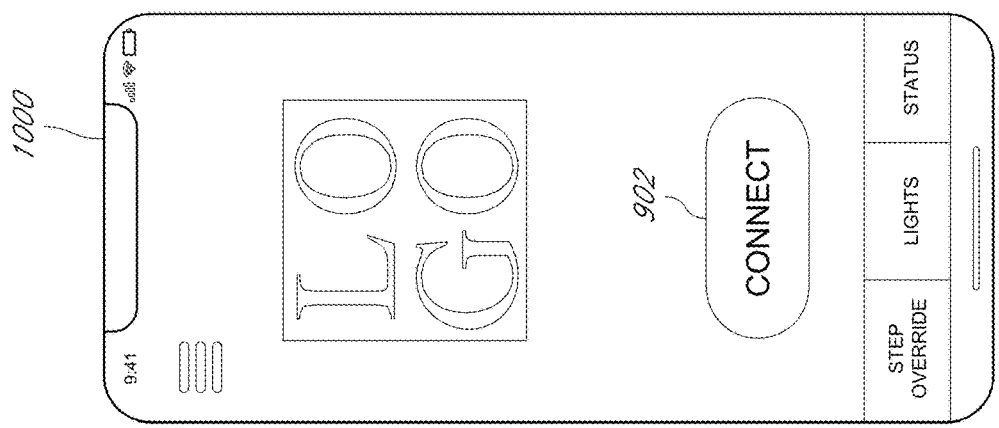
Figure 9A:
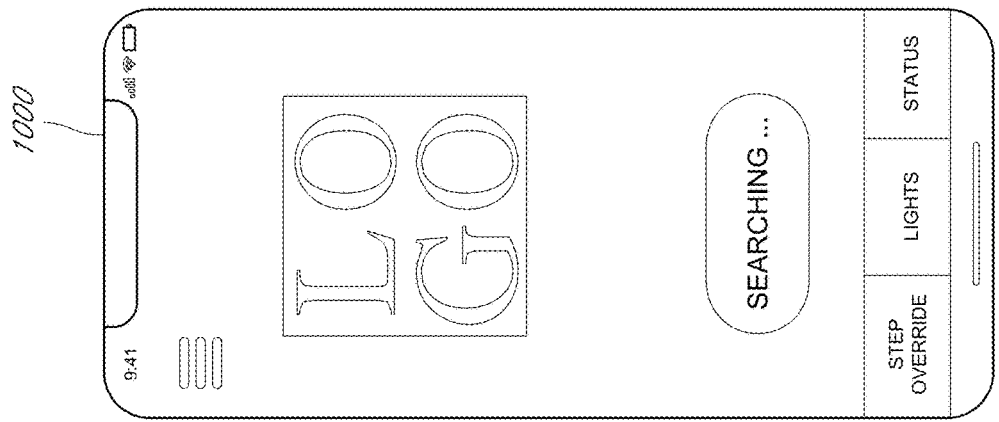

With reference to FIGS. 9A-9H, these figures illustrate a variety of graphical user interface features of the remote device 1000 that enable a user to connect to a retractable step system, monitor the operation of the retractable step system, and control various features, such as sophisticated step and/or light overrides of the system. With reference to FIGS. 9A and 9B, when the application is opened on the remote device 1000, the remote device 1000 may initially search for an available remotely controllable step system, as illustrated in FIG. 9A, and provide the user with an option to connect to the system once it is found, as shown in FIG. 9B. For example, if a remotely controllable system is available for the remote device 1000 to connect to, a user may click on button 902 shown in FIG. 9B to initiate the connection. Once button 902 is pressed, the remote device 1000 may then initiate a BLUETOOTH® connection with the rest of the remotely controllable step system (e.g., with the radio 850 shown in FIGS. 8A and 8B).

In some embodiments, the remote device 1000 may be configured to automatically connect to the step system upon opening the app, without requiring a user to manually request the connection. Further, as described in greater detail below, in some embodiments, the system is configured such that the remote device 1000 can monitor and display at least certain parameters of the system without having to initiate a formal BLUETOOTH® connection between the remote device 1000 and the vehicle system. Further, although the screenshot shown in FIG. 9B illustrates a button 902 with the word "connect" on it, in some embodiments, pressing the connect button 902 may not necessarily result in an immediate formal BLUETOOTH® connection between the remote device 1000 and the vehicle system, but rather may result in the remote device 1000 merely monitoring and displaying information received in advertising packets that are transmitted by the radio of the vehicle system without needing to have a formal connection between the remote device 1000 and vehicle system.

FIG. 9C illustrates an example embodiment of an idle process screen or home screen that may be displayed by the remote device 1000. For example, the user interface illustrated in FIG. 9C may act as a dashboard that is regularly updated to indicate to the user the current status of the system, and may also include controls that allow the user to implement certain features, such as overriding the position of the step.

The user interface illustrated in FIG. 9C comprises a header portion 910, a controls portion 912, and a tabs portion 914. The header portion 910 can be used to, for example, indicate to the user various status data, such as whether the retractable step and lighting system is operating normally and the current status of one or more steps, such as a driver side step and a passenger side step. The status data may be displayed, for example, in the status area 916 of the header portion 910. Further, the header portion 910 may comprise a settings button 918 that allows a user to access certain settings of the app, as further described below with reference to FIGS. 12A-12E.

With continued reference to FIG. 9C, the controls portion 912 of the user interface may comprise one or more buttons and/or other interactive user interface features that allow a user to control the retractable step system, such as by commanding the step or steps to be overridden into a retracted or deployed position. In this embodiment, the controls portion 912 comprises a retract button 920, a deploy button 922, and an override time control 924. As an illustrative example, if a user wishes to override the system and cause the steps to remain in the deployed position for a certain period of time, regardless of the position of the vehicle doors, the user could press the deploy button 922, which would desirably result in causing the system to override the steps into the deployed position for a certain amount of time (in this embodiment, 20 minutes, as indicated by the override time control 924). The override time control 924 may be configured to enable the user to set a particular amount of time that will define the duration of the override.

The embodiment illustrated in FIG. 9C (and several other figures described herein) illustrates a single retract override button 920 and a single deploy override button 922. Desirably, when either of the retract or deploy buttons 920, 922 is pressed, the system can be configured to override all retractable steps of the system (such as the driver side step and the passenger side step in a two step system, two driver side steps and two passenger side steps in a four step system, and/or the like) in the desired direction simultaneously. Such a configuration can be desirable, for example, from a user experience and/or convenience perspective, because the user does not need to select which specific step or steps should be overridden. Further, this can be a feature that increases the safety of the system, for example, because a user may otherwise accidentally override one step when the user intended to override a different step.

In some embodiments, however, the system may be configured to enable a user to individually override a single step and/or a group of steps that comprises a subset of the total number of steps. For example, with reference to FIG. 9C, the user interface may include a separate retract button 920 and deploy button 922 for each individually controllable step or group of steps. In some embodiments, even if there are multiple retract and deploy buttons 920, 922, there may be a single override time control 924 that applies to all of them. In some embodiments, however, there may also be separate override time controls 924 that apply to each individually controllable step or group of steps. In some embodiments, when the system is configured to enable a user to request an override for an individual step or group of steps, the system may be configured to continue automatic operation of the remaining step or steps. Likewise, the process flow chart figures discussed herein (such as FIGS. 14, 15, and 19 discussed below) are described with respect to a system that enables a user to simultaneously override all of the steps into a particular direction (such as via the user interface illustrated in FIG. 9C). In an embodiment that includes the ability for a user to request overrides for a specific step or group of steps, however, the process flows can be adjusted accordingly. For example, any decision blocks that depend on whether an override is active, expiring, expired, requested, renewed, and/or the like, may be specific to a specific step or group of steps, and the corresponding process flow blocks for that step or group of steps may be duplicated for each additional step or group of steps.

In some embodiments, the duration of the override may be able to be defined as infinite or indefinite, meaning the override remains in effect until manually or otherwise canceled. It can be desirable, however, to include a timer that can automatically end an override after a certain amount of time has passed. Such a feature can make the retractable step system more useful and user-friendly, for example, because in many cases when a user would wish to override the automated positioning of the retractable steps, it would only be for a relatively short duration of time, and setting an automated timer may eliminate the need for the user to remember to manually cancel the override. Automatically ending an override can also help to prevent damage to the vehicle and/or the vehicle's surroundings if, for example, the user forgets to manually end an override in the deployed position before driving the vehicle.

Including a countdown timer in an automatically ending override may also present potential safety risks, however. For example, if the system is configured to override a step into a retracted or deployed position for certain amount of time, and the step were to automatically revert to the other position at the end of that time, such an operation may surprise a user who was not expecting the step to move, and may even lead to injury if, for example, a user is standing next to the step and/or working on the vehicle near the step at the time the step moves. Accordingly, the systems disclosed herein can comprise a variety of safety features that address these potential issues. For example, in some embodiments, the system is configured such that, once the duration of the override has passed, the step will not immediately move at the end of the override, but rather the system will return to automated operation of the step that causes the step to move in response to a change in status of a vehicle component, such as a door opening or closing. In such a configuration, if, for example, the step was overridden into a retracted position for 20 minutes, at the end of that 20 minutes the step would not necessarily immediately extend, but rather the system would wait for a door associated with that step to open, at which time the step would then deploy as it would normally during automated operation.

Another safety feature of various systems disclosed herein is that the system can be configured to notify a user of an upcoming override expiration prior to the override expiring, and allow the user to extend the override time before the override expires. This may, for example, enable an override duration to be easily extended without any further automated movement of the step. In some embodiments, the system can be configured to enable the user to "extend" the override even after the override timer has elapsed, if no automated step movement has occurred yet since the override timer elapsed.

With continued reference to FIG. 9C, the tabs portion 914 of the user interface comprises a plurality of selectable tabs 924, 926, 928 that enable the user to access various portions of the software. In this embodiment, the step override tab 924 is selected, which corresponds with showing the rest of the user interface (such as the controls portion 912 and header portion 910) as they are shown in FIG. 9C. If a user selects the lights tab 926, the features illustrated in FIGS. 10A and 10B, described below, may be shown. Further, if the status tab 928 is selected, the features illustrated in FIGS. 11A-11C, described below, may be shown.

With reference to FIG. 9C, the remote device 1000 desirably continuously and/or regularly update the status information illustrated in the header portion 910 based on data received from another portion of the retractable step system via a wireless communication link. In some embodiments, the status information illustrated in the header portion 910 can be based on data received via a BLUETOOTH® connection wherein the remote device 1000 subscribes to one or more variables to be transmitted from the rest of the system to the remote device 1000. In some embodiments, the status information illustrated in the header portion 910 may at least in some instances be presented based on data advertised by the rest of the system in a BLUETOOTH® advertising packet, without the remote device 1000 being required to initiate a formal BLUETOOTH® connection to the rest of the system. Further details of such advertising packet are described below with reference to FIG. 15 B.

Figure 9F:
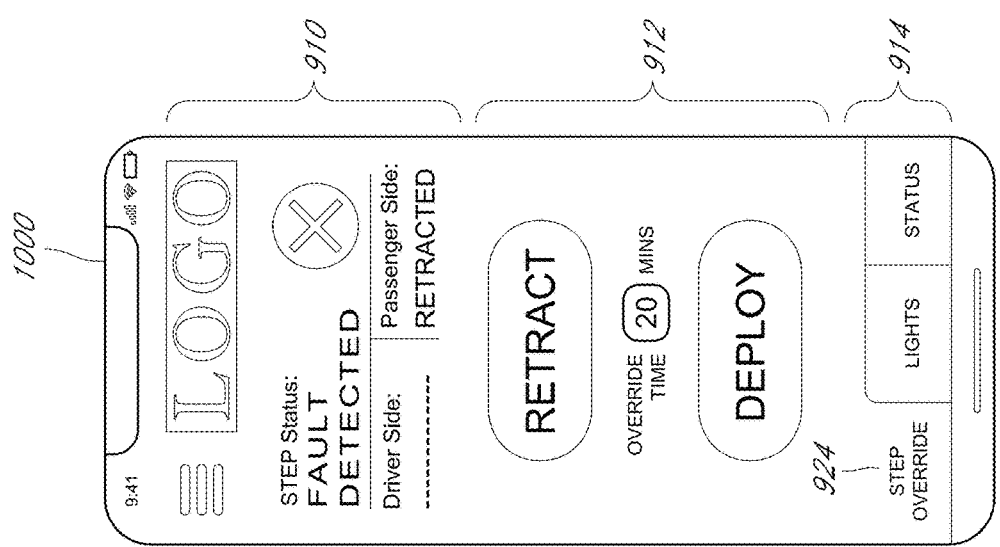
Figure 9E:
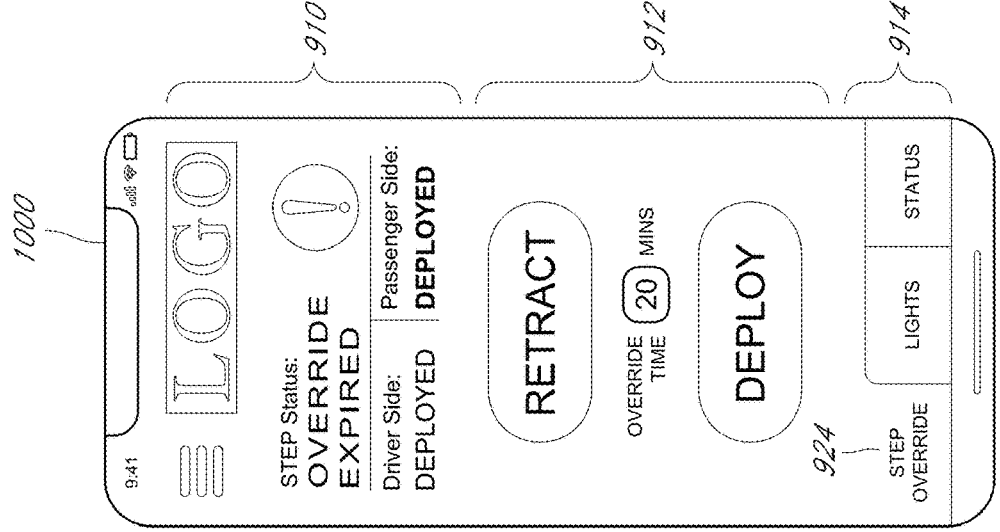
Figure 9D:
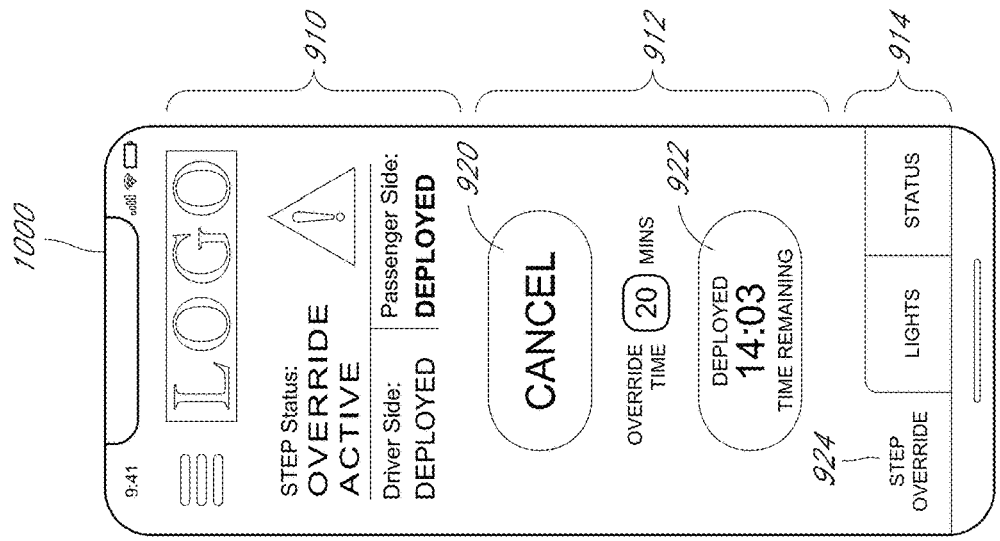
Figures 10A, 10B:
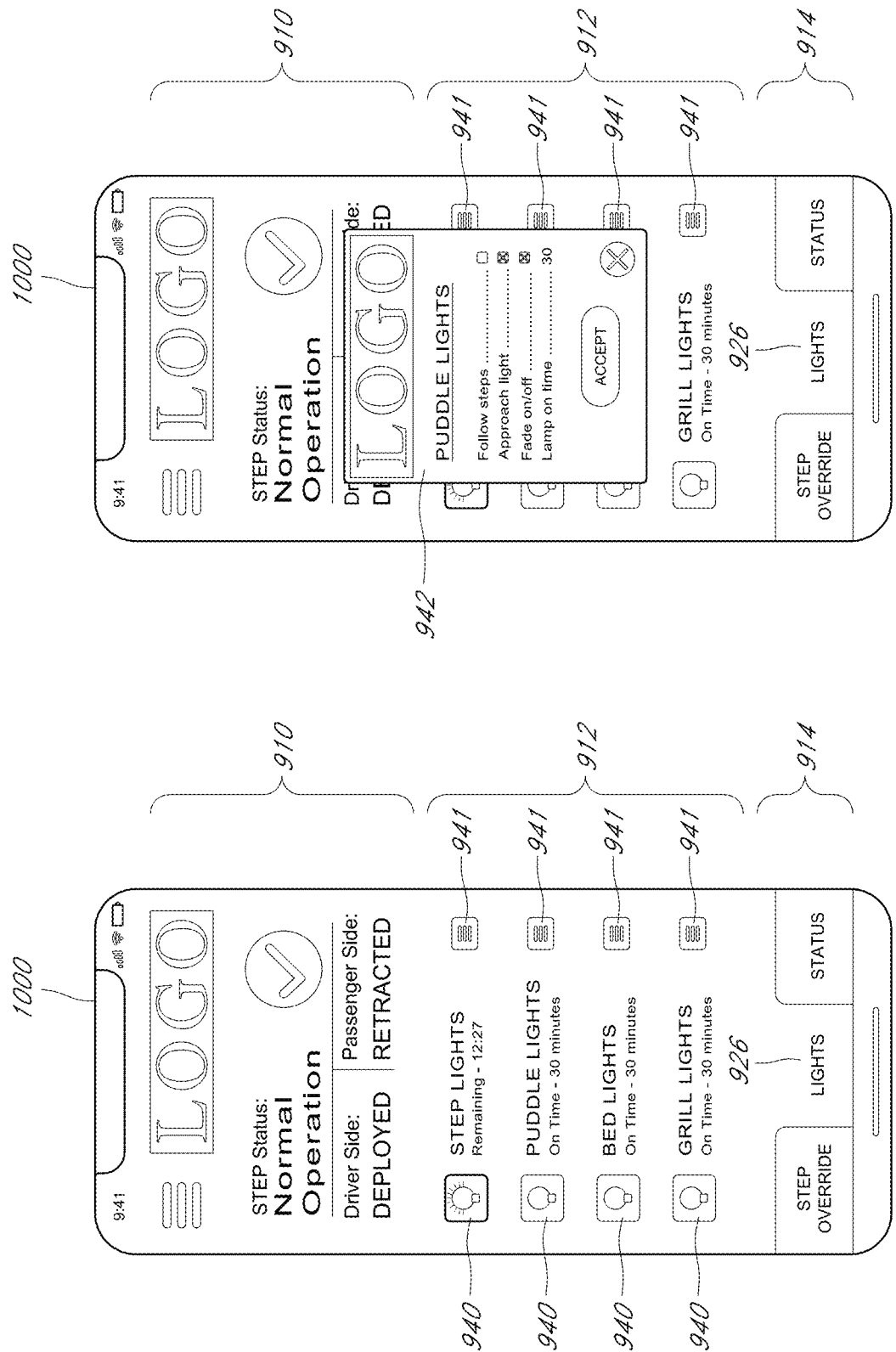
FIGS. 10A-10B illustrate additional graphical user interface features of the remote electronic device of FIGS. 9A-9H relating to lighting control.

FIGS. 9D-9F illustrate additional examples of how the user interface of the remote device 1000 can be updated to display different information and/or to enable different user inputs while on the step override tab 924, and while the remote device 1000 is receiving data from the rest of the system, such as through BLUETOOTH® advertising packets and/or through a BLUETOOTH® connection with a subscription to certain variables of the system. With reference to FIG. 9D, the header portion 910 has been updated to indicate that a step override is currently active. Further, the controls portion 912 has been updated such that the top button 920 has been changed to a cancel button that, for example, can enable a user to cancel the present override before the override timer runs out. The bottom button 922 in this embodiment has been changed to a "time remaining" indicator that indicates the current time remaining in the active override. In this case, 14 minutes and three seconds remain in the active override.

FIG. 9E illustrates the user interface of the remote device 1000 having been updated at the expiration of an active override. For example, with reference to FIG. 9D, once an additional 14 minutes and three seconds have elapsed, the user interface may be changed to the version shown in FIG. 9E. Specifically, the header portion 910 has been updated to indicate that the override has expired, and the controls portion 912 has been reverted back to the original version illustrated in FIG. 9C. The header portion 910 may desirably maintain the "override expired" status indicator until a vehicle feature that causes automatic movement of one or more of the steps is activated. For example, since in the situation illustrated in FIG. 9E, both steps are currently deployed, the system may be configured to maintain the "override expired" status indicator until a vehicle door associated with either step is closed, causing that step to retract. The header portion 910 may then desirably be changed back to indicate normal operation, such as is shown in FIG. 9C.

FIG. 9F illustrates an example of how the graphical user interface of the remote device 1000 may indicate that a fault has been detected. In this embodiment, the header portion 910 has been updated to indicate that a fault has been detected, and no deployed or retracted status is shown for the driver side, indicating the fault is with the driver side step. Such a fault may, for example, be based on detection of an over-current situation in the motor, a short circuit situation, a situation where the step did not move when it was supposed to move, and/or the like.

Referring now to FIG. 9G, this version of the graphical user interface illustrates a selectable notification 930 that may be displayed, for example, if the retract button 920 is pressed in FIG. 9C. In some embodiments, it may be desirable to have the steps immediately retract when the retract button 920 is pressed. In the present embodiment, however, it is desirable to have selectable notification 930 appear in the user interface prior to retracting the steps, to increase the safety of the system. The notification 930 tells the user that the steps will now retract and instructs them to make sure the steps are clear of obstructions. If the "continue" button of the notification 930 is pressed, the system will then proceed to retract the steps and enter into a timed override state. If the "cancel" button of the notification 930 is pressed, however, the override will not occur, and the user interface will revert back to the user interface illustrated in FIG. 9C. Using such a notification 930 before entering into an override state can increase safety for at least three reasons. First, it can help to avoid an accidental step movement resulting from an accidental press of the retract or deploy buttons 920, 922. Second, it can make sure the user is aware the steps are about to move, so that the user can double check that there are no obstructions (such as a part of the user's body, another person, and/or other object) prior to the steps moving. Third, if the user is inside the vehicle when the user requests the override, it can allow the user to exit the vehicle and press the "continue" button from outside the vehicle after the user has double checked that there are no obstructions.

FIG. 9H illustrates an example of a graphical user interface feature of the override time selector 924. For example, if a user selects the override time control 924, the control may popup the illustrated feature that allows a user to scroll up and down with his or her finger to adjust to the override time to 15 minutes, 20 minutes, 25 minutes, and/or various other times. In some embodiments, the system may be configured to enable a user to enter the desired override time using a keyboard or the like. Further, in some embodiments, the system may be configured to utilize a predefined default override time value, which may be changeable by the user in a separate setting screen, or in some embodiments may not be changeable by the user.

Remote Device Lighting Control

FIGS. 10A and 10B illustrate two options of what can be displayed on the lights tab 926 of the graphical user interface of the remote device 1000. Desirably, when the lights tab 926 is selected, the controls portion 912 is changed to illustrate controls that are relevant to lighting, but the header portion 910 can remain the same or similar to as it was shown in FIG. 9C and be regularly or continuously updated based on data received from the rest of the system through the wireless connection.

With reference to FIG. 10A, the controls portion 912 on the lights tab 926 desirably comprises one or more switches or buttons 940, each corresponding to a particular light or set of lights of the vehicle. The various lights that are controllable by the described system may be part of the retractable step system, may be part of the vehicle separate from the retractable step system, may be aftermarket add-on lights, and/or any combination of the foregoing. For example, in the embodiment illustrated in FIG. 10A, the bed lights may be part of the vehicle separate from the retractable step system, and the step lights may be part of the retractable step system. In some embodiments, the system is configured to communicate with the vehicle data bus in order to control some or all of the lights. In some embodiments, the system includes its own wiring for one or more of the lights that is able to directly control one or more of the lights without communicating with the vehicle data bus.

In some embodiments, the buttons 940 may be simple toggle switches that merely turn lights on or off. Desirably, however, turning on particular lights using the buttons 940 of the lights tab 926 operates similarly to the timed overrides of the steps discussed elsewhere herein. For example, when a light (or set of lights) is off, pressing the light's associated button 940 desirably results in the system turning the associated light on for a predetermined period of time. Once that predetermined period of time has elapsed, the light will be turned back off. With further reference to FIG. 10A, it can be seen that the step lights are currently on, and they will remain on for an additional 12 minutes and 27 seconds, unless the user presses the button 940 associated with the step lights, which would turn the lights off early. It can also be seen in FIG. 10A that the predetermined time that the other lights will be on for if their button 940 is activated is 30 minutes. Accordingly, if a user presses the button 940 associated with the puddle lights, the bed lights, and/or the grill lights, those lights will be turned on by the system and automatically turned off after 30 minutes, unless canceled earlier by the user. The light overrides may also in some embodiments be canceled automatically based on some other event, such as the vehicle being turned off, a particular amount of time elapsing after the vehicle has been turned off, the vehicle traveling over a certain speed, the vehicle's battery voltage dropping below a certain level, and/or the like.

The buttons 940 in this embodiment show whether a particular light or set of lights is currently on by changing the icon shown with the button 940. In this example, the step lights button 940 illustrates a lit up lightbulb, corresponding to those lights being on, and the other buttons 940 illustrate a lightbulb that is not lit up, corresponding to those lights not being on. Other embodiments may indicate whether a particular light or set of lights is on or off in a variety of other ways.

The controls portion 912 of the lights tab 926 further includes a settings button 941 corresponding to each of the lights or sets of lights. Pressing the settings button 941 will cause the user interface of the remote device 1000 to show a settings screen 942, as illustrated in FIG. 10B. In FIG. 10B, the puddle lights settings button 941 has been pressed, and accordingly the settings screen 942 includes the heading "puddle lights." In other embodiments, accessing a settings screen for the various lights may be accomplished differently, such as by pressing and holding on a particular light for a predetermined amount of time or the like.

With reference to FIG. 10B, the settings screen 942 enables a user to configure one or more settings of the light or set of lights that was selected. In this embodiment, four user-selectable settings are available, namely: follow steps, approach light, fade on/off, and lamp on time. The "follow steps" setting is desirably a binary setting that, when on, will cause the selected lights to toggle on and off with the steps as the steps are deployed and retracted. This may be desirable, for example, for lights such as step lights that are configured to illuminate the step when the step is in the deployed position. With such a light, it may be desirable to have the light come on when the step is deployed but then turned back off when the step is retracted.

Similar to the discussion above with respect to the illustrated embodiment including only a single deploy override button 922 and a single retract override button 920 (which are configured to simultaneously override every movable step of the system), the user interface illustrated in FIG. 10B includes a single "follow steps" setting that desirably causes, when activated, the selected lights to turn on and off when any step deploys or retracts, respectively. Such a configuration can simplify the user interface and enhance the user experience, for example, because the user can merely select a single setting instead of having to select multiple settings and/or associate each light with a particular step or group of steps. In some embodiments, however, the system may be configured to associate each light or group of lights with a particular step or group of steps, and to allow a user to adjust such associations through the user interface. For example, with continued reference to FIG. 10B, instead of having a single "follow steps" setting, the settings screen 942 could include two settings, such as a "follow driver side step" setting and a "follow passenger side step" setting, in a two step system. As another example, the settings screen 942 could include four settings in a four step system, such as a "follow front driver side step" setting, a "follow rear driver side step" setting, a "follow front passenger side step" setting, and a "follow rear passenger side step setting."

The "approach light" setting is also desirably a binary setting that, when on, will illuminate the selected lights when a user is approaching their vehicle, such as by illuminating the lights when the user presses the unlock button on their key fob. The "fade on/off" setting is also desirably a binary setting that, when on, will gradually increase the illumination of the lights when turning the lights on, and gradually decrease the illumination level of the lights when turning the lights off. Finally, the "lamp on time" setting desirably works similarly to the override time control 924 illustrated in FIGS. 9C and 9H in order to allow the user to set the amount of time the selected light will be on for if the user manually turns the light on using one of the buttons 940 shown in FIG. 10A. In some embodiments, the system may be configured to enable the user to set an infinite time, meaning the lights will remain on when toggled on with the button 940 until some other event occurs, such as manual cancellation, the vehicle being turned off, a certain amount of time passing after the vehicle has turned off, the vehicle's battery level dropping below a certain voltage, and/or the like.

Remote Device Status Monitoring and Reporting

FIGS. 11A-11C illustrate features of the status tab 928 of the user interface of the remote device 1000. The status tab 928 may be used to, for example, enable a user to review the current status of various portions of the system and/or vehicle and review potential faults or errors. FIG. 11A illustrates a version of the status screen 928 that might be displayed, for example, when the system is operating normally or within expected parameter ranges. The header portion 910 desirably remains the same as is shown in FIG. 9C, and is desirably regularly or continuously updated based on the current status of the system. The controls portion 912 has been changed, however, to indicate door status information, motor current information, and power supply voltage information. The door status information illustrates the present state of each door that is tracked by the remotely controllable step system. The information included in the door status portion may, for example, be obtained from the vehicle data bus, may be obtained from individual door sensors, and/or the like. The motor current information is desirably determined by the step controller monitoring the current draw of each retractable step motor as the steps are deploying and/or retracting. For example, the step controller 306 of FIG. 8B, or other step controllers disclosed herein, may monitor such current. In some embodiments, historical current measurements are stored, for example, in the operational log databases 854 and/or 868 of FIG. 8B, so that the system can calculate and/or display historical peaks, averages, and/or other statistics.

In FIG. 11A, the motor current and supply voltage are within the normal expected parameter ranges. FIG. 11B, however, illustrates an example where the supply voltage is below the expected range, and thus the supply voltage, in this case 8.8V, is highlighted and has a down arrow next to it to indicate to the user that the voltage is below the expected range. In some embodiments, the system may be configured to automatically stop moving the retractable steps and/or turning on lights when the system detects the supply voltage is below a predetermined level.

FIG. 11C illustrates another potential fault, wherein both the average motor current and the peak motor current for the driver side step motor are higher than expected. Accordingly, the user interface illustrates those two current levels in a highlighted fashion and with an up arrow next to them. In some embodiments, the system may be configured to stop automated movement of that step until the problem is fixed and/or a user overrides the stopped automated movement.

FIGS. 11A-11C illustrate one example of status data and fault indicators that can be illustrated to a user. Other embodiments may include more information, less information, different information, and/or the like. Further, other embodiments may highlight faults in a different way or may not even highlight faults. In some embodiments, if a fault is detected, the system may be configured to enable a user to click on a help or troubleshooting button that provides guidance as to why the fault may have occurred and/or what troubleshooting steps may be needed to troubleshoot the issue.

Remote Device System Configuration Control

FIGS. 12A-12E illustrate various settings and other options that can be accessed by pressing the settings button 918 of the user interface shown in FIG. 9C. For example, FIG. 12A illustrates a settings menu 1202 that can be displayed in response to pressing the settings button 918 of FIG. 9C. The user can access various features from this settings menu 1202. For example, if the user selects the "disconnect" option from the settings menu 1202, the remote device 1000 may disconnect from the rest of the remotely controllable vehicle step system (e.g., by ending the wireless communication link). If an override is currently active, however, then notification 1204 illustrated in FIG. 12B may desirably be displayed before the remote device 1000 disconnects from the rest of the system. This notification may indicate to the user that an override is currently active, and ask whether the current override should be continued as planned or merely canceled upon disconnection.

Such a selectable notification 1204 may enhance the safety of the system, because, otherwise a user may not be aware of how the steps are going to act upon disconnecting from the system, which could lead to accidental injuries and/or damage to property. In some embodiments, if the user wishes to continue the override as planned, the remote device 1000 may be configured to still provide a notification to the user when the end time of the override is approaching and/or has arrived (similar to as shown in FIG. 13B, described below), even if the remote device 1000 is no longer connected to the rest of the system. This can further enhance the safety of the system.

FIG. 12C illustrates a step settings screen that can be shown if, for example, the user clicks on "step settings" in the settings menu 1202 of FIG. 12A. In the step settings screen of FIG. 12C, a user can adjust various settings of the retractable step system, such as changing the priority level of remote devices 1000 that have been authorized to control the system, deleting remote devices that have been authorized to control the system, changing whether the system will allow new remote devices to be programmed thereto, changing the password, if any, required to connect a new remote device to the system, and/or the like.

It may be desirable to have multiple remote devices authorized to control the system, such as when two people share the same vehicle and each person has their own remote device (such as a smartphone). In such a case, it can be desirable for either person's remote device to be able to connect to and control the system. However, it can also be desirable in such a situation to have a predetermined priority level to those devices. For example, in the embodiment shown in FIG. 12C, two remote devices have been authorized to control the system, namely a remote device named "Bill" (e.g., a smartphone owned by Bill) and a remote device named "Cathy" (e.g., a smartphone owned by Cathy). Since Bill's remote device is set to a higher priority than Cathy's remote device, if they both happen to be in the vehicle at the same time (or at least both of their remote devices are within wireless communication range of the vehicle at the same time), the system will desirably prioritize a connection with Bill's remote device over Cathy's remote device. In some embodiments, the system may be configured to allow more than one device to be simultaneously connected, such that all connected devices receive updates to the status of the system, but may be configured to only allow the highest priority device of the connected devices to issue commands to the system, such as to override the steps and/or the lights. In some embodiment, non-connected devices may still be able to display the current status of the system, such as by obtaining status information from advertising packets transmitted by the system. In some embodiments, the system is configured to only allow a single remote device to be connected at one time, but the system is configured to continue transmitting advertising packets after one device is connected, so that other remote devices in the vicinity can still receive updated information from the system based on whatever data is being transmitted in the advertising packets. In some embodiments, the system may be configured to utilize a type of radio (such as radio 850 of FIGS. 8A and 8B) that supports the ability to simultaneously connect to multiple remote devices 1000 to allow multiple devices to simultaneously control and monitor the system. In some embodiments, such a radio may utilize BLUETOOTH® mesh technology.

In some embodiments, the system is configured such that only the remote device that initiated an override state can cancel that override state early. For example, if Bill's remote device is used to initiate an override of the steps of Bill's truck into the deployed position for 30 minutes, the system may be configured such that no other remote device can instruct the system to end the override early. This can enhance the safety of the system, such as by avoiding a different user canceling an override unexpectedly. For example, if Bill uses his remote device to initiate the override so that he can perform maintenance underneath the vehicle, Cathy may not realize Bill is performing the maintenance, and might otherwise accidentally end of the override early, resulting in potential harm to Bill. In some embodiments, instead of prohibiting other remote devices from canceling an override started by one remote device, the system may at least be configured to display a warning to the other remote device that the current override was started by another device, and request additional confirmation that the new user has confirmed there are no obstructions in the way before ending the override state.

FIG. 12D illustrates a phone settings screen that may be accessed, for example, by pressing the "phone settings" option of the settings menu 1202 shown in FIG. 12A. The phone settings screen may, for example, allow a user to change settings specific to that user's remote device 1000 with respect to one or more remotely controllable retractable step systems to which that remote device 1000 has been authorized. For example, in the case of FIG. 12D, the remote device 1000 may be Bill's smartphone, and it shows that his smartphone has been authorized to connect to two different vehicles, namely Bill's truck and Cathy's truck. To enhance convenience and safety of the system, it may be desirable to configure the remote device 1000 to not automatically connect to one or more of the systems the remote device has been authorized to control. For example, in the version illustrated in FIG. 12D, Bill's phone is configured to automatically connect to Bill's truck, but to only manually connect to Cathy's truck. This can enhance the safety of the system, for example, because Bill may want his remote device 1000 to automatically connect to his own truck, but not to accidentally connect to Cathy's truck automatically, such as if both vehicles are next to each other in the same driveway and the phone is in wireless range of both vehicles. If a user wishes to change such settings, the user can select settings button 1206, which will desirably make settings screen 1208 appear, as shown in FIG. 12E. In settings screen 1208, the user may, for example, be able to enter a friendly name for the selected vehicle and also toggle whether this remote device 1000 should try to automatically connect to that vehicle.

Returning to FIG. 12A, the settings screen 1202 further includes an "event log" option. If a user selects the event log option, the remote device 1000 may be configured to display to the user logged operational data (e.g., motor current values, average motor current values, peak motor current values, a number of step actuations, and/or the like) that is stored in, for example, the operational log databases 854 and/or 868. In some embodiments, if a user requests to access the event log data, the remote device 1000 may be configured to communicate with the rest of the system via the wireless communication link and request the latest logged operational data if, for example, the operational log database 868 of the remote device 1000 does not currently include the latest data. In some embodiments, selecting the event log option may also or alternatively enable the user to access a file that contains some or all of the logged operational data, such as to enable the user to transmit that log file to another computing device and/or to a customer support representative to help in troubleshooting issues with the system.

Remote Device Notifications

FIGS. 13A-13C illustrate selected notifications 1302, 1304, 1306 that the remote device 1000 may be configured to display upon one or more conditions occurring. Such notifications may in some cases appear at any point in time, when the user is using any portion of the application, and thus a blank background is illustrated in these figures. The background may not necessarily be blank, however, and the notifications 1302, 1304, 1306 may appear over the top of an existing screen. When the notifications appear over the top of an existing screen, the remote device may be configured to disable inputs for any user controls shown in the background on the existing screen. Further, in some embodiments, the application running on the remote device 1000 may be configured to interact with the operating system of the remote device 1000 such that the information given in these notifications may be presented even when the user does not have the application running in the foreground of the device. For example, some or all of the information given in these notifications 1302, 1304, 1306 may be provided via a notification that is allowed to appear over the top of another app running on the device and/or via a native Android or iPhone notification.

With reference to FIG. 13A, notification 1302 is an example of a notification that may be displayed when a fault has been detected. For example, in this case, the notification is indicating that the steps have not been deployed when they otherwise should have been deployed, because one or more of the motors that drives the steps experienced an overcurrent condition. Other variations of notification 1302 may occur, if, for example, the steps did not retracted due to a motor overcurrent condition, the steps did not deploy or retract due to a low supply voltage condition, the steps did not deploy or retract due to an override currently being in progress, and/or the like. In some embodiments, selecting the notification 1302 may be configured to take the user to the status tab illustrated in FIGS. 11A-11C, to provide a user with more information.

In some embodiments, the fault notification shown in FIG. 13A, or similar notifications, may be based on the controller or other portion of the system that the remote device is communicating with telling the remote device that a fault has occurred. In some embodiments, however, the remote device may also be configured to determine on its own that a potential fault has occurred and present such a notification. For example, the remote device may monitor the status of various parameters received from the rest of the system, such as via data in an advertising packet and/or via data the remote device has subscribed to in a connection, and make its own determination based on that data that a fault has occurred. For example, the remote device may be configured to determine on its own that the parameter data received from the system indicates that a door position has changed which should have resulted in a step moving and/or a light toggling, but such step did not move and/or such light did not toggle on or off as expected. In such a case, the remote device can be configured to issue a notification, similar to the notification illustrated in FIG. 13A, even if the rest of the system has not explicitly indicated to the remote device that a fault has occurred. This can help to increase the safety of the system by, for example, increasing the likelihood that a fault will be recognized and brought to the attention of the user in a timely fashion. In some embodiments, such monitoring for faults by the remote device can be configured to occur regardless of whether the application on the remote device is running in the foreground or the background.

With reference to FIG. 13B, this figure illustrates an example where the remote device 1000 has presented notification 1304, which indicates that the current step override will end in three minutes. The notification 1304 also includes a renew button 1305 that can enable the user to renew the override, which will cause the current override to be extended for a certain period of time. For example, if the override was originally set for 30 minutes, pressing the renew button may in some embodiments cause an additional 30 minutes to be added to the timing of the override. Other embodiments may extend the override by a different amount of time than the original time, may extend the override by a predetermined increment, such as five minutes, 10 minutes, 15 minutes, and/or the like. Further, some embodiments may include a user interface control within the notification 1304 that gives the user an option to indicate how long the override should be extended for.

FIG. 13C illustrates a notification 1306 that is similar to notification 1304 of FIG. 13B. In this case, however, the notification 1306 is indicating that the override has already expired and letting the user know that the steps may move the next time the doors are opened or closed. Having such a notification popup may enhance the safety of the system, because it will alert the users to a possible movement of the step the next time the doors are used. The notification 1306 also desirably includes a renew button 1305, which, when pressed, can cause the system to go back into the override mode. Pressing the renew button 1305 may, for example, result in similar actions occurring as would happen if the retract or deploy buttons 920, 922 of FIG. 9C were pressed, as discussed in greater detail above.

Either of the notifications 1304, 1306 illustrated in FIGS. 13B and 13C may be configured to be given when the application on the remote device is running in the foreground, running in the background, and/or even when the application has gone to sleep. This can be desirable in many implementations of, for example, smartphone devices, which are often configured to put to sleep any applications that are not currently running in the foreground, to conserve processing power and/or battery life. Such devices often have the ability, however, for an application to schedule a notification to occur at a particular time, even if the application has been put to sleep. Scheduling such notifications to appear even if the application has been put to sleep on the remote device can help to enhance the safety of the system, because it can increase the likelihood that such notifications will occur and will be seen by the user. In some embodiments, such notifications are configured to be given only if the application is running in the background and/or has gone to sleep, since, if the application is running in the foreground, it is more likely the user is aware already that an override is about to expire or has expired. Additionally, in some embodiments, the remote device may be configured such that, even if the application running on the remote device is still in the foreground, the remote device may go to sleep and/or turn its screen off after a certain period of inactivity, such as one minute, two minutes, three minutes, four minutes, five minutes, and/or the like. The device may then be configured to automatically wake up and/or turn the screen back on with the application running in the foreground after a predetermined period of time. The predetermined period of time may be based on, for example, a period of time that enables the device to wake up before a current override expires. In some embodiments, the remote device may be configured to, even if the application has been put to sleep by the operating system, periodically wake up and receive the latest status of the system via the wireless communication link, such as through a formal connection or through advertising packets, and set a timer to wake up the device and/or application in response to discovering through that data that there is currently an override that will expire at a particular time.

Automated Step and Lighting Remote Control Procedures

Figure 14:
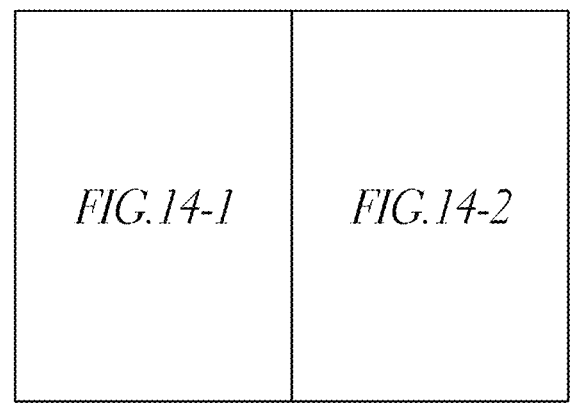
FIG. 14 is a flowchart depicting an exemplary method of operation of a remotely controllable step and lighting system. As indicated, FIG. 14 spans multiple sheets, with FIGS. 14-1 and 14-2 included on separate sheets.
Figures 1, 14:
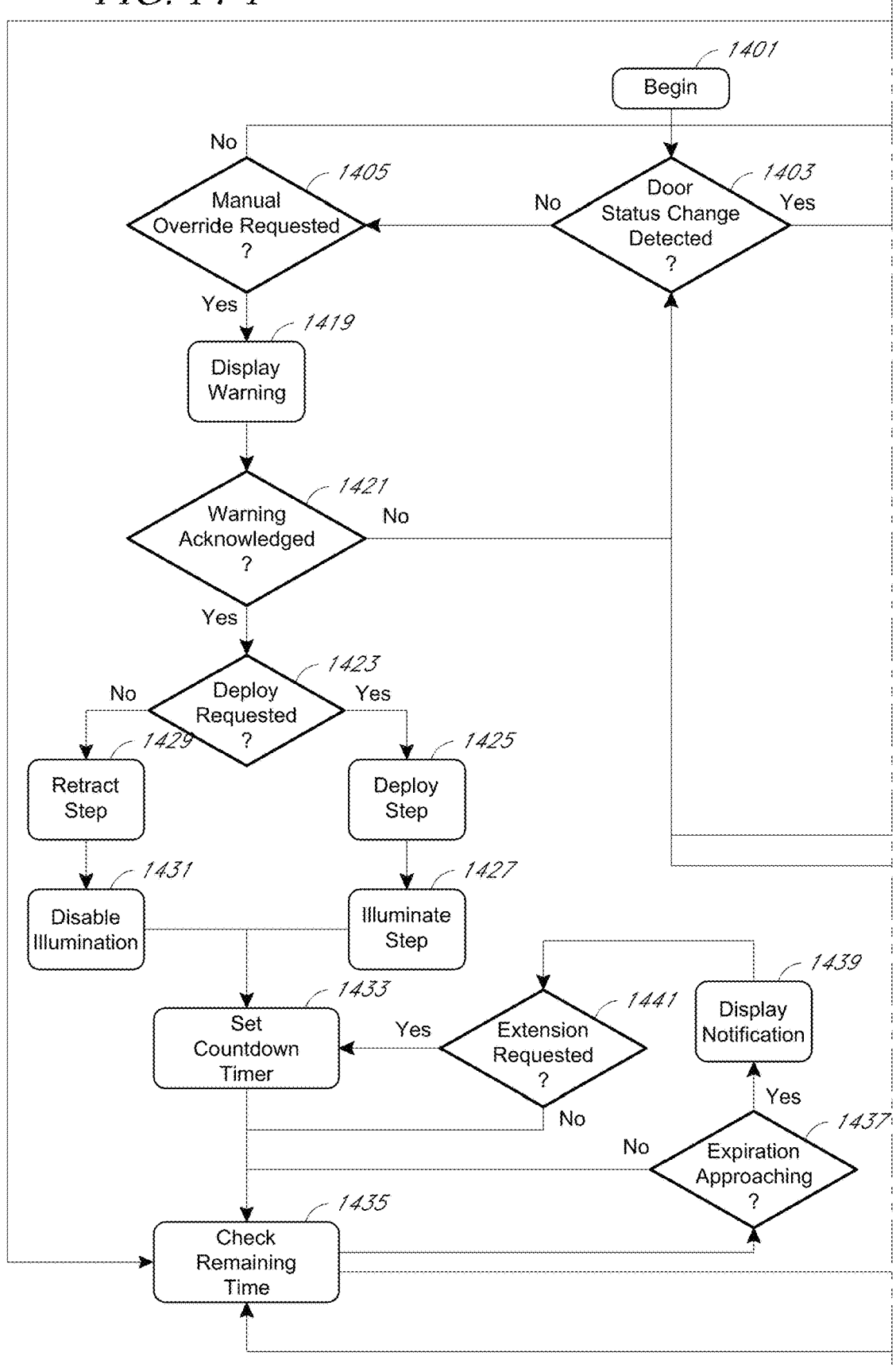
Figure 14:
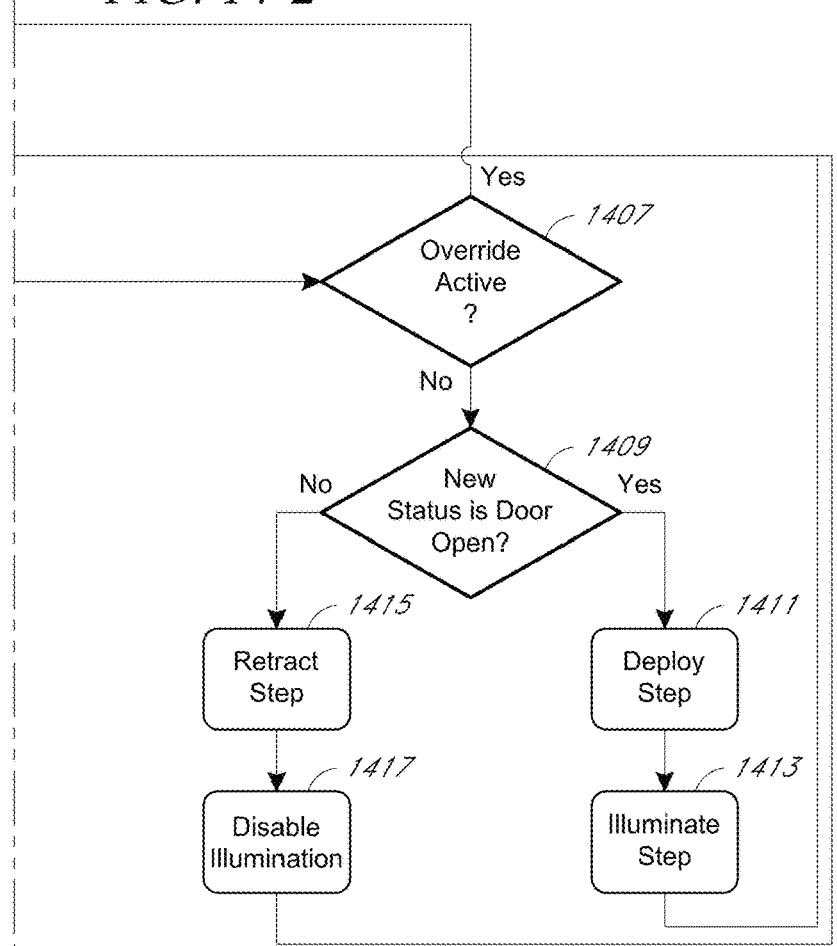
Figure 2:
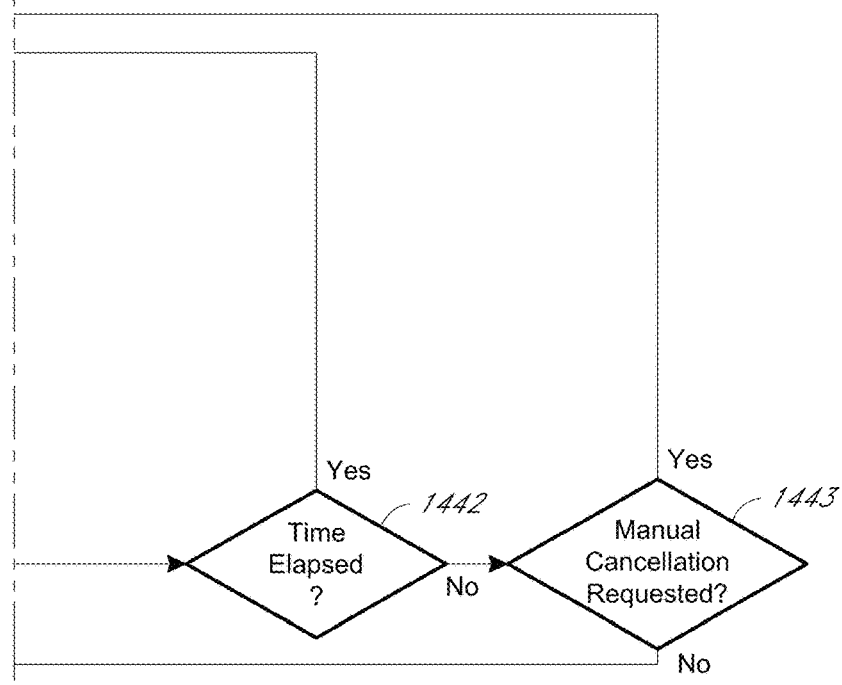
FIG. 2C illustrates an existing vehicle port connection prior to installation of an automated step system.
FIG. 2D illustrates portions of an automated step system according to another embodiment, after installation, where the vehicle interface of the step system is interposed in the existing vehicle port connection shown in FIG. 2C.

FIG. 14 illustrates an example embodiment of a process flow diagram for operating a remotely controllable step and lighting system. The illustrated process may be implemented by any of the retractable step systems disclosed herein, including but not limited to the systems 700, 801, and 805 illustrated in FIGS. 7, 8A, and 8B, respectively. The process flow illustrated in FIG. 14 illustrates one example of automatically controlling a step and a light that illuminates the step based on a status of a vehicle door. The concepts illustrated in FIG. 14 and described herein may be used for various other versions, however, such as systems that automatically control a step based on another vehicle status indicator different from a door status and/or in combination with the door status.

The process begins at block 1401. At block 1403, the process flow depends on whether a door status change has been detected, such as a change from open to closed or a change from closed to open. If a door status change has not been detected, the process flow proceeds to block 1405. At block 1405, the process flow depends on whether a manual override is being requested. For example, such a manual override may be requested by a user pressing the retract or deploy buttons 920, 922 shown in FIG. 9C. If a manual override is not requested, the process flow proceeds back to block 1403 and continues in this cycle until a door status change has been detected and/or a manual override is requested.

When a door status change is detected at block 1403, the process flow proceeds to block 1407. At block 1407, the process flow depends on whether an override is currently active. If an override is currently active, such as is illustrated by the status of the graphical user interface shown in FIG. 9D, described above, the process flow proceeds to block 1435 and proceeds as described below. In some embodiments, the system may optionally display a notification to the user, similar to notification 1302 of FIG. 13A, indicating to the user that the steps did not move when they otherwise would have, due to an active override. If an override is not active at block 1407, then the process flow proceeds to block 1409. At block 1409, if the door status change detected is that the door is now open, the process flow proceeds to blocks 1411 and 1413 and causes the system to deploy the step and illuminate the step. If, at block 1409, the door status change detected is that the door status has changed from open to closed, the process flow proceeds to blocks 1415 and 1417, and the system is caused to retract the step and disable the step illumination. In some embodiments, the step illumination lights may not be present, or the step illumination lights may not be automatically controlled if, for example, the "follow steps" option is not selected in the settings shown in FIG. 10B. The process flow then proceeds back to block 1403 and proceeds as described above.

Returning to block 1405, if a manual override is requested, the process flow proceeds to block 1419. At block 1419, the system may be configured to display a warning to the user prior to moving the step, such as to increase the safety of the system. For example, the selectable notification 930 illustrated in FIG. 9G may be displayed on a remote device. The process flow then proceeds to block 1421. At block 1421, the process flow depends on whether the warning displayed at block 1419 has been acknowledged by the user. For example, if the user selects the "cancel" button of the selectable notification 930 of FIG. 9G, or in some cases if a predetermined period of time has passed with no selection on the selectable notification 930, the process flow proceeds back to block 1403 and proceeds as described above. If, however, the "continue" button of the selectable notification 930 is selected, the process flow proceeds from block 1421 to block 1423.

At block 1423, the process flow depends on whether the requested manual override is an override into the deployed direction or the retracted direction. If the requested manual override is to deploy the steps, the process flow proceeds to blocks 1425 and 1427 and causes the system to deploy the step and illuminate the step using the step lights. If, at block 1423, the manual override is a request to retract the steps, the process flow proceeds to blocks 1429 and 1431 and causes the system to retract the steps and disable the step lights. In some embodiments, the system may not need to move the step or change the lights at blocks 1425 through 1431, if, for example, the step and/or lights are already in the desired configuration. This is also true for blocks 1411 through 1417, described above. Further, blocks 1413, 1417, 1427, and 1431 assume that at least one light of the system is currently configured to follow the steps, meaning the lights are configured to illuminate and turn off along with the step when the step deploys and retracts, respectively. Such settings may be set, for example, by the user using the settings screen illustrated in FIG. 10B, described above. If no lights are currently set to follow the step, then the illumination and disabling illumination blocks of this process may not be performed. Further, in some embodiments, it may be desirable to not illuminate the step, even if the "follow step" option is selected, when the reason for deploying the step is a manual override. For example, if the user wishes to manually override the step into the deployed position for the purpose of conducting maintenance on the vehicle, the user may not wish for the step lights to illuminate. In some embodiments, the system is configured to not illuminate the step lights in such a situation and/or to only illuminate the step lights for a predetermined period of time, and turn them off after that time elapses, even if the step is still overridden into the deployed positon.

The process flow then proceeds to block 1433, where the system initializes a countdown timer. The countdown timer may be initialized with a predefined number, such as 10 minutes, 15 minutes, 20 minutes, 25 minutes, 30 minutes, or the like. The countdown timer may in some embodiments be initialized with a period of time selected by the user, such as is shown by the override time control 924 illustrated in FIG. 9H, discussed above. Although various descriptions herein of override timers reference override times in minute increments, the system may use any suitable unit of time in conducting timed overrides. For example, the system may use units of minutes, seconds, milliseconds, and/or the like. In some embodiments, the user interface of the remote device is configured to still display override times in minutes, even if the system internally uses a different unit, such as seconds or milliseconds.

Once the countdown timer is set or initialized at block 1433, the process flow proceeds to block 1435. At block 1435, the system is configured to check the remaining time in the current override. At block 1437, the process flow varies depending on whether the time remaining determined at block 1435 indicates that an expiration of the current manual override is approaching. The threshold for whether an expiration is determined to be approaching may be predefined as a certain period of time, such as 30 seconds, one minute, two minutes, three minutes, four minutes, five minutes, and/or the like. In some embodiments, the threshold used for determining whether an expiration is approaching may at least partially be based on what the original total time for the override was. For example, the system may be configured to typically determine that an expiration is approaching when there are, for example, three minutes remaining in the override. However, in a case where the original override time was a relatively small amount of time, such as four minutes, it may be desirable to decrease the threshold used for determining when the expiration is approaching, such as using an amount that is a certain percentage of the initial time, such as 25% to 50% of the initial time. In some embodiments, however, the threshold used for determining if an override expiration is approaching is a predefined value regardless of the original override time. Further, in some embodiments, the system may be configured to not issue any "expiration approaching" notifications, if, for example, the original override time is a relatively small value that would lead to an "expiration approaching" notification being issued shortly after beginning the override (such as, for example, within 25% or 50% of the original override time).

At block 1437, if the expiration of the override is not approaching, the process flow proceeds back to block 1435. If, at block 1437, the system determines that an expiration of the manual override is approaching, the process flow proceeds to block 1439. At block 1439, the system may be configured to display a notification that notifies the user that the expiration is approaching. For example, the notification 1304 illustrated in FIG. 13B, discussed above, may be displayed on remote device 1000. The process flow then proceeds to block 1441. At block 1441, the process flow varies depending on whether an extension is requested. For example, if the "renew" button 1305 shown in FIG. 13B is pressed, this would be interpreted as an extension being requested. If an extension is requested, the process flow proceeds back to block 1433, and the system resets or re-initializes the countdown timer. The system may be configured to reinitialize the countdown timer using the same value that was originally used in this override, such as 20 minutes, or the system may be configured to reinitialize the countdown timer using a different value than was initially used. After the countdown timer has been reinitialized at block 1433, or if an extension was not requested at block 1441, the process flow proceeds back to block 1435.

At block 1442, the process flow varies depending on whether the remaining time determined at block 1435 indicates that the present manual override time has elapsed. If the time has elapsed, the process flow proceeds back to block 1403 and proceeds as described above. In some embodiments, before proceeding back to block 1403, the system may be configured to display a notification, such as the notification 1306 illustrated in FIG. 13C, described above. If that notification includes an option to renew the override, and the user selects the option to renew the override, instead of proceeding back to block 1403, the process flow would proceed back to block 1433 and reinitialize the timer, similarly to as described above.

Returning to block 1442, if the override time has not elapsed, the process flow proceeds to block 1443. At block 1443, the process flow depends on whether a manual cancellation has been requested. For example, a user may utilize the "cancel" button 920 illustrated in FIG. 9D, described above, to instruct the system to cancel the present override. If manual cancellation is requested, the process flow proceeds back to block 1403 and proceeds as discussed above.

If manual cancellation has not been requested at block 1443, however, the process flow proceeds back to block 1435 and proceeds as discussed above.

In various embodiments of remotely controllable retractable step and lighting systems, various portions of the process flow illustrated in FIG. 14 may be performed by various components of the system. For example, a majority of the process flow blocks may be performed by the step controller, such as step controller 210 of FIG. 7 or step controller 306 of FIGS. 8A and 8B, with the user interface features, such as warnings or notifications displayed at blocks 1419 and 1439, being implemented by a remote device, such as remote device 1000 of FIGS. 7, 8A, and 8B. In some embodiments, at least some of the features illustrated in the process flow diagram of FIG. 14 may be implemented by other components, such as, but not limited to, the vehicle interface 220 or 304 illustrated in FIGS. 7 and 8A. For example, in some embodiments, the vehicle interface may be configured to detect door status changes, while the step controller is configured to deploy and retract the steps and/or illuminate and disable illumination of the lights.

Remote Device Example Operating Process

Figure 15A:
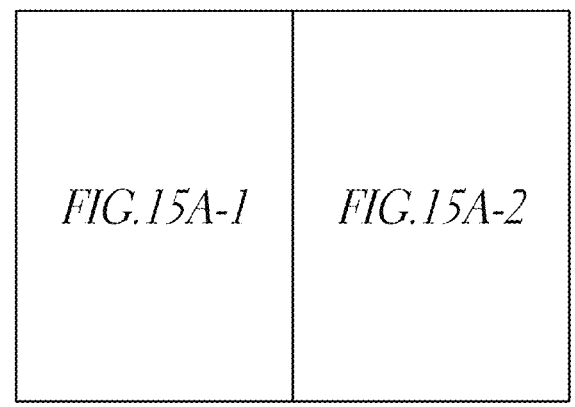
FIG. 15A is a flowchart depicting an exemplary method of operation of a remote electronic device of a remotely controllable step and lighting system. As indicated, FIG. 15A spans multiple sheets, with FIGS. 15A-1 and 15A-2 included on separate sheets.
Figures 1, 15A:
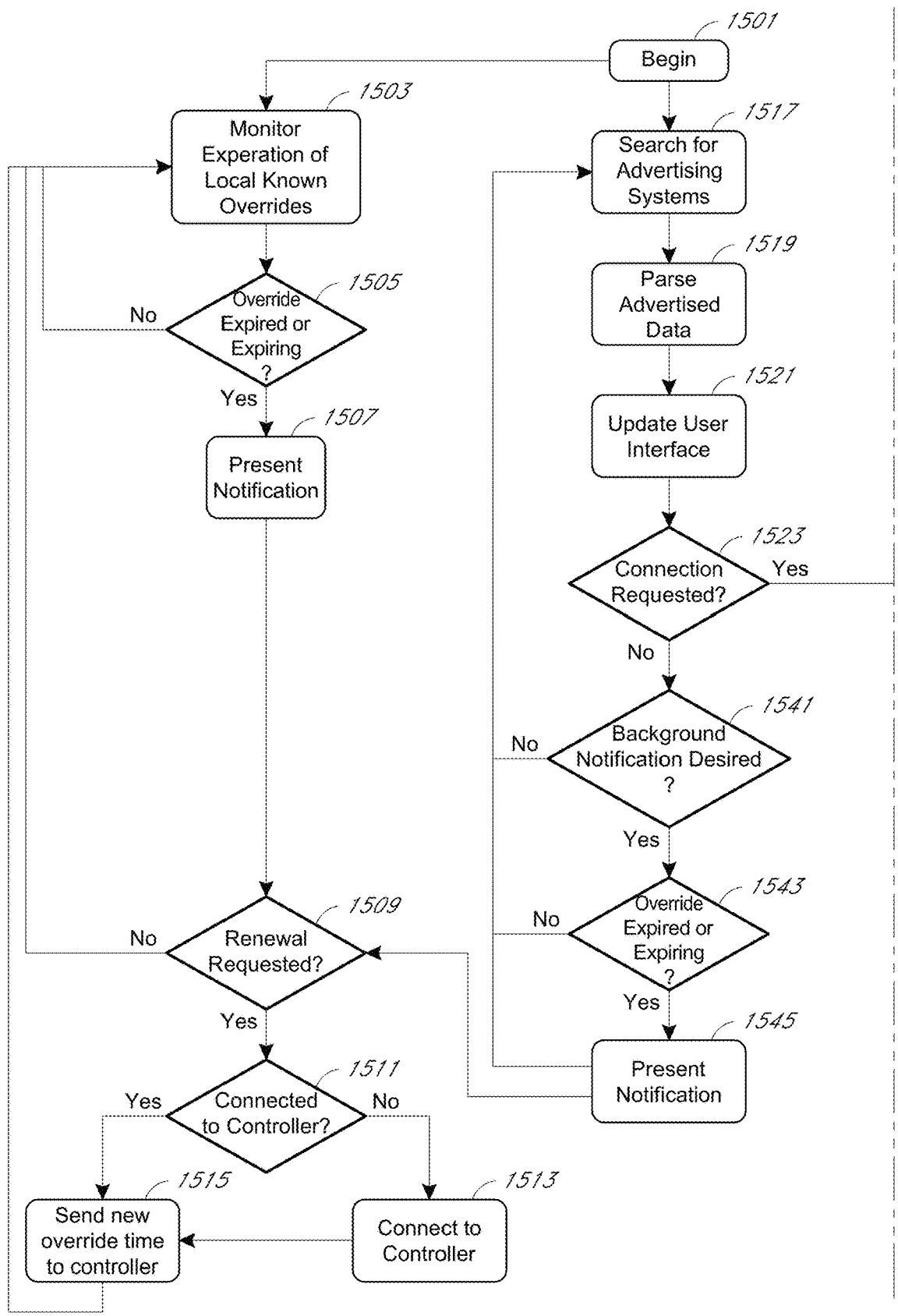
Figures 2, 15A:
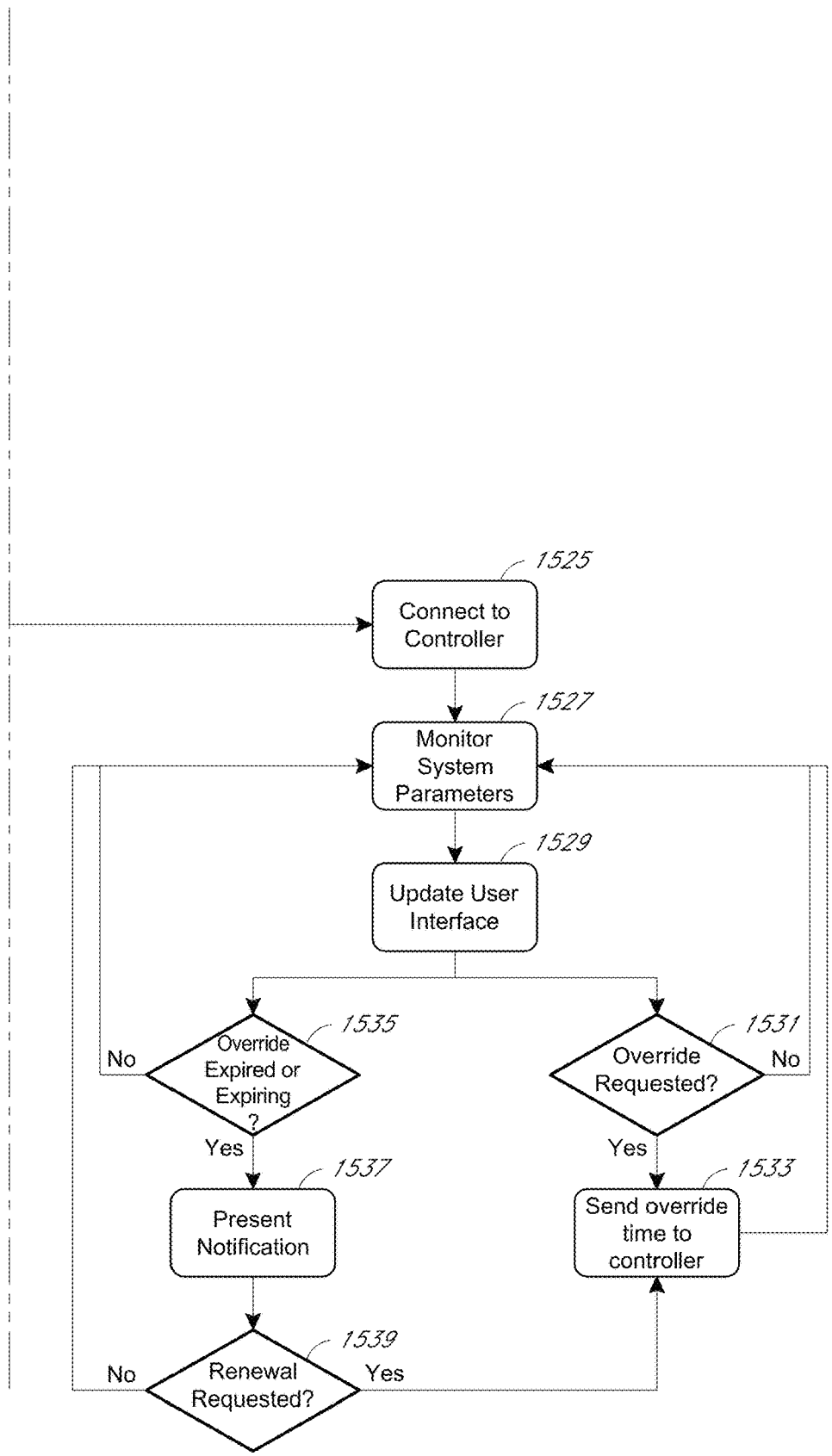

FIG. 15A illustrates an example embodiment of a process flow diagram that may be implemented by, for example, any of the remote devices disclosed herein, such as remote device 1000 illustrated in FIGS. 7, 8A, and 8B. This process flow illustrates examples of how the remote device can monitor for advertising systems and interact with those systems, such as by (1) monitoring their advertised data and displaying it for use by the user without formally connecting to the system, (2) connecting to the system to enable monitoring of additional parameters and/or control of the system by the remote device, and/or the like. This process diagram is merely one example of how a remote device can interact with the rest of a remotely controllable step and light system, and this process does not necessarily encompass every potential feature of the remote device discussed herein.

The process flow begins at block 1501. In some embodiments, it may be desirable for a remote device to monitor the expiration of known override conditions even if the remote device is not currently connected to or even within wireless range of the subject remotely controllable step and lighting system. Accordingly, when the remote device is aware of such an override, the process flow may proceed to block 1503, regardless of whether the remote device is currently connected to and/or monitoring the subject system. At block 1503, the remoted device monitors the timing of those known overrides for upcoming expiration. At block 1505, the process flow depends on whether an override is expired or expiring. The threshold for whether an override is determined to be expiring can be determined similarly to as described above with respect to block 1437 of FIG. 14. If an override is not expired or expiring, the process flow proceeds back to block 1503. If an override is expiring at block 1505, the process flow proceeds to block 1507 and can present a notification to the user regarding the upcoming override expiration. For example, the override notification 1304 of FIG. 13B may be displayed by the remote device. If an override has expired at block 1505, then a different notification may be given at block 1507, such as the notification 1306 of FIG. 13C.

At block 1509, the process flow varies depending on whether renewal of the expiring or expired override is requested. If renewal is not requested, the process flow proceeds back to block 1503. If renewal is requested at block 1509, such as by the user selecting the "renew" button 1305 of FIG. 13B or 13C, the process flow proceeds to block 1511. At block 1511, if the remote device is not currently connected to the controller (such as through a BLUETOOTH® connection to the controller), the process flow proceeds to block 1513, and a connection is initialized between the remote device and the controller. It should be noted that, in this and other embodiments described herein, although the connection is described as being between the remote device and the controller, as discussed above, the wireless connection may be between the remote device and a radio of the vehicle interface 220 of FIG. 7, the wireless connection may be between the remote device and radio 850 of the vehicle interface 304 of FIG. 8A, the wireless connection may be between the remote device and the radio 850 of FIG. 8B, and/or the like. Once the connection is established, or if the connection is already established, the process flow proceeds to block 1515, and the remote device instructs the controller to extend the expiring or expired override. For example, in some embodiments, the remote device may send a new override time to the controller, such as a certain number of minutes, such as 10 minutes, 15 minutes, 20 minutes, or the like. In some embodiments, the remote device may send a command to the controller that indicates a renewal should be initiated, without needing to send a specific override time to the controller. The process flow then proceeds back to block 1503.

Returning to block 1501, the process flow also proceeds to block 1517 from block 1501. At block 1517, the remote device searches for any advertising systems. For example, the remote device 1000 of FIGS. 8A and 8B may utilize its radio 862 to monitor one or more frequencies for receipt of one or more advertising packets from a radio of a remotely controllable step and lighting system. One example of the format or protocol for such an advertising packet is illustrated in FIG. 15B, as further described below.

If the remote device receives an advertising packet, at block 1519 the remote device parses the data provided in the advertising packet. In some embodiments, the remote device may be configured to update its user interface at block 1521 in response to the parsed advertised data, regardless of whether the remote device is currently connected to the advertising system. For example, the remote device may change the user interface to display the "connect" button 902 of FIG. 9B, in response to detecting that an advertising system that the device is not currently connected to is open for connections. As another example, some embodiments may be configured such that the status information depicted on the user interface of the remote device, such as the information illustrated in the header portion 910 of FIG. 9C, or any of the status information shown in FIGS. 11A-11C, may be updated and displayed to the user in real time based on data parsed from the advertising packet, without having to establish a formal connection with the advertising system.

The process flow then proceeds to block 1523. The process flow at block 1523 depends on whether a connection to the advertising system has been requested. For example, if the advertising system is configured in the remote device to be an "auto connect" system, such as is configured in screen 1208 of FIG. 12E, then the remote device process flow may automatically proceed to block 1525 and establish a wireless connection between the remote device and the controller. If the advertising system is not configured to be auto connected to, then the process flow may also proceeds to block 1525 in response to a manual connection request, such as if a user presses the connect button 902 of FIG. 9B.

At block 1525, a wireless connection between the remote device and the rest of the remotely controllable step and lighting system is established. For example, in an embodiment that uses BLUETOOTH® communication, a BLUETOOTH® connection is established between the remote device and the rest of the remotely controllable step and lighting system. The techniques disclosed herein are not necessarily limited to using a BLUETOOTH® protocol for the wireless connection, however, and any other suitable wireless protocol may be used.

At block 1527 and 1529, the remote device can be configured to monitor one or more system parameters and update the user interface in response to changes to those parameters. For example, the remote device may be configured to update its user interface as illustrated in FIGS. 9C-9F in response to changes to system parameters. In some embodiments, the remote device is configured to subscribe to particular parameters, such that the controller will notify the remote device via the wireless communication link of any changes to those parameters. It should be noted that various portions of the process flow illustrated in FIG. 15 may occur simultaneously in some embodiments. For example, the three loops starting at blocks 1503, 1517, and 1527 may occur at the same time. For example, while the remote device is connected to a particular controller (e.g., the loop that includes block 1527), the remote device can simultaneously be parsing advertised data from other controllers (e.g., the loop that includes block 1517) and also keeping track of known overrides (e.g., the loop that includes block 1503).

At block 1531, the process flow varies depending on whether an override has been requested. If an override is not requested, the process flow proceeds back to block 1527. If an override is requested, such as by a user pressing the "retract" or "deploy" buttons 920, 922 of FIG. 9C (and/or the lighting buttons 940 of FIG. 10A), the remote device may be configured to proceed to block 1533 and instruct the controller to begin an override of the step and/or lights. In some embodiments, the instruction to the controller to initiate the override comprises a specific time for use in the override, such as 10 minutes, 15 minutes, 20 minutes, 25 minutes, 30 minutes, and/or the like. In some embodiments, the instructions to the controller to initiate the override do not comprise a specific time, and the controller will set the override time based on a predefined setting. The process flow then proceeds back to block 1527 and proceeds as described above.

At block 1535, the process flow varies depending on whether the current override is expired or expiring. If the current override is not expired or expiring, the process flow proceeds back to block 1527. If the override is expiring, the process flow proceeds to block 1537, and the remote device may be configured to present a notification to the user that an override is expiring. For example the device may be configured to present a notification similar to the notification 1304 shown in FIG. 13B. If the override has expired at block 1535, then a different notification may be given at block 1537, such as the notification 1306 of FIG. 13C. If a renewal is requested, such as by clicking on button 1305 shown in FIG. 13B or 13C, the remote device may be configured to proceed from block 1539 to block 1533 and send a request to the controller to renew the expiring or expired override. In some embodiments, the request to renew the override comprises a new override time. In some embodiments, the request to renew the override does not comprise a new override time, and the controller is configured to set the override time based on a predetermined setting and/or the original override time. If a renewal is not requested a block 1539, then the process flow proceeds back to block 1527.

Returning to block 1523, if a connection to an advertising system is not requested a block 1523 (such as via an auto connect setting or a manual connection request), the system may in some embodiments still be configured to monitor the advertised data to generate notifications. If the system is not configured to generate such notifications in the background even when not connected to the system, then the process flow proceeds from block 1541 back to block 1517. If the system is configured to generate such background notifications, however, the process flow proceeds from block 1541 to block 1543. At block 1543, if the system determines an override is expired or expiring, such as by analyzing parsed data from the advertising packet, the process flow may proceed to block 1545 and present a notification similarly to as described above with reference to block 1507 (such as by presenting notification 1304 or 1306 of FIGS. 13B and 13C, respectively). The process flow then proceeds to blocks 1509 and 1517.

The above described process for FIG. 15A provides one example process flow for the remote device 1000. Various other processes may be used to implement the features described herein. Further, additional steps may be added to this exemplary process to implement other features disclosed herein.

System Advertising Protocol

The term "connection," when used in the present application to refer to a wireless communication link between a remote device (such as remote device 1000 of FIG. 7, 8A, or 8B) and another portion of the system (such as a radio of the vehicle interface 220 of FIG. 7, or the radio 850 of FIG. 8A or 8B), refers to a wireless communication link that involves both of the remote device and the component the remote device is wirelessly communicating with sending data packets to each other via the wireless communication link. The term "advertising," when used in the present application to refer to a wireless communication link between a remote device (such as remote device 1000 of FIG. 7, 8A, or 8B) and another portion of the system (such as a radio of the vehicle interface 220 of FIG. 7, or the radio 850 of FIG. 8A or 8B), refers to a wireless communication link that involves only the component the remote device is wirelessly communicating with sending data packets to the remote device, without the remote device sending data packets to the component the remote device is wirelessly communicating with. Such "connection" communication links and "advertising" communication links may be implemented in accordance with BLUETOOTH® Low Energy (BLE) protocols and/or any other suitable wireless communication protocol.

FIG. 15B illustrates example details for an advertising packet payload that can be used with the systems disclosed herein, for example, to enable the remote device to search for advertising systems, connect to those systems, and/or monitor parameters of the system through the advertising packets without having to establish an official connection. The ability to monitor parameters in an advertising wireless communication link can have a variety of benefits, including increasing battery life of the remote device, reducing processing power required in the remote device, simultaneously distributing data to multiple remote devices, and/or the like. The advertising packet details in this embodiment desirably comply with BLUETOOTH® Low Energy (BLE) standards, however, the advertising packet could be modified for use with other wireless communication protocols.

In the BLE protocol, a BLE Peripheral device (which in the present case may include any of the remotely controllable systems described herein) is configured to transmit advertising packets on Channels 37, 38, and 39 of the 2.4 GHz spectrum at regular intervals. A BLE Central device (which in the present case may include any of the remote devices described herein) is configured to listen for advertising packets on those channels, to enable establishing a two-way connection with the BLE Peripheral and/or to enable the Central device to extract data from the advertising packets in a one-way fashion. In some embodiments of remotely controllable step and lighting systems disclosed herein, the system is configured to transmit advertising packets at 500 ms intervals when the system is in an unconnected state. In some embodiments, that interval may be higher or lower, and in some embodiments, the advertising interval may change when the system is in a connected state.

An advertising packet transmitted in accordance with the BLE Specification has up to 31 bytes available for transmission of advertisement data structures. FIG. 15B illustrates one embodiment of how those 31 bytes can be used to implement a wireless system as described herein. In this embodiment, the advertising packet comprises three distinct advertising elements, with advertising element number three comprising manufacturer specific data that corresponds to a number of status parameters of the remotely controllable step and lighting system. For example, bytes 19-21 comprise a unique controller identifier that can enable the remote device to identify a particular system to connect to. Bytes 22-27 comprise parameters that can enable the remote device to determine certain status information of the system without having to open a formal two-way BLUETOOTH® connection with the system. For example, byte 22 indicates the current operational status of the controller, byte 23 indicates the most recent step fault, byte 24 indicates the current step position, bytes 25 and 26 indicate the current remaining time in the current step override, and byte 27 indicates a current door position.

Various other parameters may be included in such an advertising packet, and the concepts disclosed herein are not limited to the specific advertising packet details illustrated in FIG. 15B. Further, the data given in the various parameters of the advertising packet may be represented in various ways. For example, in one embodiment, a byte such as byte 27 that indicates the current door position may represent a bitmap value or other type of value that is capable of simultaneously indicating the status of each monitored door of the vehicle, instead of merely indicating the status of a single door. Similar bitmap type variables may also be used for other variables, such as the current step position in byte 24. Accordingly, a relatively small advertising packet may be used to more efficiently transmit a significant amount of data to the remote device.

Data Lodging and Analysis Procedure

Figure 16:
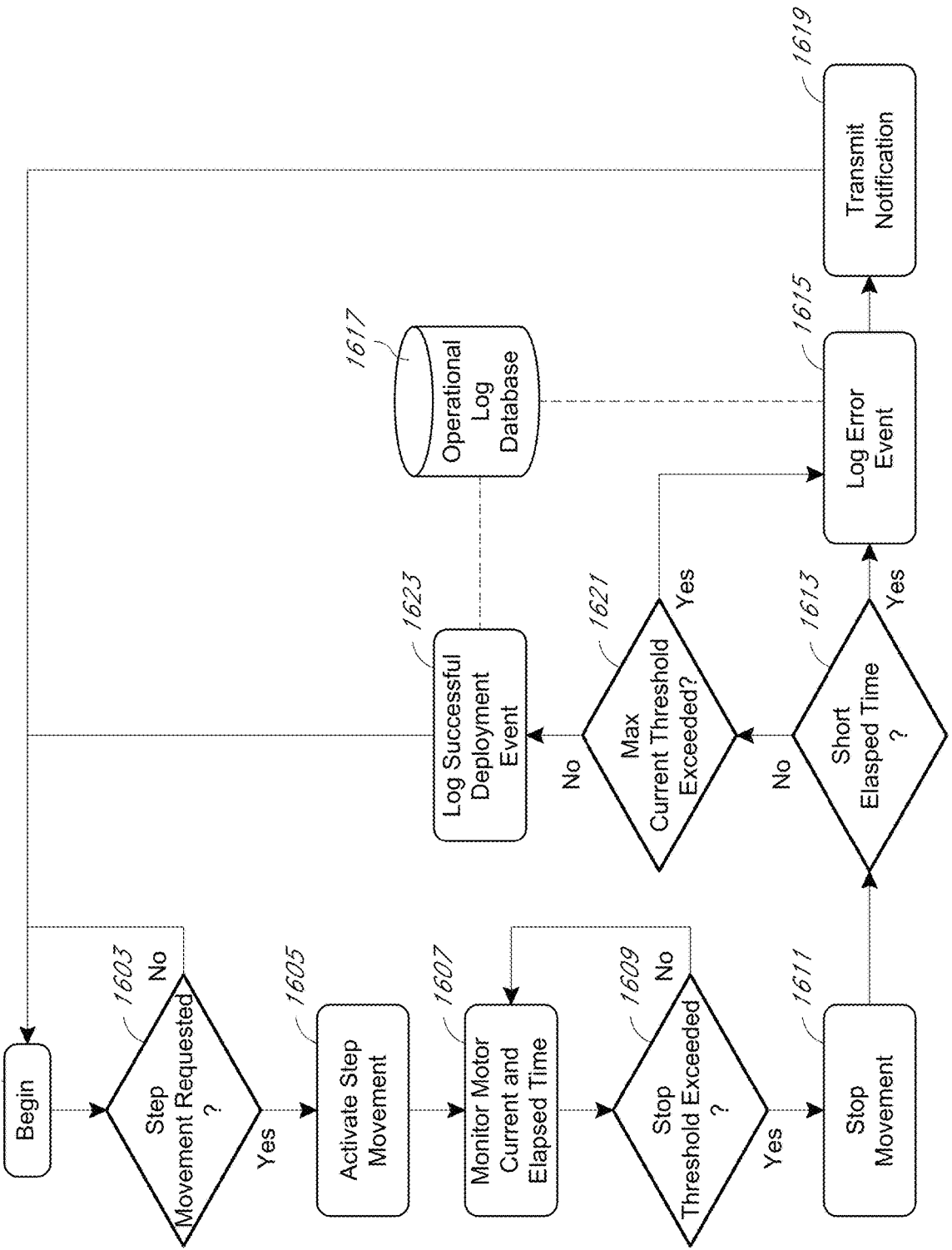
FIG. 16 is a flowchart depicting an exemplary method of logging and analyzing motor actuation data by a remotely controllable step and lighting system.

FIG. 16 illustrates one example process flow diagram for a process that the systems disclosed herein may use to log operational data and/or generate alerts when faults occur. The process depicted in FIG. 16 may be implemented by a single component of the system, such as the step controller 210 or 306, or may be implemented by a combination of components of the system, such as with the step controller 210 or 306 performing some of the steps and one or more other components, such as a vehicle interface or remote device performing one or more other steps.

The process flow begins at block 1601. At block 1603, the process flow varies depending on whether step movement has been requested. Step movement may be requested in a variety of ways, such as automatic movement upon detecting that a vehicle door has been opened or closed, manual movement upon a user requesting a manual override, and/or the like. If step movement has not been requested, the process flow proceeds back to block 1601. If step movement has been requested, the process flow proceeds to block 1605. In block 1605, step movement is initiated, such as by step controller 210 or 306 causing a step to begin to deploy or retract.

At block 1607, the system monitors the motor current while the step is moving and may also monitor an elapsed time. In some embodiments, the motor current is monitored by the step controller 210 or 306, and in other embodiments the motor current is monitored by another component. In the presently described process, the system is configured to detect the end of stroke of the step based on a predetermined current threshold being exceeded. Other embodiments may detect the end of stroke of the step movement differently, such as using limit switches, an encoder, and/or the like.

At block 1609, if the stop threshold current has not been exceeded yet, the process flow proceeds back to block 1607 and the system continues monitoring the motor current. At block 1609, if the stop threshold current has been exceeded, the process flow proceeds to block 1611 and no additional step movement is requested by the controller (e.g., the controller no longer allows electrical current to flow through the motor). In an embodiment where the elapsed time is tracked, the process flow then proceeds to block 1613 and asks whether the elapsed time to get to the stop threshold current was shorter than expected. If it was, this is likely indicative of a fault, and the process flow proceeds to block 1615 and logs an error event. For example, the system may be configured to log the monitored motor current and/or elapsed time parameters in the operational log database 1617. In some embodiments, the system may be configured to monitor and/or log one or more of a number of parameters, such as an average current value, a peak current value, a minimum current value, a time from deploy to retract or retract to deploy, an average voltage level, a peak voltage level, a minimum voltage level, whether communication between one or more components of the system was lost, and/or the like. The operational log database 1617 may, for example, be the operational log databases 854 and/or 868 illustrated in FIGS. 8A and 8B. In some embodiments, the system may then be configured to transmit a notification of the error event at block 1619. For example, any of the error notifications discussed above may be utilized.

Returning to block 1613, if the elapsed time to the stop threshold current was not shorter than expected, or if this version of the system does not monitor elapsed time, the process flow proceeds to block 1621. At block 1621, the system determines whether a maximum threshold current was exceeded. If a maximum threshold current was exceeded, this may also be indicative of an error occurring. Accordingly, if the maximum threshold current was exceeded, the process flow proceeds to block 1615 and proceeds as discussed above. If the maximum current threshold was not exceeded at block 1621, the process flow proceeds to block 1623 and optionally logs a successful step movement event in the operational log database 1617. In some embodiments, the maximum threshold level is a predetermined level coded or configured in the software. In some embodiments, the maximum threshold level is dynamically determined by the remote device and/or another component of the remotely controllable step system by, for example, analyzing logged historical motor current values, and setting the maximum current threshold at a level that is a certain percentage above the historical average and/or peak current level. For example, the maximum current threshold may be set at a level that is 10%, 20%, 30%, 40%, 50%, or some other percentage higher than the historical average and/or peak current level.

In some embodiments, the logging of the successful deployment event may merely comprise incrementing a counter that logs a number of successful step movement events. In some embodiments, the logging of the successful step movement event may comprise storing one or more pieces of data about that movement event, such as an average current value, a peak current value, a minimum current value, a time from deploy to retract or retract to deploy, an average voltage level, a peak voltage level, a minimum voltage level, whether communication between one or more components of the system was lost, and/or the like. Further, in some embodiments, logging of successful step movement events may not occur. The process flow then proceeds back to block 1601.

The above described process is merely one example, and systems that implement the features disclosed herein may utilize various other processes to log data and/or transmit notifications.

Additional Remotely Controllable Retractable Step and Lighting Systems

Figure 17:
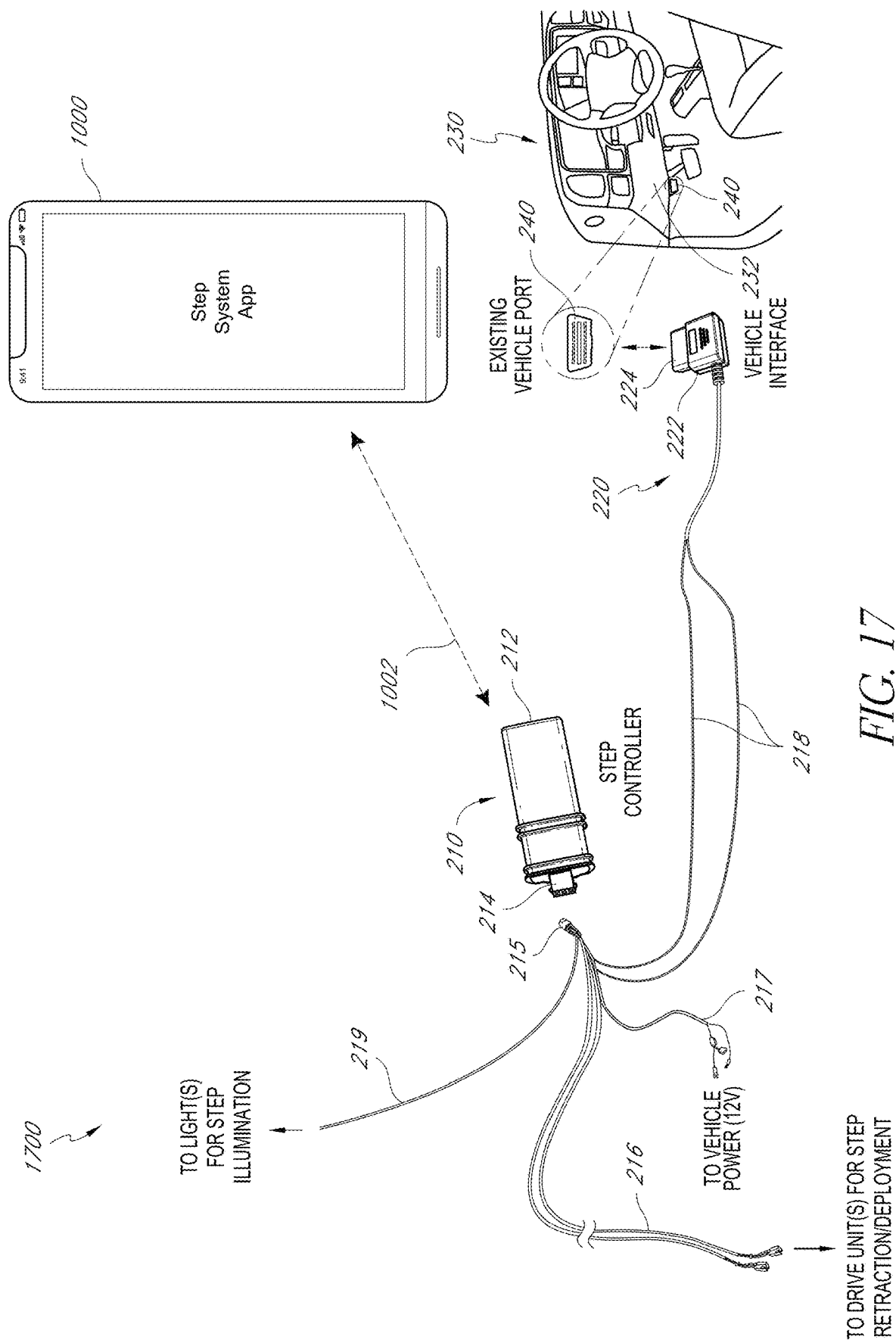
FIG. 17 illustrates another embodiment of a remotely controllable step and lighting system.

FIG. 17 illustrates another example embodiment of a remotely controllable retractable step and lighting system 1700. FIGS. 18A and 18B illustrate examples of the remotely controllable retractable step and lighting system 1700 installed on a vehicle, with the retractable step or running board shown in a retracted position (FIG. 18A) and a deployed position (FIG. 18B). The embodiments illustrated in FIGS. 17, 18A, and 18B have many similarities to other embodiments disclosed herein, such as, for example, the embodiments illustrated in FIGS. 1A, 1B, 2A, 7, 8A, and 8B, described above. Similar reference numbers are used to refer to similar features, and, for brevity, the present description focuses on differences from some other embodiments disclosed herein.

With reference to FIGS. 17, 18A, and 18B, the remotely controllable step and lighting system 1700 comprises a controller 210 that is configured to control a retractable step or running board 120 via wiring 216, and to control a light 1004 (shown in hidden lines in FIGS. 18A and 18B) through wiring 219. For example, if it is desired to deploy the retractable step, the system controller 210 may operate a motor using wiring 216 to cause the retractable step 120 to move to the deployed position, as shown in FIG. 18B. Further, if it is desired to have the step 120 be illuminated by the light 1004 in the deployed position, the system controller 210 may also operate the light 1004 through wiring 219 to cause the light 1004 to illuminate. When it is desired to have the step retract and/or to have the light deactivate, the system controller 210 may similarly operate the step and/or light using wiring 216 and/or 219. Although this embodiment illustrates physical wiring 216, 219 for connecting the system controller 210 to the step motor and/or light 1004, other embodiments may utilize wireless technologies for one or both of these functions.

In some situations, the system controller 210 may operate the step and/or light automatically in response to data received from a vehicle sensor or port, such as existing vehicle port 240 illustrated in FIG. 17. Further, in the embodiment of FIG. 17, a remote device 1000 may also communicate with the system controller 210 (and/or the vehicle connector 220 or some other portion of the system 1700). The remote device 1000 may be, for example, a smartphone, a tablet computer, a laptop computer, a fob, and/or the like. The remote device 1000 desirably communicates wirelessly with the controller 210 via a wireless communication link 1002, although some embodiments may additionally or alternatively enable the remote device 1000 to communicate with the controller 210 via a wired link. The wireless communication link 1002 may, for example, utilize BLUETOOTH®, WI-FI®, and/or any other suitable wireless communication protocol.

Turning to FIG. 18A, this figure illustrates example features of a step system app running on the device 1000. It should be noted that this embodiment illustrates schematically a number of features that can be implemented in such an app, but these features may be implemented in various ways and displayed in various ways on the graphical user interface of the remote device 1000. For example, although the embodiment illustrated in FIG. 18A includes three specific groupings of system functions 1010, 1012, 1014 on one screen, other embodiments may place these groupings of functions on different screens, may group and/or combine the functions differently, may include more or fewer functions, and/or the like.

The user interface of the step system app illustrated in FIG. 18A illustrates three separate functional areas, namely a system status portion 1010, a manual control portion 1012, and a setting portions 1014. The system status portion 1010 may be configured to provide a user with real-time information on the status of the retractable step system. In this embodiment, the system status portion 1010 illustrates the current position of the step and whether the light is on or off. Other embodiments may indicate the status of other features and/or may display the status differently. In some embodiments, the system controller 210 (and/or another component of the system) is configured to transmit the current status of the step and/or light to the remote device 1000 whenever the status changes and/or whenever the remote device 1000 connects wirelessly to the system controller 210. Since the remote device 1000 may be a device that is not continuously connected to the system controller 210 (such as a smartphone that a user takes with him or her when leaving the vehicle), it can be desirable to send the current status of the step and/or light to the remote device whenever the remote device 1000 connects to the system controller 210, even if the status may not have changed since the remote device last disconnected from the system controller. This can, for example, help to limit the display of outdated status information by the remote device.

The manual control portion 1012 may be configured to, for example, enable a user to manually deploy or retract the step and/or to manually turn the light on or off. In this embodiment, the manual control portion 1012 includes buttons that a user can click on to implement these manual control features, although other embodiments could implement the manual control features differently. When a user clicks one of the manual control buttons, the remote device 1000 can be configured to transmit data to the system controller 210 via wireless communication link 1002, to cause the system controller 210 to operate the step motor and/or light.

The settings portion 1014 may be configured to, for example, enable a user to adjust configurable settings of the retractable step system. A variety of configuration settings may be stored in, for example, an electronic memory of the system controller 210. Various configurable settings may be presented by the remote device 1000, although this embodiment illustrates two such settings. Specifically, this embodiment illustrates that a user can enable or disable step auto-deployment and the user can enable or disable light auto-illumination. For example, these settings may control whether the system controller 210 should automatically operate the step and/or light in response to a particular input, such as an indication from the existing vehicle port 240 that a door has been opened or closed. In the present embodiment, the settings portion 1014 of the app implements YES or NO buttons that a user can press to enable or disable the settings. In this embodiment, a border around the YES button is thickened, to indicate to the user that YES is the currently stored setting of the system. In other embodiments, such feedback to the user may be provided differently, such as by changing a button color, explicitly stating the current state of the configurable setting, and/or the like.

The configurability provided by the remotely controllable systems disclosed herein can be desirable for a number of reasons. For example, when a retractable step system is installed on a high ground clearance vehicle that is used for both on-road and off-road driving, a particular driver may wish to have the benefits of the retractable step's automatic deployment only during the on-road driving. During the off-road driving, the driver may wish to not have the step automatically deploy. For example, if a driver is on an off-road excursion and stops his or her vehicle (and/or gets his or her vehicle stuck) in a situation where there is little ground clearance beneath the door of the vehicle, allowing the step to automatically deploy when the doors open could damage the step and/or cause other problems. Accordingly, it can be desirable to allow a user to easily configure from his or her remote device whether the step should automatically deploy in particular situations. Similarly, there may be certain situations when the user does not desire a light to come on to illuminate the step whenever the step deploys. Accordingly, it can be desirable to allow a user to easily configure from his or her device whether the light should automatically illuminate in particular situations.

Other portions of the present written description refer to embodiments that do not explicitly have a remote device and/or a lighting system illustrated in their figures. It is contemplated, however, that the remote control and lighting features disclosed with reference to FIGS. 17, 18A, and 18B may also be integrated into any of the other embodiments disclosed herein.

Figure 19:
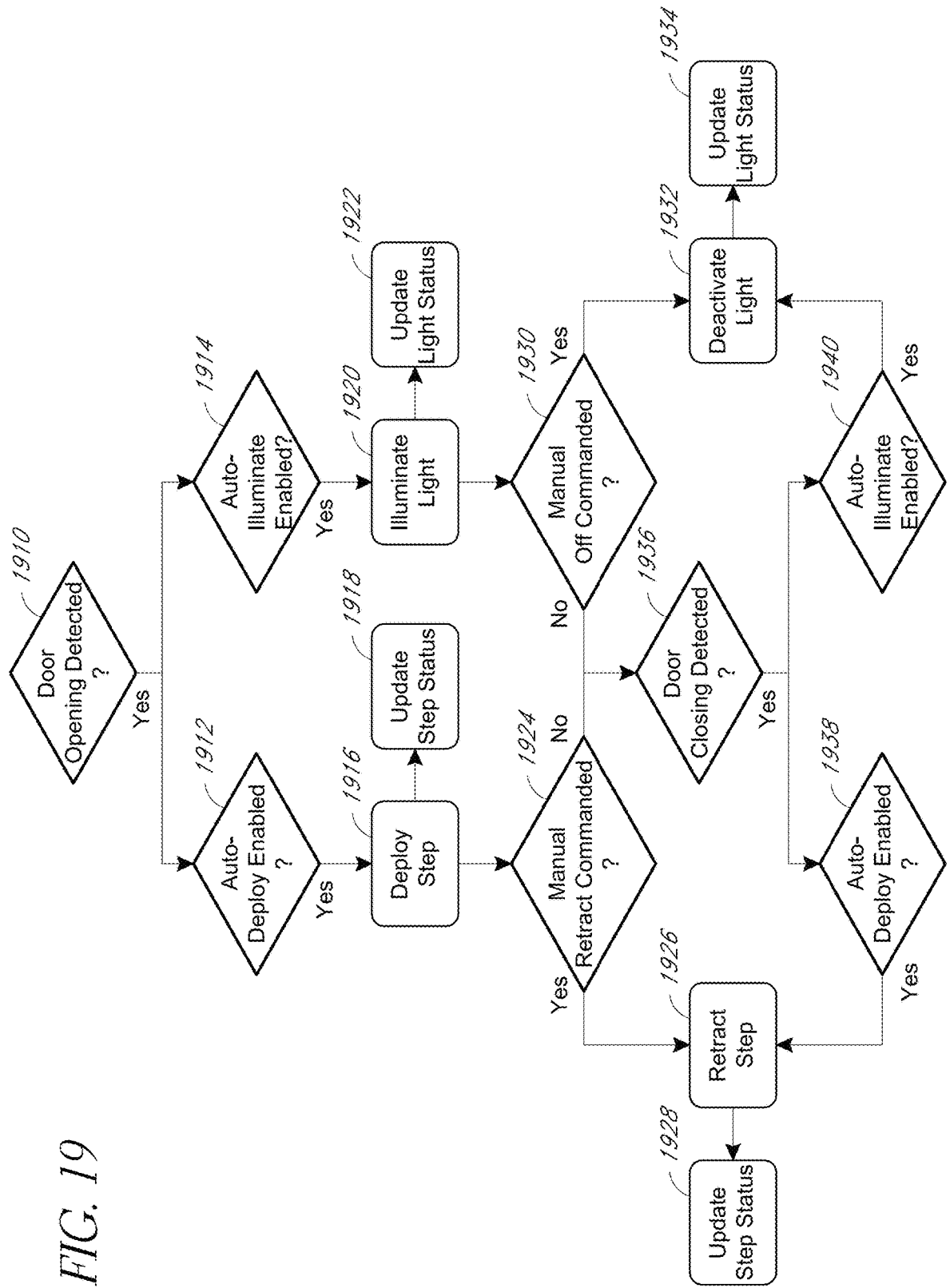
FIG. 19 is a flowchart depicting another exemplary method of operation for an automated vehicle step of embodiments provided herein.

FIG. 19 illustrates another embodiment of a process flow that may be implemented by one or more of the retractable step systems disclosed herein. For example, the process flow illustrated in FIG. 19 may be implemented by the remotely controllable step and lighting system 1700 illustrated in FIG. 17 (although other embodiments disclosed herein may also implement this process flow and/or be modified to implement this process flow).

At block 1910, a door opening is detected. The door opening may be detected, for example, by the system controller 210 receiving data from the existing vehicle port 240 indicating that a door has been opened. After the door opening is detected, the process flow proceeds to blocks 1912 and 1914. At block 1912, the system determines whether an auto-deployment configuration setting is enabled. For example, the system controller 210 may check to determine whether the step auto-deploy setting has been configured by the remote device 1000. If the auto-deploy setting is enabled, the process flow proceeds to block 1916, where the system controller causes the step to deploy. At block 1918, the system may update the step status. For example, in a system where the remote device 1000 is being used as a real time display by the user, the system status portion 1010 of the step system app may be caused to be updated by the system controller to display that the step has been deployed.

Returning to block 1914, after detecting the door opening the system may check to determine whether a light auto-illuminate setting is enabled. If the light auto-illuminate setting is enabled, the process flow proceeds to block 1920, and the system controller causes the light, such as light 1004, to illuminate. The system may also, at block 1922, update a current status of the light, such as if a user is using the remote device 1000 to display the real-time status of the light.

Even if the step and/or light have been automatically deployed or illuminated in response to an event, such as a vehicle door opening, there may be situations wherein a user requests that the step be manually retracted and/or that the light be manually turned off. For example, such manual commands may originate from the manual control portion 1012 of the step system app. At block 1924, if a manual retraction command is received, the process flow proceeds to blocks 1926 and 1928, wherein the system controller will desirably cause the step to retract and, if needed, update the step status to, for example, update the real-time display in the step system app. Similarly, at block 1930, if a manual light off command is received, the process flow proceeds to blocks 1932 and 1934, wherein the system controller will desirably cause the light to deactivate and, if needed, update the light status to, for example, update the real-time display in the step system app.

If the step and light have not been manually requested to retract or be turned off, the process flow proceeds from block 1924 or 1930 to block 1936. At block 1936, the system detects a door closing event. For example, the system controller 210 may receive data from the existing vehicle port 240 that indicates the door has been closed. At block 1938, if the auto-deployment setting is still enabled, the process flow proceeds to block 1926 and continues as discussed above. At block 1940, if the auto-illumination setting is still enabled, the process flow proceeds to block 1932 and continues as discussed above.

Terminology/Additional Embodiments

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Depending on the embodiment, certain acts, events, or functions of any of the methods described herein can be performed in a different sequence, can be added, merged, or left out altogether (e.g., not all described acts or events are necessary for the practice of the method). Moreover, in certain embodiments, acts or events can be performed concurrently, e.g., through multi-threaded processing, interrupt processing, or multiple processors or processor cores, rather than sequentially.

The various illustrative logical blocks, modules, circuits, and algorithm steps described in connection with the embodiments disclosed herein can be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks, modules, and circuits described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

The blocks of the methods and algorithms described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, a hard disk, a removable disk, a CD-ROM, or any other form of computer-readable storage medium known in the art. An exemplary storage medium is coupled to a processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the disclosures described herein can be embodied within a form that does not provide all of the features and benefits set forth herein, as some features can be used or practiced separately from others. The scope of certain disclosures disclosed herein is indicated by the appended claims rather than by the foregoing description. All changes which come within the meaning and range of equivalency of the claims are to be embraced within their scope.

What is claimed is:

1. A powered vehicle step assist system, comprising:
    a step configured for attachment to a vehicle and comprising a stepping deck, the stepping deck movable between a retracted position in which the stepping deck is stowed under the vehicle and a deployed position in which the stepping deck is outboard of the retracted position with respect to the vehicle;
    a motor drivably coupled to the step and capable of effectuating movement of the stepping deck from the retracted position to the deployed position;
    a controller in electronic communication with the motor, wherein the controller is configured to cause the motor to effectuate movement of the stepping deck in response to door status information generated by an existing vehicle computer system of the vehicle, the door status information comprising one or more of door opened/closed status and door locked/unlocked status; and a user input device positioned on the stepping deck and configured to be actuatable by a user to cause the motor to effectuate movement of the stepping deck.

2. The powered vehicle step assist system of claim 1, wherein the deployed position is downward and outboard of the retracted position with respect to the vehicle.

3. The powered vehicle step assist system of claim 2, further comprising at least one support member connectable with respect to an underside of the vehicle and connected to the step, the support member configured to at least partially support the step beneath one or more doors of the vehicle, the support member configured to pivot about at least a first axis oriented parallel to the ground.

4. The powered vehicle step assist system of claim 3, wherein the support member comprises at least a first support arm and a support bracket, the first support arm connectable with respect to the underside of the vehicle so as to be pivotable about at least the first axis, the support bracket rigidly connected to the step and connected to the first support arm to be pivotable about at least a second axis oriented parallel to the ground.

5. The powered vehicle step assist system of claim 1, wherein the stepping deck has a converging planar cross-sectional geometry.

6. The powered vehicle step assist system of claim 1, wherein the user input device comprises a switch or button.

7. The powered vehicle step assist system of claim 1, wherein actuation of the user input device by the user causes the motor to effectuate movement of the stepping deck regardless of a vehicle door state.

8. A method of controlling a powered vehicle step assist system installed on a vehicle, the method comprising:

with a controller of the step assist system, in response to door status information generated by an existing vehicle computer system of the vehicle and comprising one or more of door opened/closed status and door locked/unlocked status, commanding a motor drivably coupled to a step of the powered vehicle step assist system to effectuate movement of a stepping deck of the step from a retracted position to a deployed position, wherein the stepping deck is stowed under the vehicle in the retracted position and is outboard of the retracted position with respect to the vehicle in the deployed position; and in response to actuation of a user input device positioned on the stepping deck, causing the motor to effectuate movement of the stepping deck.

9. The method of claim 8, wherein the deployed position is downward and outboard of the retracted position with respect to the vehicle.

10. The method of claim 9, wherein the powered step assist system further comprises at least one support member connectable with respect to an underside of the vehicle and connected to the step, the support member configured to at least partially support the step beneath one or more doors of the vehicle, the support member configured to pivot about at least a first axis oriented parallel to the ground.

11. The method of claim 10, wherein the support member comprises at least a first support arm and a support bracket, the first support arm connectable with respect to the underside of the vehicle so as to be pivotable about at least the first axis, the support bracket rigidly connected to the step and connected to the first support arm to be pivotable about at least a second axis oriented parallel to the ground.

12. The method of claim 8, wherein the stepping deck has a converging planar cross-sectional geometry.

13. The method of claim 8 wherein the user input device comprises a switch or button.

14. The method of claim 8, wherein actuation of the user input device by the user causes the motor to effectuate movement of the stepping deck regardless of a vehicle door state.

\* \* \* \* \*